United States Patent
Selig

(10) Patent No.: US 11,619,242 B2
(45) Date of Patent: Apr. 4, 2023

(54) CEILING FAN

(71) Applicant: Hunter Fan Company, Memphis, TN (US)

(72) Inventor: Michael Selig, Memphis, TN (US)

(73) Assignee: Hunter Fan Company, Memphis, TN (US)

( * ) Notice: Subject to any disclaimer, the term of this patent is extended or adjusted under 35 U.S.C. 154(b) by 0 days.

(21) Appl. No.: 17/934,021

(22) Filed: Sep. 21, 2022

(65) Prior Publication Data

US 2023/0027147 A1    Jan. 26, 2023

Related U.S. Application Data

(63) Continuation of application No. 17/519,795, filed on Nov. 5, 2021, now Pat. No. 11,525,462, which is a
(Continued)

(51) Int. Cl.
*F04D 29/64* (2006.01)
*F04D 25/08* (2006.01)
(Continued)

(52) U.S. Cl.
CPC ........... *F04D 29/646* (2013.01); *F04D 25/06* (2013.01); *F04D 25/0613* (2013.01);
(Continued)

(58) Field of Classification Search
CPC .... F04D 29/646; F04D 25/06; F04D 25/0613; F04D 25/088; F04D 29/329; F04D 29/34;
(Continued)

(56) References Cited

U.S. PATENT DOCUMENTS

| 2,008,957 A | 7/1935 | Hueglin |
| 2,157,999 A | 5/1939 | Charavay |

(Continued)

FOREIGN PATENT DOCUMENTS

| CN | 2043806 U | 8/1989 |
| CN | 1523234 A | 8/2004 |

(Continued)

OTHER PUBLICATIONS

European Patent Office, Extended Search Report re Corresponding Application No. 22161207.0-1004, dated Jun. 17, 2022, 8 pages, Munich, Germany.

(Continued)

*Primary Examiner* — Jacob M Amick
*Assistant Examiner* — Charles J Brauch
(74) *Attorney, Agent, or Firm* — McGarry Bair PC

(57) ABSTRACT

A ceiling fan assembly having a motor assembly with a rotating blade hub, and at least one fan blade mounted to the rotating blade hub with a blade span defined between a tip and a root, and defining an airfoil cross section including a rounded leading edge and a v-shaped trailing edge defining a chord therebetween. The blade comprising a pressure side surface and a suction side surface extending between the leading and trailing edges and including a hollow interior and including a tip opening at the tip and a root opening at the root for accessing the hollow interior. The at least one fan blade includes a thickness to chord ratio of less than about 15%.

20 Claims, 34 Drawing Sheets

Related U.S. Application Data continuation of application No. 15/378,886, filed on Dec. 14, 2016, now Pat. No. 11,193,502.

(60) Provisional application No. 62/350,799, filed on Jun. 16, 2016, provisional application No. 62/281,860, filed on Jan. 22, 2016, provisional application No. 62/281,866, filed on Jan. 22, 2016, provisional application No. 62/267,033, filed on Dec. 14, 2015.

(51) Int. Cl.
  *F04D 29/34* (2006.01)
  *F04D 29/38* (2006.01)
  *F04D 25/06* (2006.01)
  *F04D 29/32* (2006.01)

(52) U.S. Cl.
  CPC ......... *F04D 25/088* (2013.01); *F04D 29/329* (2013.01); *F04D 29/34* (2013.01); *F04D 29/384* (2013.01); *F04D 29/388* (2013.01); *F05D 2240/301* (2013.01)

(58) Field of Classification Search
  CPC . F04D 29/384; F04D 29/388; F05D 2240/301
  See application file for complete search history.

(56) References Cited

U.S. PATENT DOCUMENTS

| | | | |
|---|---|---|---|
| 2,259,247 A | 10/1941 | Dornier |
| 2,430,854 A | 11/1947 | Berliner |
| 2,592,471 A | 4/1952 | Sawyer |
| 2,682,925 A | 7/1954 | Wosika |
| 2,765,859 A | 10/1956 | Hartzell et al. |
| 2,918,977 A | 12/1959 | Fedan et al. |
| 3,891,349 A | 6/1975 | Woollenweber, Jr. |
| 4,046,489 A | 9/1977 | Fairchild et al. |
| 4,073,598 A | 2/1978 | Mizutani et al. |
| 4,275,993 A | 6/1981 | Sprengling |
| 4,594,018 A | 6/1986 | Larsson et al. |
| 4,611,139 A | 9/1986 | Godkin et al. |
| 4,637,673 A | 1/1987 | Yang |
| 4,657,485 A | 4/1987 | Hartwig |
| 4,720,244 A | 1/1988 | Kluppel et al. |
| 4,808,071 A | 2/1989 | Chau |
| 4,878,806 A | 11/1989 | Markwardt |
| 4,892,460 A | 1/1990 | Volk |
| 5,085,392 A | 2/1992 | Perna |
| 5,193,983 A | 3/1993 | Shyu |
| 5,222,297 A | 6/1993 | Graff et al. |
| 5,224,830 A | 7/1993 | Wang |
| 5,230,850 A | 7/1993 | Lewis |
| 5,246,343 A | 9/1993 | Windsor et al. |
| 5,256,037 A | 10/1993 | Chatelain |
| 5,401,138 A | 3/1995 | Mosiewicz |
| 5,435,514 A | 7/1995 | Kerr |
| 5,520,515 A | 5/1996 | Bailey et al. |
| 5,575,624 A | 11/1996 | Bogage |
| 5,613,832 A | 3/1997 | Su |
| 5,851,107 A | 12/1998 | Wang |
| 5,883,449 A | 3/1999 | Mehta et al. |
| 5,996,898 A | 12/1999 | Parker et al. |
| 6,039,541 A | 3/2000 | Parker et al. |
| 6,146,097 A | 11/2000 | Bradt |
| 6,183,201 B1 | 2/2001 | Maby |
| 6,244,821 B1 | 6/2001 | Boyd et al. |
| 6,250,886 B1 | 6/2001 | Immell et al. |
| 6,382,917 B1 | 5/2002 | Zuege |
| 6,390,777 B1 | 5/2002 | Kerr, Jr. |
| 6,402,475 B1 | 6/2002 | Chen |
| 6,528,914 B2 | 3/2003 | Kloeppel et al. |
| 6,565,320 B1 | 5/2003 | Surls et al. |
| 6,592,328 B1 | 7/2003 | Cahill |
| 6,630,758 B2 | 10/2003 | Aoki et al. |
| 6,685,436 B2 | 2/2004 | Huang |
| 6,726,453 B1 | 4/2004 | Hsieh |
| 6,817,835 B2 | 11/2004 | Boyd et al. |
| 6,840,739 B2 | 1/2005 | Cortez et al. |
| 6,939,108 B2 | 9/2005 | Boyd |
| 7,210,910 B1 | 5/2007 | Parker et al. |
| 7,252,478 B2 | 8/2007 | Aynsley |
| 7,284,960 B2 | 10/2007 | Aynsley |
| D594,551 S | 6/2009 | Parker et al. |
| 7,615,898 B2 | 11/2009 | Chang |
| 7,625,186 B1 | 12/2009 | Lueddecke |
| 7,726,945 B2 | 6/2010 | Grant et al. |
| 7,780,418 B2 | 8/2010 | Wang |
| 7,785,077 B2 | 8/2010 | Richardson et al. |
| 7,955,055 B1 | 6/2011 | Boyd et al. |
| 8,066,480 B2 | 11/2011 | Madsen |
| 8,162,613 B2 | 4/2012 | Oleson et al. |
| 8,314,523 B2 | 11/2012 | Lin |
| 8,523,378 B2 | 9/2013 | Schulzman |
| 8,529,212 B2 | 9/2013 | Smith et al. |
| 8,579,588 B1 | 11/2013 | Boyd |
| 8,602,725 B2 | 12/2013 | Itou et al. |
| 8,672,649 B2 | 3/2014 | Smith et al. |
| 8,721,305 B2 | 5/2014 | Oleson et al. |
| 8,827,652 B2 | 9/2014 | Witt |
| 8,827,664 B2 | 9/2014 | McCloud et al. |
| 8,840,379 B2 | 9/2014 | Wang |
| 8,876,468 B2 | 11/2014 | Aynsley et al. |
| 8,956,124 B2 | 2/2015 | Boyd et al. |
| 9,011,099 B2 | 4/2015 | Wortman et al. |
| 9,102,397 B2 | 8/2015 | Wood |
| 9,360,020 B2 | 6/2016 | Janecek |
| 9,523,371 B2 | 12/2016 | Hollan et al. |
| 9,546,665 B2 | 1/2017 | Stull et al. |
| 9,638,165 B2 | 5/2017 | La Pegna et al. |
| 9,726,192 B2 | 8/2017 | Whitley et al. |
| 9,859,773 B2 | 1/2018 | Yin et al. |
| 2002/0094273 A1 | 7/2002 | Huang |
| 2004/0100422 A1 | 5/2004 | Greenyer |
| 2006/0024165 A1 | 2/2006 | Gajewski |
| 2006/0039809 A1 | 2/2006 | Fan |
| 2006/0147310 A1 | 7/2006 | Steiner |
| 2007/0154315 A1 | 7/2007 | Bucher |
| 2008/0107527 A1 | 5/2008 | Gajewski |
| 2008/0203837 A1 | 8/2008 | Tang |
| 2008/0317616 A1 | 12/2008 | Yu |
| 2009/0081045 A1 | 3/2009 | Scherer et al. |
| 2009/0180888 A1 | 7/2009 | Parker et al. |
| 2009/0263254 A1 | 10/2009 | Bucher |
| 2010/0109465 A1 | 5/2010 | Yang et al. |
| 2010/0278637 A1 | 11/2010 | Oleson et al. |
| 2011/0020135 A1 | 1/2011 | Itou et al. |
| 2012/0003098 A1 | 1/2012 | Lewis |
| 2012/0128501 A1 | 5/2012 | Hoofard et al. |
| 2013/0136632 A1 | 5/2013 | Stocks et al. |
| 2013/0189104 A1 | 7/2013 | Hollan et al. |
| 2013/0189109 A1 | 7/2013 | Noble |
| 2013/0209293 A1 | 8/2013 | Kawano et al. |
| 2014/0212294 A1 | 7/2014 | Wang |
| 2014/0348649 A1 | 11/2014 | Oleson |
| 2015/0023802 A1 | 1/2015 | Oleson et al. |
| 2015/0037164 A1 | 2/2015 | Fizer et al. |
| 2015/0090858 A1 | 4/2015 | Broughman et al. |
| 2015/0240824 A1 | 8/2015 | Jones et al. |
| 2015/0260199 A1 | 9/2015 | Hollan |
| 2015/0333592 A1 | 11/2015 | Yin et al. |
| 2015/0345824 A1 | 12/2015 | Hentges et al. |
| 2017/0159664 A1 | 6/2017 | Du |

FOREIGN PATENT DOCUMENTS

| | | |
|---|---|---|
| CN | 201068875 Y | 6/2008 |
| CN | 201113613 Y | 9/2008 |
| CN | 101394124 A | 3/2009 |
| CN | 201305128 Y | 9/2009 |
| CN | 2012073834 | 12/2011 |
| CN | 202145590 U | 2/2012 |
| CN | 2012132275 U | 2/2012 |
| CN | 102510137 A | 6/2012 |
| CN | 102536864 A | 7/2012 |

(56) References Cited

FOREIGN PATENT DOCUMENTS

| | | |
|---|---|---|
| CN | 202309389 U | 7/2012 |
| CN | 202520640 U | 11/2012 |
| CN | 202646153 U | 1/2013 |
| CN | 103174465 A | 6/2013 |
| CN | 103410777 A | 11/2013 |
| CN | 203574521 U | 4/2014 |
| CN | 203660757 U | 6/2014 |
| CN | 104214137 A | 12/2014 |
| CN | 204025144 U | 12/2014 |
| CN | 204041489 U | 12/2014 |
| CN | 105099080 A | 11/2015 |
| CN | 105201893 A | 12/2015 |
| CN | 204992877 U | 1/2016 |
| CN | 205243900 U | 5/2016 |
| CN | 205533349 U | 8/2016 |
| CN | 206845502 U | 1/2018 |
| DE | 102004001942 A1 | 9/2005 |
| EP | 2397783 A1 | 12/2011 |
| EP | 2397784 A1 | 12/2011 |
| GB | 258730 A | 9/1926 |
| GB | 911310 A | 11/1962 |
| GB | 2235598 A | 3/1991 |
| IN | 201731045349 A | 1/2018 |
| JP | 2007170292 A | 7/2007 |
| JP | 2013217273 A | 10/2013 |
| KR | 20120129409 A | 11/2012 |
| TW | M279748 U | 11/2005 |
| WO | 2002081927 A1 | 10/2002 |
| WO | 2009111708 A1 | 9/2009 |
| WO | 2012137405 A1 | 10/2012 |
| WO | 2017164586 A1 | 9/2017 |

OTHER PUBLICATIONS

European Patent Office, Extended Search Report re Corresponding Application No. 22161208.8-1004, dated Jun. 17, 2022, 10 pages, Munich, Germany.

European Patent Office, Extended Search Report re Corresponding Application No. 22161211.2-1104, dated Jun. 24, 2022, 9 pages, Munich, Germany.

European Patent Office, Extended Search Report re Corresponding Application No. 22161209.6-1004, dated Jun. 24, 2022, 9 pages, Munich, Germany.

Chinese Patent Office, Office Action re Corresponding Application No. 202110269505.8, dated Jul. 11, 2022, 9 pages, China.

Chinese Patent Office, Office Action re Corresponding Application No. 202110271711.2, dated Jun. 24, 2022, 7 pages, China.

Chinese Patent Office, Office Action re Corresponding Application No. 202110271868.5, dated Jul. 13, 2022, 8 pages, China.

Chinese Patent Office, Office Action re Corresponding Application No. 202110271910.3, dated Jul. 28, 2022, 8 pages, China.

Editor2, Camber, Aug. 12, 2013, Skybrary, pp. 1-3 (Year 2013).

CEILING FAN

CROSS-REFERENCE TO RELATED APPLICATIONS

This application is a continuation of application of U.S. patent application Ser. No. 17/519,795, filed Nov. 5, 2021, now allowed, which is a continuation application of U.S. Pat. No. 11,193,502, filed Dec. 14, 2016, which claims priority to U.S. Provisional Patent Application No. 62/267,033, filed Dec. 14, 2015, U.S. Provisional Patent Application No. 62/281,860 filed Jan. 22, 2016, U.S. Provisional Patent Application No. 62/281,866 filed Jan. 22, 2016, and U.S. Provisional Patent Application No. 62/350,799 filed Jun. 16, 2016, all of which are incorporated herein by reference in their entirety.

BACKGROUND OF THE INVENTION

Ceiling fans are used to generate airflow within a space or area, often used for cooling or temperature regulation. Ceiling fans can be used in industrial, commercial or farming environments to circulate air to maintain proper temperature regulation. This is commonly accomplished with the use of high volume, low speed fans.

BRIEF DESCRIPTION OF THE INVENTION

One aspect of the disclosure is a ceiling fan assembly having a motor assembly with a rotating blade hub, and at least one fan blade mounted to the rotating blade hub with a blade span defined between a tip and a root, and defining an airfoil cross section including a rounded leading edge and a v-shaped trailing edge defining a chord therebetween, with the blade comprising a pressure side surface and a suction side surface extending between the leading and trailing edges and including a hollow interior and including a tip opening at the tip and a root opening at the root for accessing the hollow interior.

DESCRIPTION OF EMBODIMENTS OF THE INVENTION

Figure 1A:
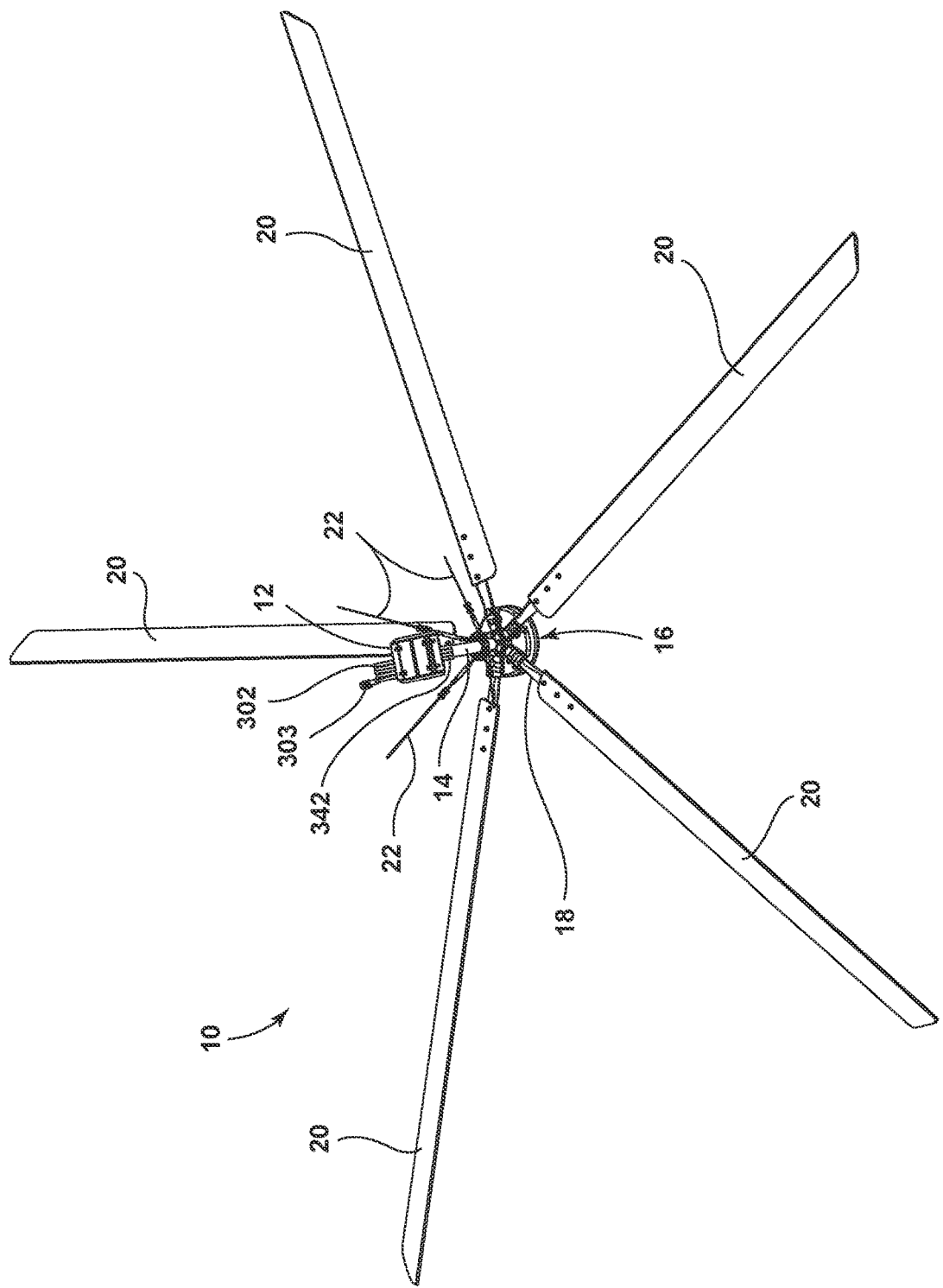
FIG. 1A is a top perspective view of a ceiling fan having several embodiments of the invention.

The described embodiments of the present invention are directed to systems, methods, and other devices related to a ceiling fan.

FIG. 1 illustrates a top perspective view of a ceiling fan 10. The ceiling fan 10 includes a ceiling mount structure 12 for mounting to a ceiling (not shown) or a structure, having a downrod assembly 14 extending therefrom. The downrod assembly 14 couples to a motor assembly 16. A plurality of blade holders 18 couple the blades 20 to the motor assembly 16. While five blades 20 and five blade holders 18 are shown, any number of blades 20 and blade holders 18 are contemplated. Optionally, a plurality of guy wires 22 can be used to mount to the downrod assembly 14 to the ceiling separate from the ceiling mount structure 12. As used herein, the ceiling or structure can be any structure from which the ceiling fan can suspend from or mount. For example, the ceiling can be the ceiling of a building, factory, or farm building.

Figure 1B:
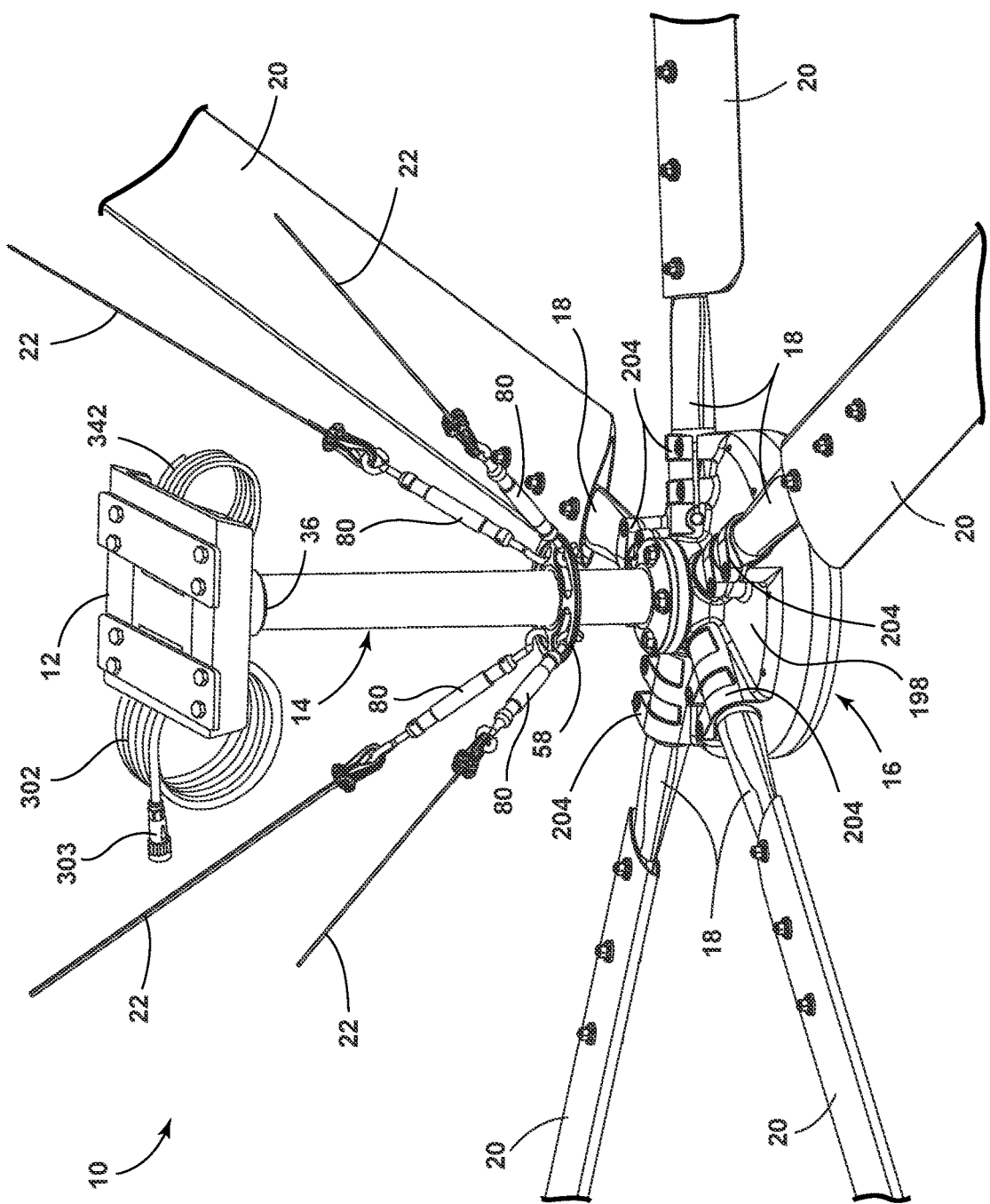
FIG. 1B is an enlarged top perspective view of the ceiling fan of FIG. 1A illustrating a motor housing, blade mount, and downrod assembly with a guy wire fitting.
Figure 1C:
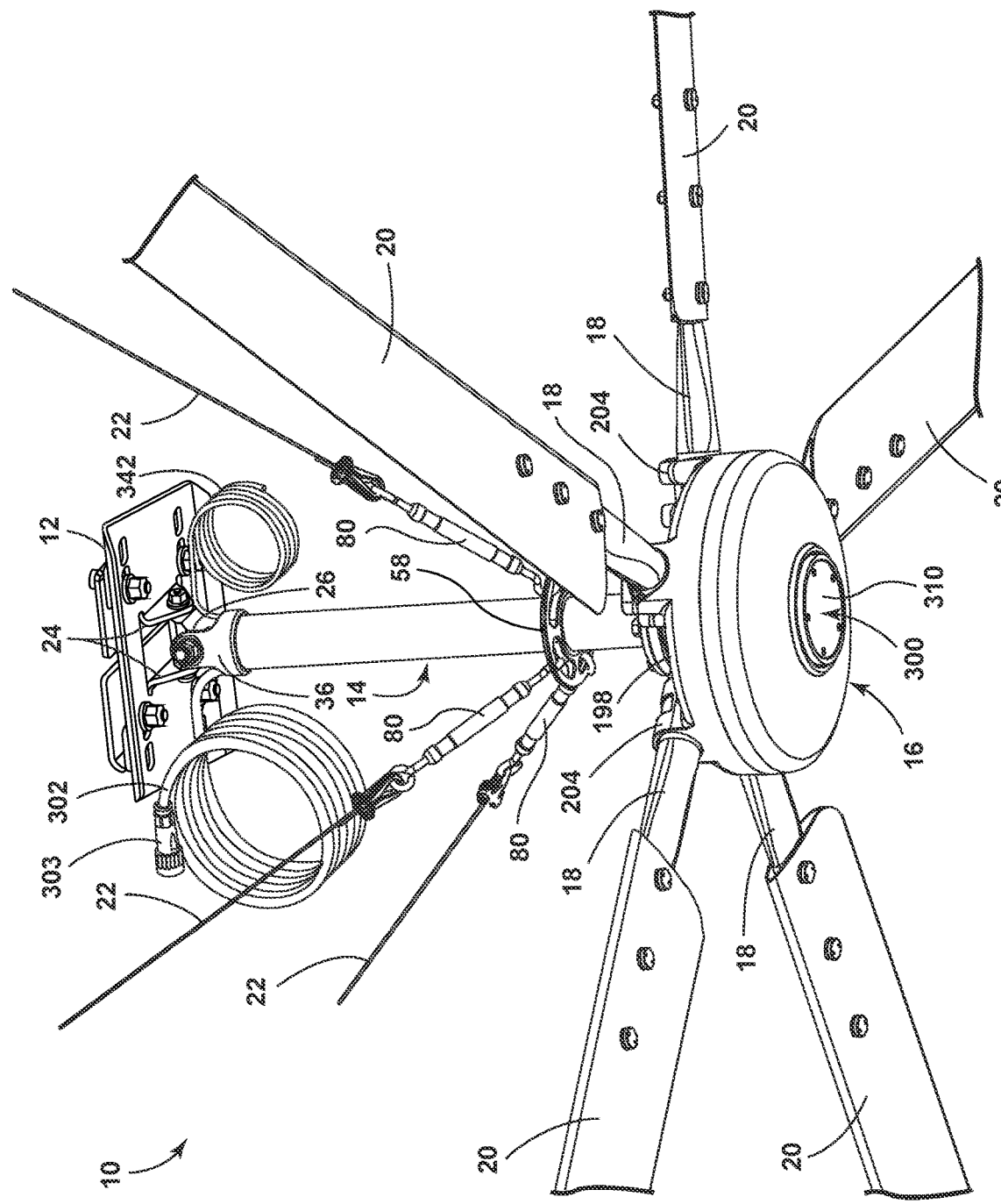
FIG. 1C is an enlarged bottom perspective view of the ceiling fan of FIG. 1A illustrating the motor housing and a retention system.

FIG. 1B is a close-up view of the downrod assembly 14 and motor assembly 16. The ceiling mount structure 12 includes a mount plate 13 having two upper plates 15 for securing the ceiling mount structure 12 to the building with a bolted assembly. A support cable 302 and wiring conduit 342 extending from within the downrod assembly 14 underneath the mount plate 13 for coupling the ceiling fan 10 to the structure and an electrical power supply, respectively. The wiring conduit 342 terminates in an electrical connector 343. A downrod plate 50 couples the downrod assembly 14 to the motor assembly 16. The downrod assembly 14 further includes a guy wire fitting 58 for coupling the guy wires 22 to the downrod assembly 14 utilizing a set of turnbuckles 80. A motor housing 198 includes a plurality of mounts 204 for coupling the blades 20 to the motor assembly 16 with the blade holders 18. FIG. 1C illustrates a portion of a retention system 300, while the remaining portion is internal of the motor assembly 16. The retention system 300 includes a retainer plate 310 disposed along the bottom of the motor housing 198, providing a redundant suspension for suspending the ceiling fan 10 from the ceiling or structure. Additionally, the bottom of the mount plate 13 includes two integral tabs 24 for mounting the plate to a fastener 19. The fastener 19 couples the mount plate 13 to the downrod assembly 14 at the swivel mount 36. The tabs 24 are formed in the mount plate 13 during manufacture, as compared to welding of the tabs 24, which reduces cost while improving reliability of the tabs 24 during fan operation.

Figure 1D:
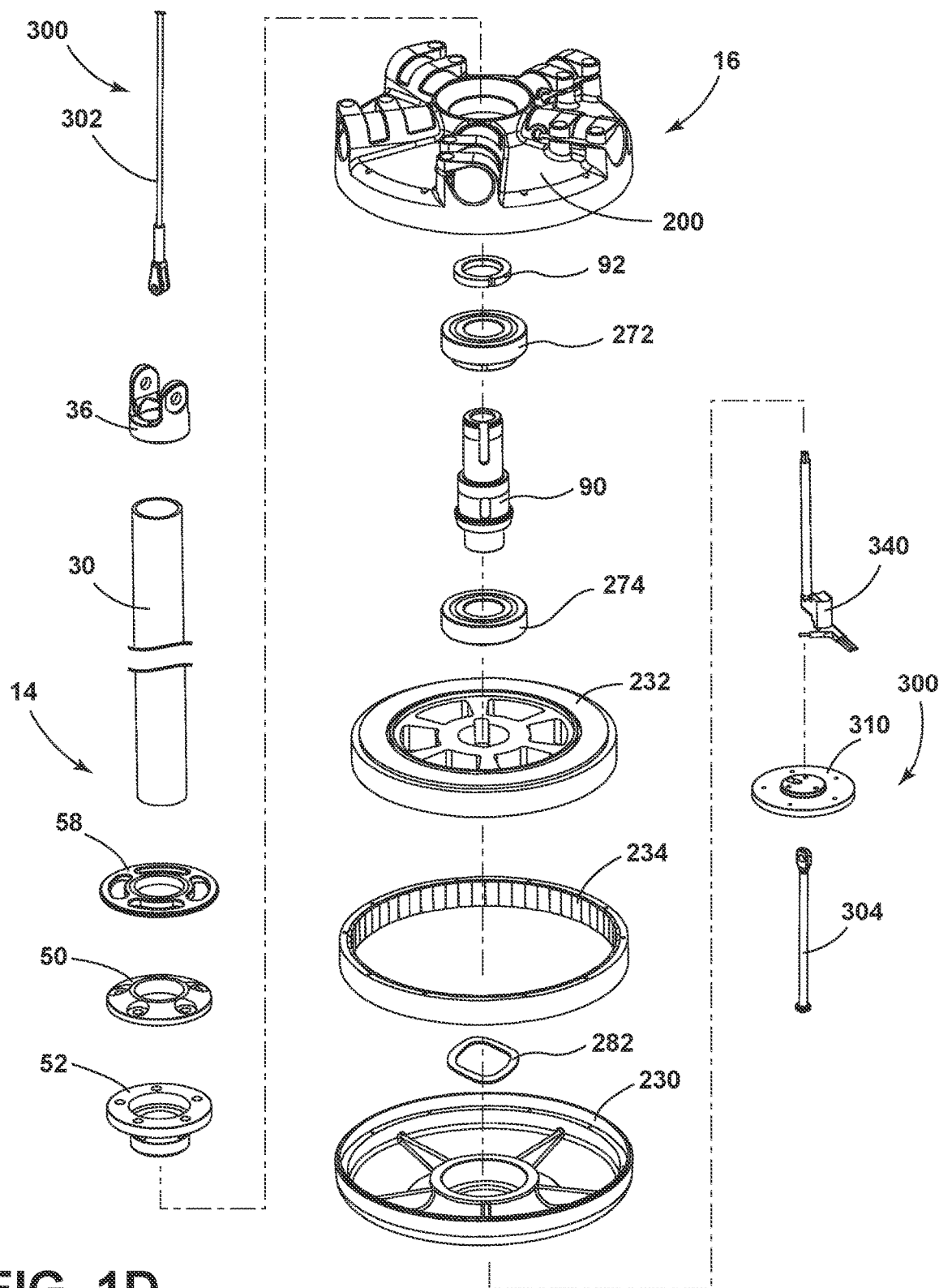
FIG. 1D is an exploded view illustrating the internal components of the ceiling fan of FIG. 1B.

FIG. 1D is an exploded view illustrating the combination of components comprising the downrod assembly 14 and the motor assembly 16. The downrod assembly 14 includes a hollow rod 30 having a swivel mount 36 for coupling the downrod assembly 14 to the ceiling mount structure 12. The guy wire fitting 58 mounts around the hollow rod 30. A downrod plate 50 mounts to the downrod assembly 14 opposite of the swivel mount 36. The downrod plate 50 couples to a shaft coupler 52 for coupling the downrod assembly 14 to the motor assembly 16. The motor assembly 16 includes the motor housing 198 split into an upper housing portion 200 and a lower housing portion 230. A non-rotating motor shaft 90 is disposed within the motor housing 198 for supporting a stator 232, upper bearing 272, and lower bearing 274. A retainer nut 92 can be used to secure the motor shaft 90 to the downrod assembly 14 at the shaft coupler 52. A spring member 282 can be disposed between the lower bearing 274 and the lower motor housing portion 230. A rotor 234 mounts to the upper and lower motor housing portions 200, 230, such that the motor housing 198 can rotate about the non-rotating motor shaft 90. The retention system 300 further includes the support cable 302 and retention rod 304 for suspending the retainer plate 310 from the structure. The retainer plate 310 can mount to the non-rotating motor shaft 90 and rest below the lower housing portion 230 to provide a redundant support for both the non-rotating and rotating elements of the motor assembly 16. A wiring harness 340 can extend through the motor shaft 90, and out through the center of the motor shaft 90 for supplying an electric current to the stator 232.

Figure 2A:
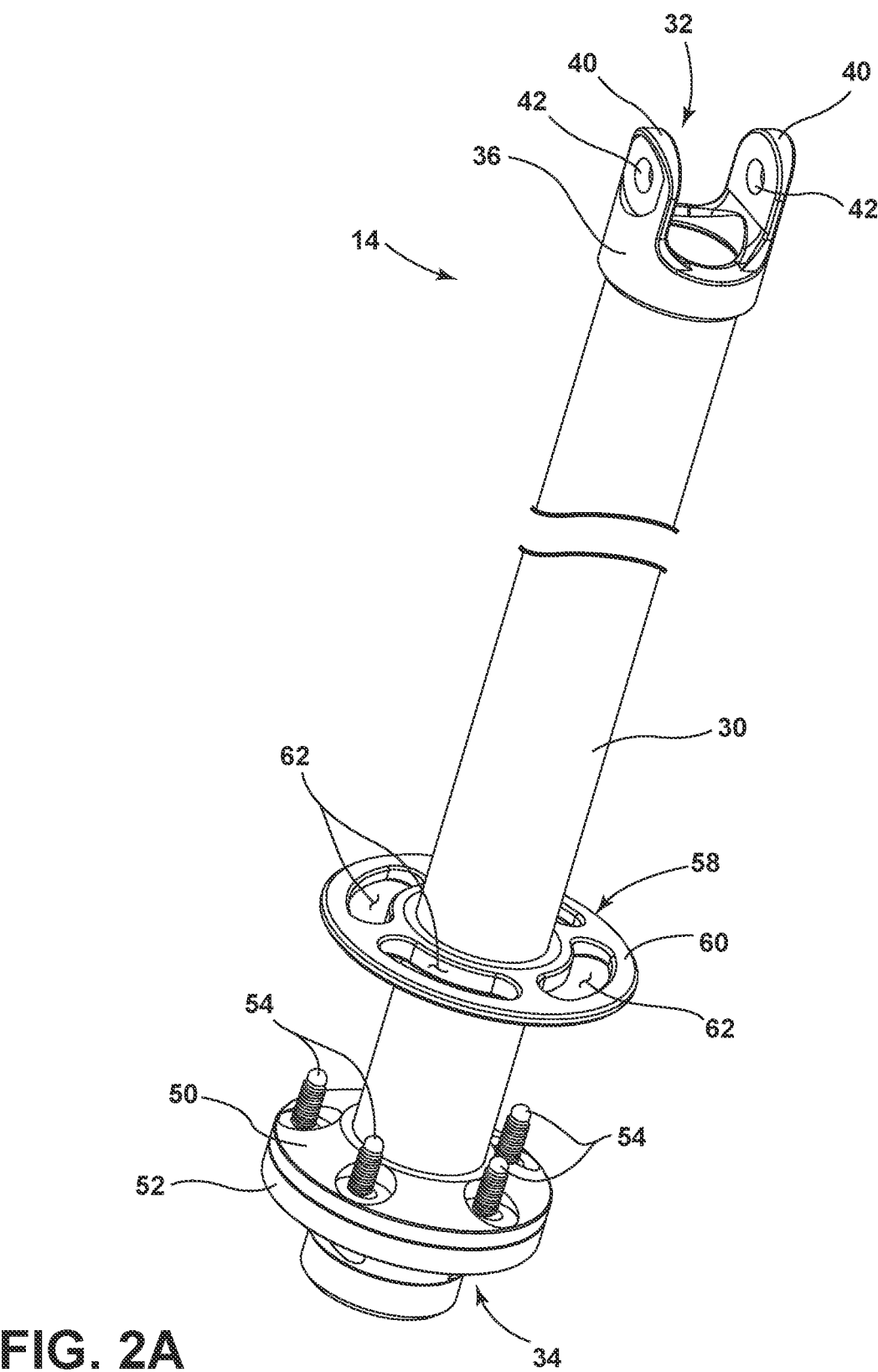
FIG. 2A is a top perspective view of the downrod assembly of the ceiling fan of FIGS. 1A-1D.

Looking at FIG. 2A, the downrod assembly 14 comprises the hollow rod 30 having an upper end 32 configured to mount to the ceiling via the ceiling mount structure 12 of FIG. 1. A lower end 34, disposed opposite of the upper end 32, mounts the downrod assembly 14 to the motor assembly 16. The upper end 32 includes the swivel mount 36 mounted to the hollow rod 30. The swivel mount 36 can include two extensions 40 defining a clevis with each extension 40 having a mounting aperture 42. The mounting aperture 42 can be aligned to accept the insertion of a fastener, such as a pin, for pivotally coupling the upper end 32 to the ceiling mount structure 12.

The lower end 34 can include the downrod plate 50 and shaft coupler 52. The downrod plate 50 can mount to the hollow rod 30, such as by welding, or can be integral with the hollow rod 30. The shaft coupler 52 can couple to the downrod plate 50 with a plurality of fasteners 54 such as screws or bolts. The guy wire fitting 58 can be a disk 60 that can secure around the hollow rod 30, between the upper and lower ends 32, 34, and can have one or more openings 62 for mounting the guy wires 22 of FIG. 1.

Figure 2B:
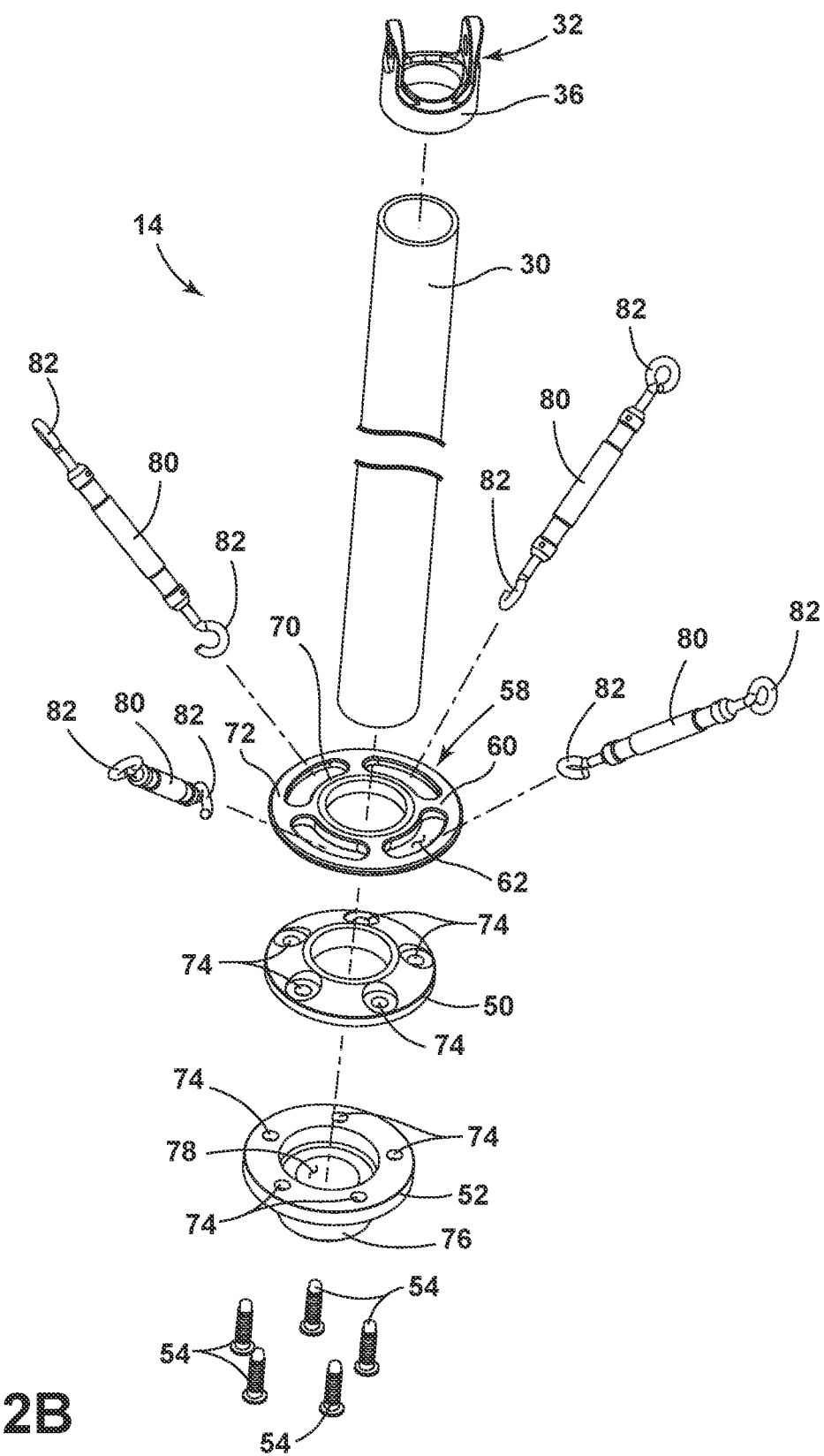
FIG. 2B is an exploded view of the downrod of FIG. 2A including turnbuckles.

Looking now at FIG. 2B, an exploded view shows the separated parts of the downrod assembly 14. The guy wire fitting 58 can weld to the hollow rod 30, or can be machined as part of the hollow rod 30. The guy wire fitting 58 can alternatively include an inner ring 70 and an outer ring 72, having the openings 62 disposed between the rings 70, 72. The turnbuckles 80 have hooks 82 that can extend through and couple to the outer ring 72 through the openings 62. The turnbuckles 80 can couple the downrod assembly 14 to the ceiling via the guy wires 22 for providing additional support for the ceiling fan 10 and reducing vibration or gyroscopic movement of the ceiling fan 10 during operation.

The downrod plate 50 and the shaft coupler 52 can include a plurality of fastener openings 74 adapted to accept the insertion of the fasteners 54 for coupling the downrod plate 50 and the shaft coupler 52. The fasteners 54 can thread into one or more of the downrod plate 50 and shaft coupler 52 or can utilize a secondary fastener such as a nut to secure the downrod plate 50 and shaft coupler 52 together. The shaft coupler 52 can be in the form of a collar 76 having a central opening 78. Looking at FIG. 2C, the collar 76 can be threaded to couple to a tapped upper end of the motor shaft 90, mounting the downrod assembly 14 to the motor assembly 16. Further, the collar 76 or shaft coupler 52 can be indexed relative to the motor shaft 90, such as being keyed to receive a keyway 88 on the motor shaft 90.

Figure 2C:
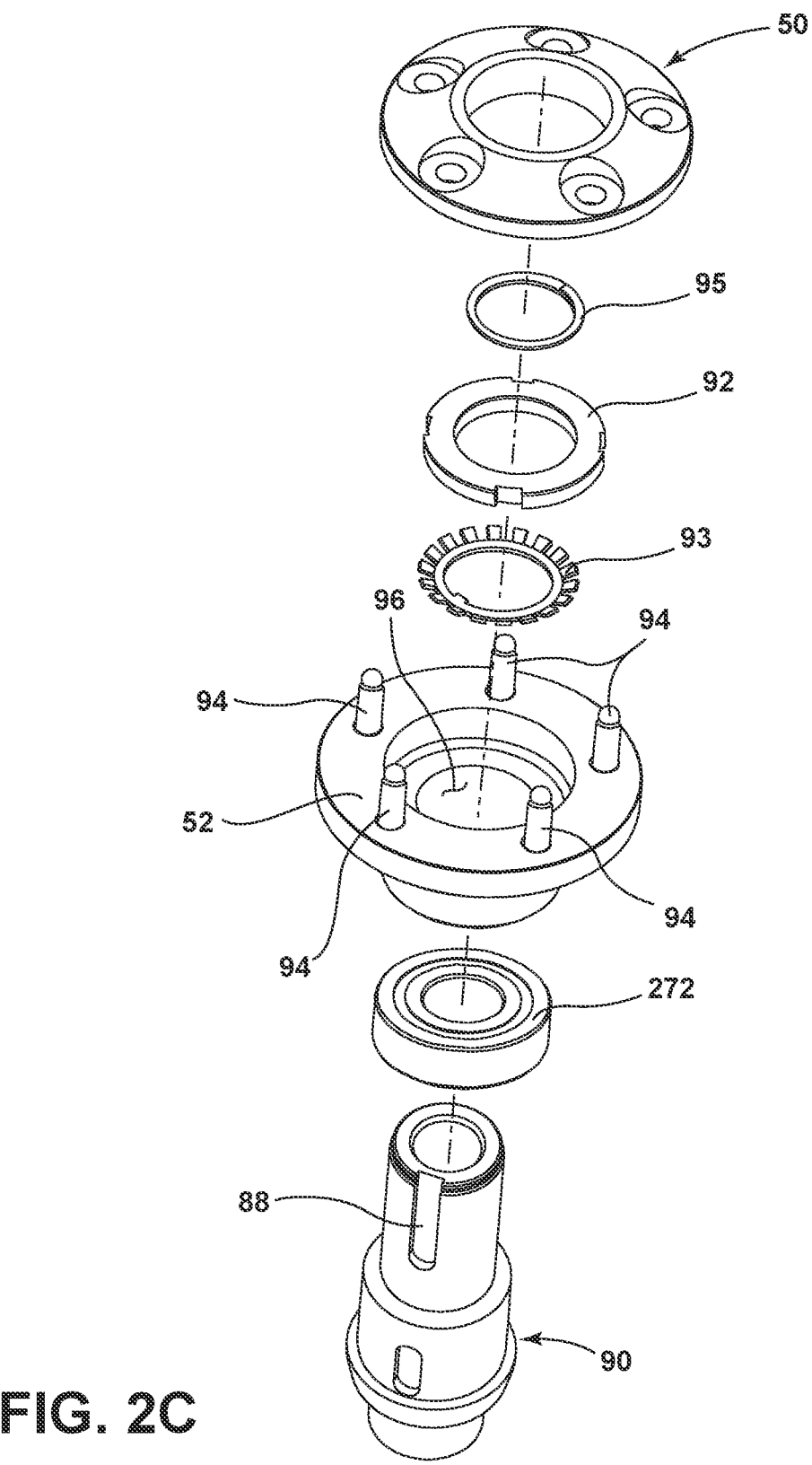
FIG. 2C is an exploded view of an motor shaft utilizing press studs and a retainer nut for mounting to the downrod of FIG. 2A.

Alternatively, as seen in FIG. 2C, the threaded retainer 92 can be used to secure the shaft coupler 52 to the motor shaft 90. Utilizing the threaded retainer 92, in an alternative implementation, the collar 76 can slide over the motor shaft 90 having the retainer 92 thread onto the tapped portion of the motor shaft 90 to secure the shaft coupler 52 to the motor shaft 90. The retainer 92 can have a diameter sized to fit within an upper opening 96 of the shaft coupler 52. Complementary to the retainer 92, an upper collar 95 can be used to secure the motor shaft 90 to the retainer nut 92 redundant to the threads. Additionally, a spring ring 93 can be inserted between the retainer nut 92 and the shaft coupler 52 to provide a biasing force between the two. The biasing force of the spring ring 93 secures the retainer nut 92 to the motor shaft 90, prevented unwanted rotation of the two that may otherwise lead to unthreading. In another alternative example, both the shaft coupler 52 and the retainer 92 can be threaded to couple to the motor shaft 90, providing additional support for mounting the downrod assembly 14 to the motor assembly 16.

Alternative to the threaded fasteners 54, the downrod plate 50 or the shaft coupler 52 can include tapped studs 94 or press studs, while the remaining downrod plate 50 or motor coupler 52 has openings 74 adapted to receive the tapped studs 94. Nuts or other fasteners can thread or fit onto the tapped studs 94 to secure the downrod plate 50 and motor coupler 52 together.

It should be appreciated that the downrod assembly 14 is beneficial in suspending the motor assembly 16 from the ceiling, permitting the use of a non-rotating downrod assembly 14 and a non-rotating motor shaft 90. The downrod plate 50 in combination with the shaft coupler 52 facilitates connection of the downrod assembly 14 to the motor assembly 16. Additionally, the guy wire fitting 58 facilitates the connection of additional suspension elements to the downrod assembly 14, such as guy wiring 22, reducing vibration or movement associated with operation of the ceiling fan 10. Additionally, the guy wiring provides an additional redundant suspension system in the event that the ceiling mount structure 12 fails.

It should be further appreciated that the tapped studs 94 or press studs facilitate alignment and mounting of the downrod plate 50 to the shaft coupler 52. Additionally, the use of the retainer nut 92 facilitates slidable insertion of the motor shaft 90 into the shaft coupler 52 as well as can provide a redundant coupling for attaching the motor shaft 90.

Figure 3A:
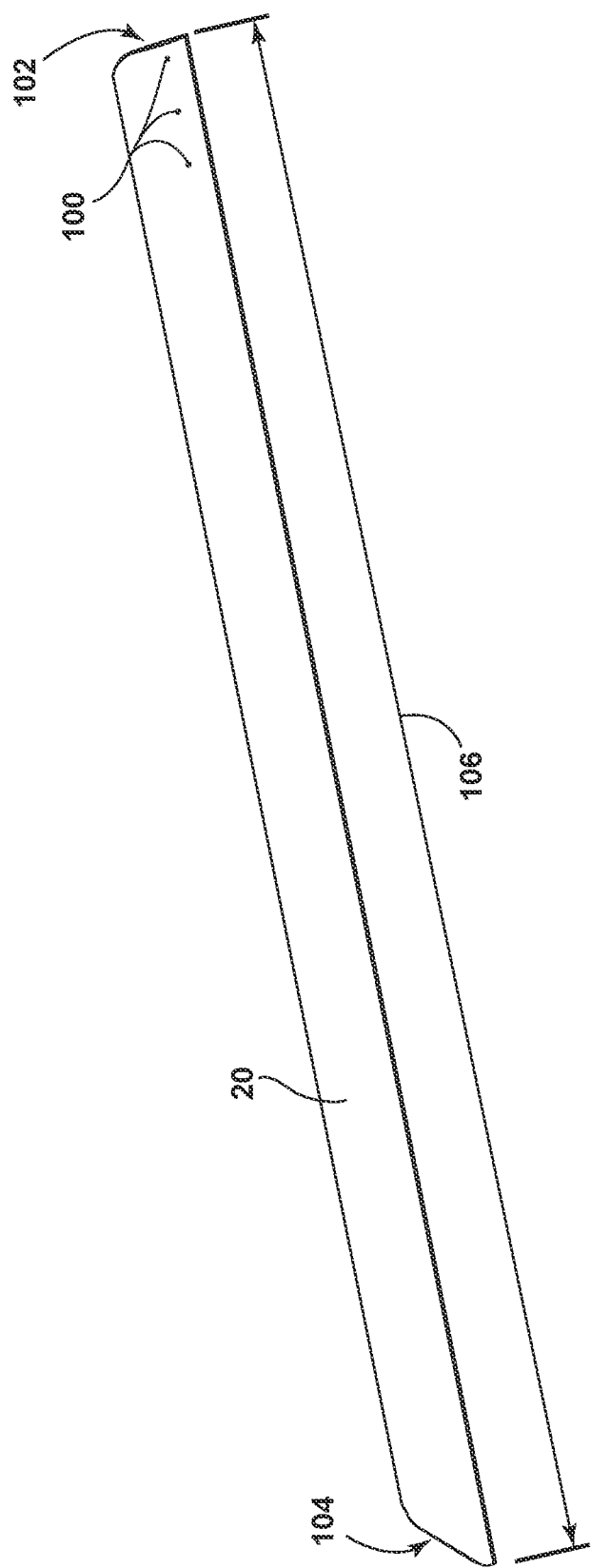
FIG. 3A is a top view of a fan blade of the ceiling fan of FIG. 1.
Figure 3B:
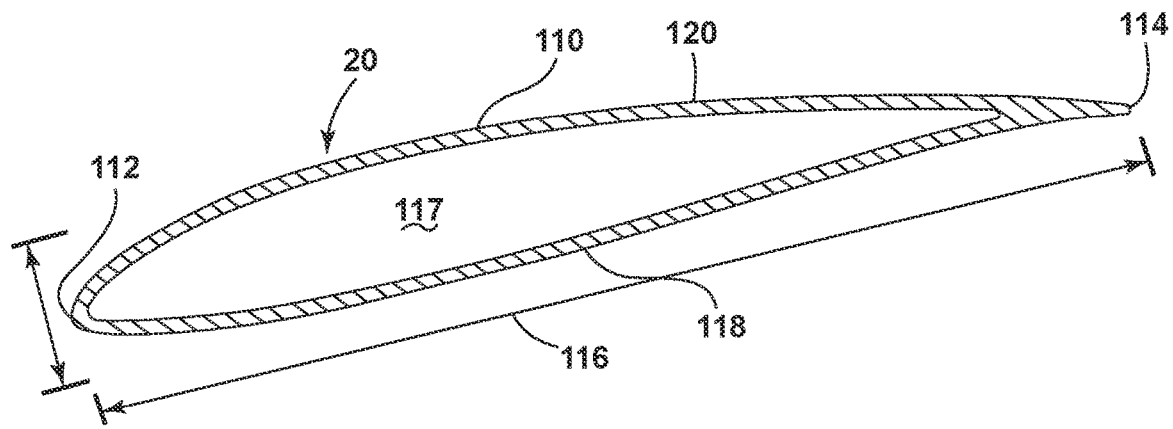
FIG. 3B is a cross-sectional view of the blade of FIG. 3A.

Turning now to FIG. 3A, a top view of the blade 20 illustrates three mount holes 100 on a first end 102 and a second end 104 opposite of the first end 102. The mount holes 100 can mount the blade to the motor assembly 16. The blade 20 can further comprise a blade span 106 as the distance between the first end 102 and the furthest end of the second end 104. The blade 20 can have an airfoil 110 cross section, as shown in FIG. 3B, with a leading edge 112 and a trailing edge 114 defining a chord 116 as the straight line distance between the leading edge 112 and the trailing edge 114. In one example, the blade chord 116 can be about seven inches (in.) and can be between six and eight inches. The airfoil 110 can be non-symmetrical and can have an interior chamber 117.

Figure 3C:
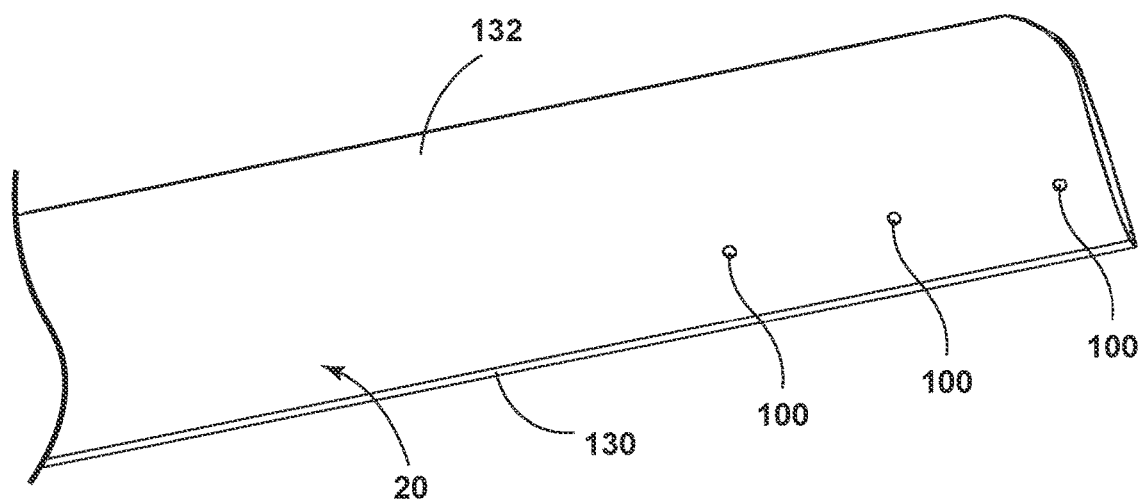
FIG. 3C is a close-up view illustrating a two-part embodiment of the blade of FIG. 3A.

The blade 20 can further include a pressure side 118 and a suction side 120, having the pressure side 118 facing toward a ground surface below the ceiling fan 10 and the suction side 120 facing the ceiling from which the ceiling fan 10 is mounted. A blade thickness 122 can be the greatest distance between the pressure side 118 and the suction side 120. The blade 20, as see in FIG. 3C, can also be two-part, being the combination of a leading member 130 and a trailing member 132 coupled together.

The blade thickness 122 can be adapted such that a thickness to chord ratio can be less than 0.14 and can be greater than 0.13. For example, the blade chord 116 can be 7.01 inches and the thickness 122 can be 0.97 inches having a thickness-to-chord ratio of 13.8% or 0.138. The blade chord 116 and thickness 122 can be changed relative to one another to maintain the thickness-to-chord ratio of about 13.8%. Furthermore, the blade 20 can adapted to rotate at a rotational speed defined by revolutions per minute (rpm). Rotational speed of the blade 20 can be dependent on the blade span 106 or total ceiling fan width. The total ceiling fan width can be the diameter defined by a circle defined by the outermost rotation of the blades 20. In one example, fan 10 can have a total width of 24 feet having blade spans 106 of about 12 feet, a chord 116 of 7.01 inches, and a thickness 122 of 0.97 inches. The exemplary fan 10 can be adapted to rotate at a particular rotational speed to generate a particular volumetric flow rate or air speed It should be understood that the dimensions of the blade span 106, total fan width, blade chord 116, and blade thickness 122 rotating at a determined rotational speed can be determinative of the the maximum wind speed generated by the fan as well as volumetric flow rates. Alternatively, the wind speeds generated by the fan 10 can be determined based upon consumer preference, which can be determined by the need for fan-driven airflow. For example, a hotter or more stagnant environment will require a greater wind speed to maintain appropriate temperatures, while a cooler or open environment will require less wind speed to maintain temperatures. It can be appreciated, adapting the span 106, chord 116, thickness 122, chord-to-thickness ratio, rotational speed, or otherwise can maximize efficiency of the fan 10, by improving temperature management, volumetric airflow, or airspeed while minimizing energy consumption.

It should be appreciated that the blades 20 have a thickness-to-chord ratio of about 13.8% and include an airfoil shape to maximize efficiency of the blades 20. The blade span 106, chord 116, thickness 122, rotational speed, and pitch can be adapted to maximize efficiency, airspeed, and airflow volume during operation of the ceiling fan 10.

Figure 4A:
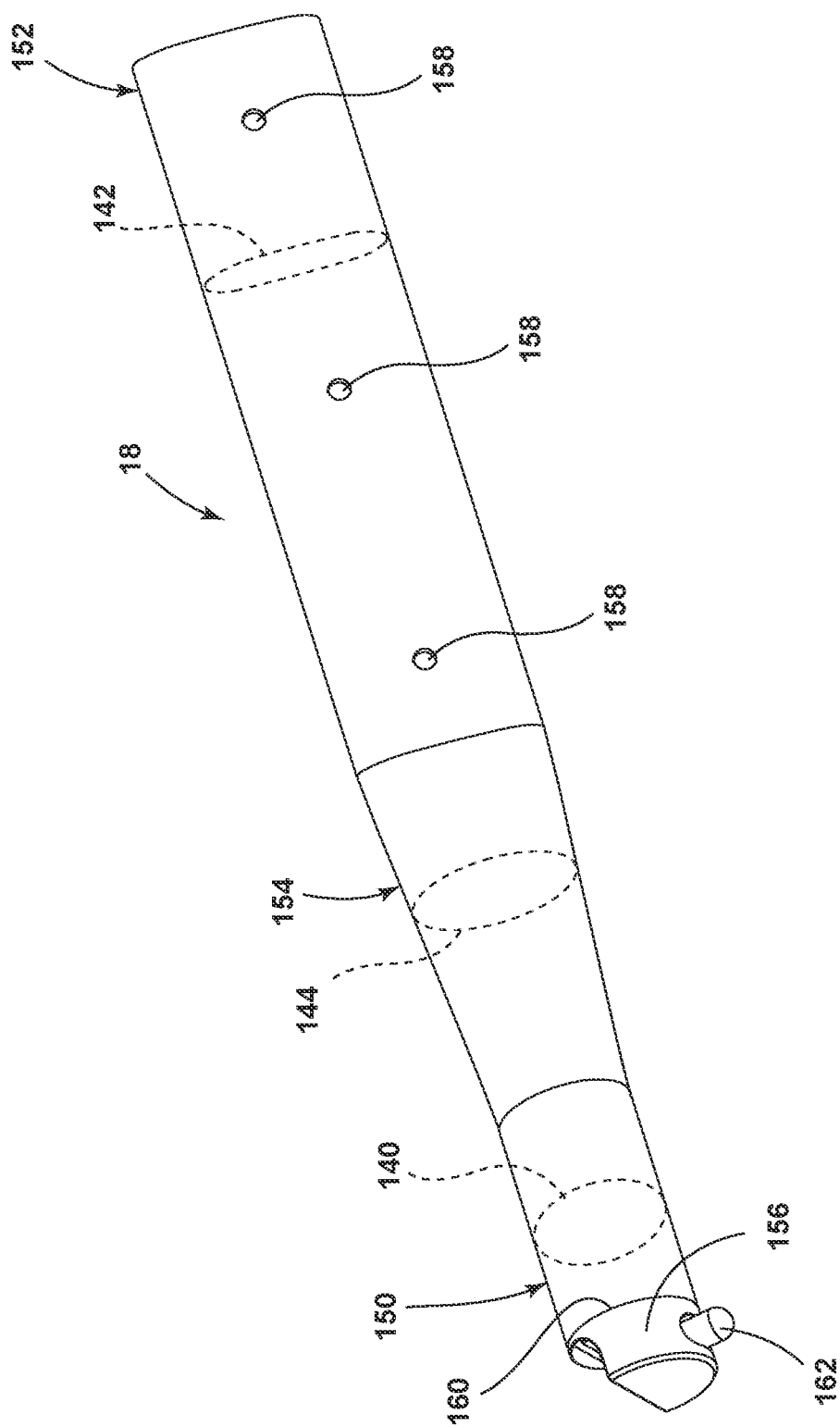
FIG. 4A is a perspective view a blade holder of the ceiling fan of FIG. 1.

Turning to FIG. 4A, focusing on the blade holder 18, the blade holder 18 includes a first end 150 and a second end 152 opposite of the first end 150. The first end 150 can have a first cross section, such as circular cross-section 140 and the second end 152 can have second cross-section, such as elliptical cross section 142. The first and second cross sections 140, 142 can be different from one another, while it is also contemplated that they can be the same. Further, the height of the first cross-section 140 can be greater than that of the height of the second cross-section 142. The cross-sections 140, 142 can each define a cross-sectional area for the first and second ends 150, 152. The cross-sections 140, 142 can have the same area, while the shapes are different. Alternatively, the cross-sectional areas for the shapes can differ. The first and second ends 150, 152 can connect by a transition section 154. The transition section 154 can have a cross-section 144 transitioning from the first cross-section 140 to the second cross-section 142, such as transitioning from the circle to the ellipse.

The blade holder 18 can comprise a single machined piece, or can be a combination of multiple parts, such as welding the first and second ends 150, 152 to the transition section 154. The second cross-section 142 can be formed by stamping from an initial shape. For example, the entire blade holder 18 can be machined having a circular cross-section. The second end 152 and part of the transition section 154 can be stamped or compressed to form the appropriate second cross-sections 142, 144.

The first end 150 can have a push-lock assembly 156 closing the first end 150. The motor assembly 16 having the rotating blade hub, can have a first receiver which can comprise the blade hub of FIG. 5A. The second end 152 can have mounting apertures 158 complementary to the mount holes 100 of the blades 20 such that the second end 152 is received within the interior chamber 117 of the blade 20 operating as a second receiver. Thus, the blade 20 can couple to the motor assembly 16 utilizing the blade holder 18. The interconnection between the blade 20, blade holder 18, and blade hub are further described below during the discussion of FIG. 5B.

Figure 4B:
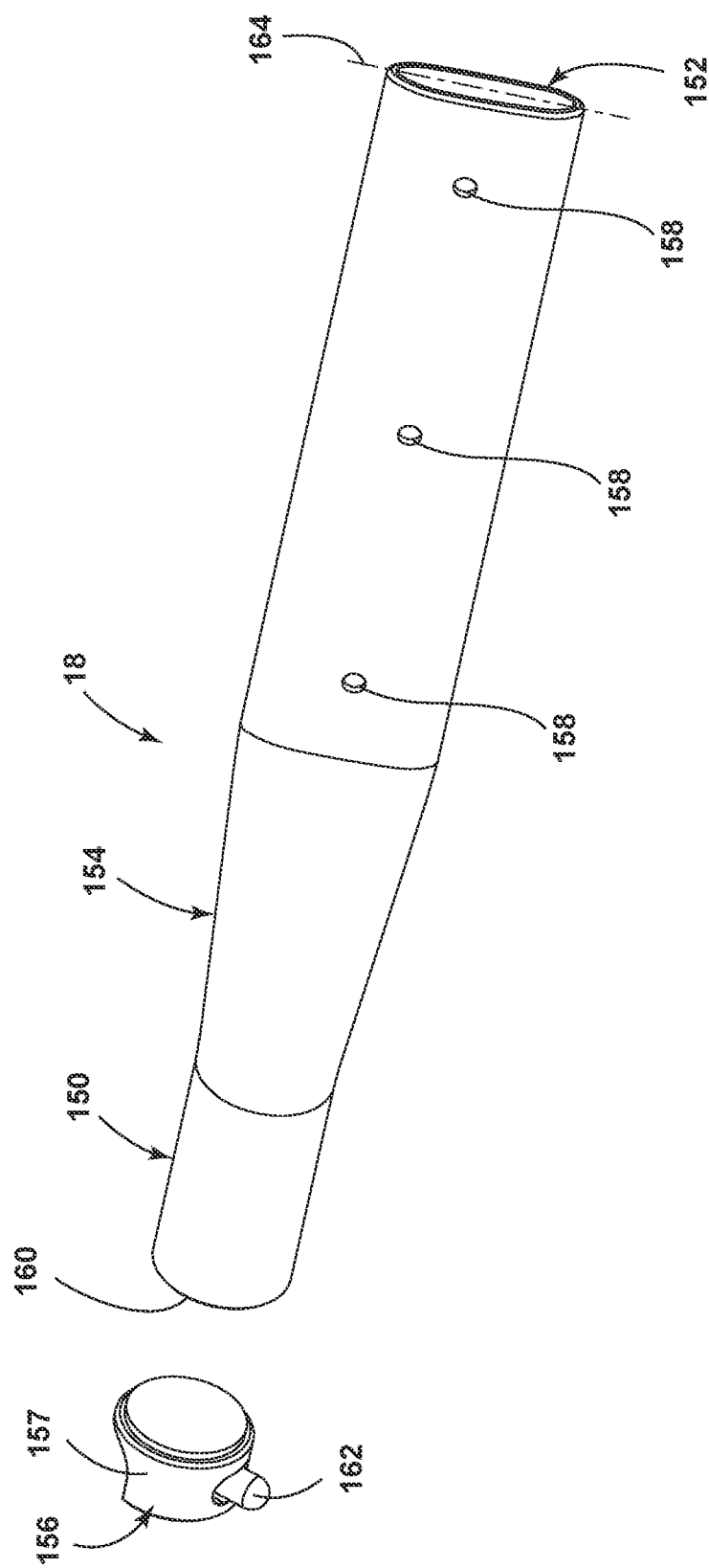
FIG. 4B is an exploded view of the blade holder of FIG. 4A having a push-lock assembly removed.

The first end 150 includes an opening 160 for receiving the push-lock assembly 156. The push-lock assembly 156 can further include an index 157 having a biased detent, such as a spring-loaded pin 162 extending radially from one side of the push-lock assembly 156. Turning to FIG. 4B, illustrating the push-lock assembly 156 exploded from the body of the blade holder 18, the push-lock assembly 156 mounts to the first end 150 at the opening 160, such as by welding, and can mount relative to the blade holder 18 to orient the blade holder 18 at an angle relative to the pin 162. For example, the second cross-section 142 at the second end 152 can define a major axis 164. The push-lock assembly 156 can mount to the first end 150 to orient the pin 162 at an angle of five degrees offset from the major axis 164. Thus, a blade 20 mounted to the second end 152 can be disposed at an angle offset by five degrees from the pin 162 and can define a pitch for the blades 20 upon mounting the blade holder 18 to the motor housing 198. The pitch is the angle of attack of the blades 20 into the air to control the production of a flow of air through which the blades 20 sweep.

Figure 4C:
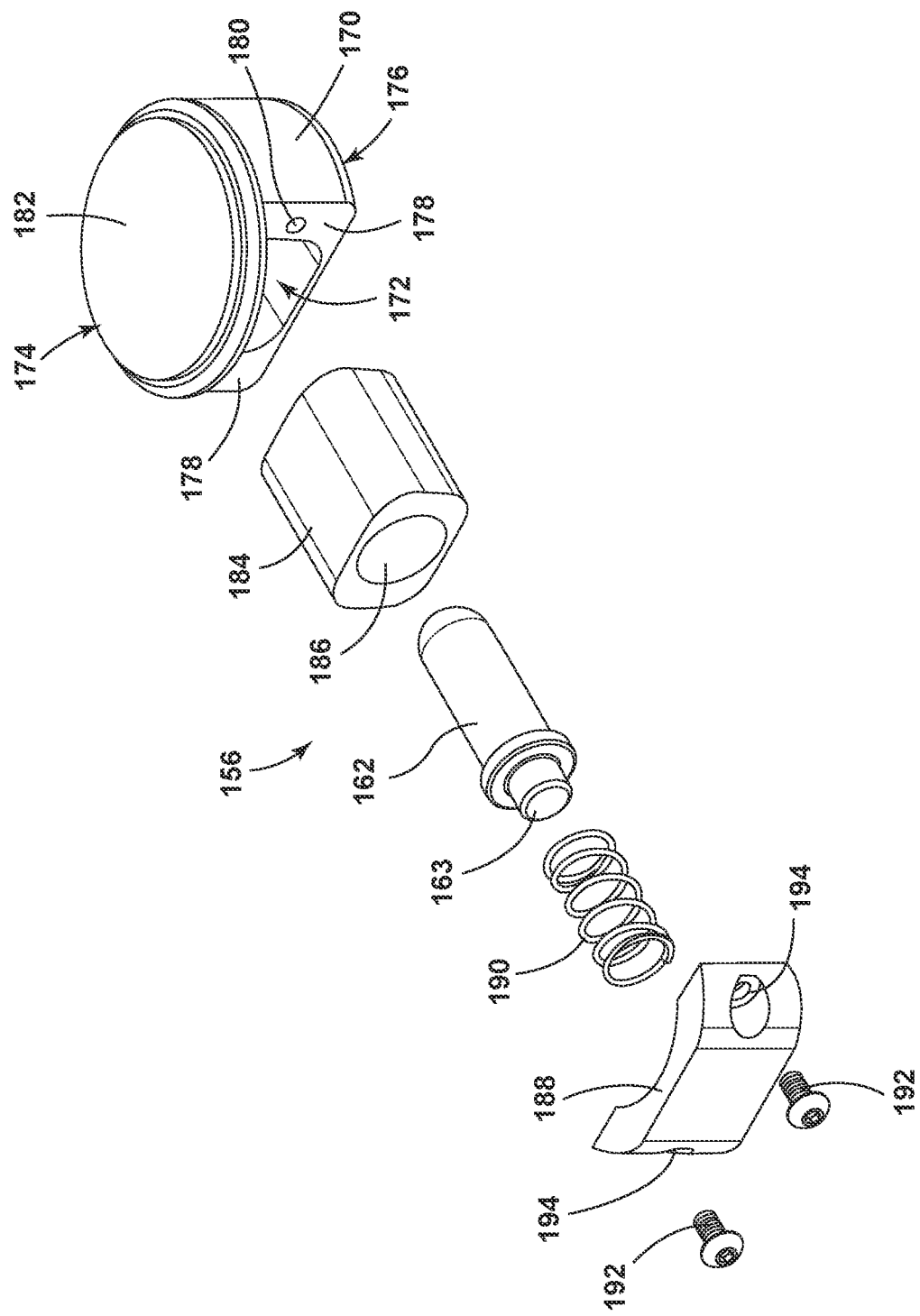
FIG. 4C is an exploded view of the push-lock assembly of FIG. 4B.

Looking at FIG. 4C, an exploded view illustrates the components included with the push-lock assembly 156. The push-lock assembly 156 includes a body 170 having an interior 172. The interior 172 is defined by a top 174 and a bottom 176 of the body 170, having two shelves 178 disposed between the top 174 and bottom 176 on either side of the interior 172. Each shelf 178 includes a fastener aperture 180. The top 174 includes a circular extension 182 adapted to be received at the opening 160 of the first end 150 for mounting thereto. An internal body 184 is sized to be received within the interior 172 of the body 170. A pin interior 186 is disposed in the internal body 184 for receiving insertion of the pin 162. The pin 162 includes a pin extension 163. Insertion of the pin 162 into the pin interior 186 and insertion of the internal body 184 into the interior 172 positions the pin 162 extending out through the opposite end of the body 170 as shown in FIG. 4B. A plate 188 positioned behind the internal body 184 secures a spring 190 behind pin 162 within the internal body 184. The spring 190 is positioned around the pin extension 163 and sandwiched between the pin 162 and the plate 188. The pin extension 163 has an arcuate surface shaped to abut the plate 188. The arcuate surface of the pin extension 163 and a concave inner end 189 of the plate 188 provides for slight movement of the pin 162 beyond straight linear movement. This facilitates insertion of the pin 162 into the mounts 204 on the motor housing 198 during installation of the blade holders 18. Additionally, the arcuate outer surface 191 of the plate 188 is complementary to the body 170 form a cylindrical outer surface for the push-lock assembly 156. Fasteners 192, such as screws can insert into second fastener apertures 194 within the plate 188 for mounting the plate 188 at the shelves 178, securing the spring 190 behind the pin 162 within the body 170, forming the completed push-lock assembly 156 seen in FIG. 4B. The spring 190 permits actuation of the pin 162 for coupling the blade holder 18 to the motor assembly 16 with the push-lock assembly 156.

It should be appreciated that the blade holders 18 facilitate mounting of the blades 20 to the motor assembly 16. The size and shape of the blade holders 18 minimizes system weight while maximizing structural integrity, which improves overall efficiency. For example, the blade holder 18 can be thin walled steel to achieve the minimal weight and maximum integrity. The blade holders 18, including the push-lock assembly 156 with the pin 162, determines the blade pitch. Thus, based upon blade features such as span, the push-lock assembly 156 can be manufactured to orient the blades 20 at an optimal pitch to maximize efficiency without requiring such a determination by an installer or consumer.

Figure 5A:
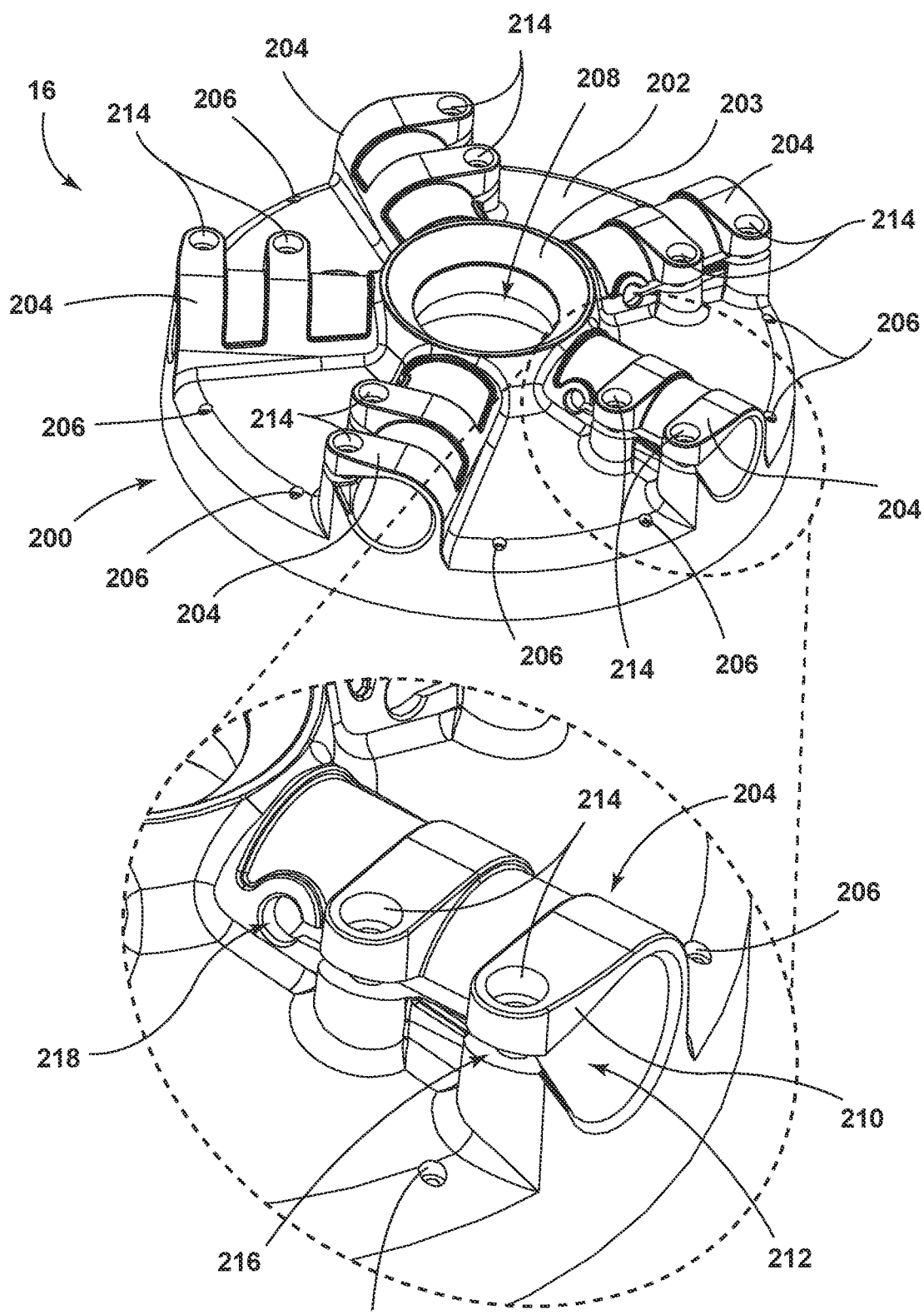
FIG. 5A is a top perspective view of an upper portion of a motor housing with a close-up section of a blade mount.

FIG. 5A shows the upper portion 200 of the rotatable motor housing 198 comprising a portion of the outer shell for the motor assembly 16. The upper portion 200 further comprises a blade hub 202 having a central hub 203 integral with the rotatable motor housing 198. Upper portion 200 includes five mounts 204 for receiving the blade holders 18 to mount the blades 20. While five mounts 204 are shown, any number of mounts 204 are contemplated. The upper portion 200 further includes a plurality of mounting apertures 206 for mounting to a lower portion (see FIG. 6) and has a central aperture 208 for mounting the motor assembly 16 to the downrod assembly 14 at the shaft coupler 52 of FIG. 2B or 2C.

FIG. 5A also shows a close-up view of one mount 204. The mount 204 includes a split sleeve 210 defining a sleeve interior 212. The split sleeve 210 has two sets of compression fittings 214 for tightening or loosening the split sleeve 210. The split sleeve 210 and compression fittings 214 are integrally formed with the rotatable motor housing 198. The split sleeve 210 further includes a slit 216 extending along one side of the longitudinal length of the mount 204. The slit 216 terminates at a pin-lock aperture 218 and is sized to accept slidable insertion of the pin 162 of the push-lock assembly 156 of FIGS. 4A-4C. The pin-lock aperture 218 operates as a blade rotation stop to prevent rotation of an attached blade 20 about a longitudinal axis, which could otherwise change the blade pitch during operation.

Figure 5B:
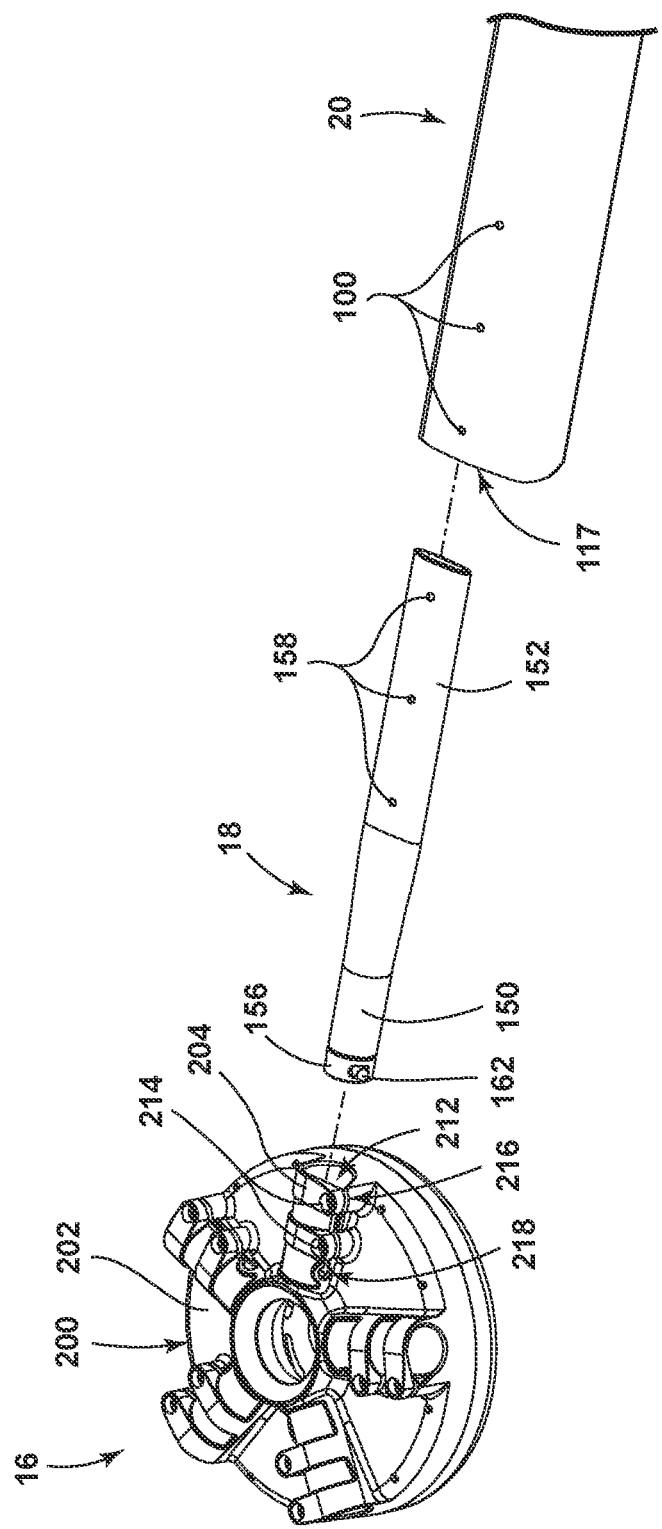
FIG. 5B is an exploded view illustrating the combination of the upper portion of the motor housing, blade holder, and blade.

Turning to FIG. 5B, for connection of the blade 20 to the motor assembly 16 via the blade holder 18, the push-lock assembly 156 is mounted on the first end 150 of the blade holder 18 having the pin 162 oriented at an angle to determine the pitch of the blade 20. The mount 204 can be a first receiver for receiving the first end of the blade holder 18. The pin 162 slides into the slit 216 and inboard of the compression fittings 214, depressing the pin 162 within the push-lock assembly 156. The first end 150 slides into the sleeve interior 212 unit the pin 162 is received within the slit 216 by rotating the blade holder 18. After rotating, the blade holder 18 is moved inwardly until the pin 162 is received in the pin-lock aperture 218 and the spring 190 pushes the pin 162 outwardly, locking the blade holder 18 to the mount 204. Alternatively, the blade holder 18 can be fully inserted into the mount 204 and rotated until the pin 162 is received in the pin-lock aperture 218. Fasteners (not shown), such as a screw or bolt, insert into the compression fittings 214 of the mount 204, tightening the compression fittings 214 of the split sleeve 210 to secure the blade holder 18 to the mount 204 and to prevent the pin 162 from sliding out of the pin-lock aperture 218.

After insertion of the blade holder 18 into the motor housing 198, the disposition of the pin 162 based upon mounting to the index 157 fixes the rotation of the circular first cross-section 140 and orients the second end 152 of the blade holder 18 at an angle relative to a horizontal plane, which can be defined, for example, relative to the horizontal plane such as the ceiling or floor of the structure to which the fan 10 mounts. Alternatively, the pin 162 can orient the blade 20 relative to the blade hub 202.

The blade 20 can be a second receiver for receiving the second end 152 of the blade holder 18, having the second receiver located within the interior of the blade 20. The blade 20 can mount to the blade holder 18 sliding the blade 20 over the second end 152 and into the interior chamber 117, and aligning the mount holes 100 with the mounting apertures 158. Fasteners can secure the blade 20 to the blade holder 18 by utilizing mount holes 100 and mounting apertures 158. The angular disposition of the second end 152, based upon the orientation of the pin 162 and the push-lock assembly 156 defines the pitch of the blade 20. For example, positioning the pin 162 at five degrees offset from the major axis 164 of the ellipse of as shown in FIG. 4B can orient the pitch of the blade 20 at five degrees relative to the ceiling or floor of the structure.

During operation, a torque generated by the motor assembly 16 can define the rotational speed for the fan 10. The rotational speed of the fan 10 in combination with the blade pitch can determine a volumetric flow rate for air movement by the fan 10. The volumetric flow rate can be the volume of air moved by the fan 10 during operation based upon the motor torque and the blade pitch. The blade span 106 can proportionally increase or decrease the volumetric flow rate, as a longer blade 20 generates greater airflow and a shorter blade 20 generates less. However, greater motor torque is required to drive a longer blade 20 at the desired rotational speed as compared to a shorter blade. In order to maximize flow rates while operating within the capabilities of the motor to generate torque, the blade pitch can be predetermined during manufacture based upon the span 106 of the blades 20. For example, for a blade span 106 of about 12 feet or a total diameter of 24 feet, the pin 162 can be oriented to define a blade pitch of 8 degrees, while a blade span 106 of about 6 feet or total diameter of 12 feet can have a blade pitch of 12 degrees. Thus, the fan having a smaller area through which the blades sweep can have a greater pitch to drive a greater volume of airflow within the motor operational capabilities. It should be understood that the blade spans, fan diameters, and blade pitches as described are exemplary, illustrating that the blade pitch can be determined by fan diameter in order to maximize volumetric airflow or airspeed based upon operational capabilities of the motor.

Thus, mounting the push-lock assembly 156 to orient the pin 162 at the predetermined blade pitch angle can facilitate orienting the blades 20 at a pitch based upon the blade span 106 to maximize volumetric flow rate within motor torque capabilities. As such, the need for a consumer or installer to determine the proper pitch or attempt to properly orient the blades 20 at a pitch to maximize flow rate is eliminated. This elimination is due to supplying each fan blade 20 with a corresponding blade holder 18 having the predetermined blade pitch angle. It should be understood that the pitch is independent of the blade span 106. The pitch can be any angle and the blade span 106 can be any length. It should be appreciated, however, that determining pitch based upon span 106 is beneficial to maximizing volumetric airflow based upon capabilities of the motor such as torque.

It should be appreciated that the blade hub 202 facilitates attachment and improves security of the blade holders 18. The split sleeve 210 and pin-lock aperture 218 accurately aligns blade pitch among all mounted blades 20. The compression fittings 214 secure the blade holders 18 to the blade hub 202 with easy tightening of mechanical fasteners. The integral mounts 204 with the rotating blade hub 202 enables rotational operation without requiring additional elements for rotating the blades 20.

Figure 6:
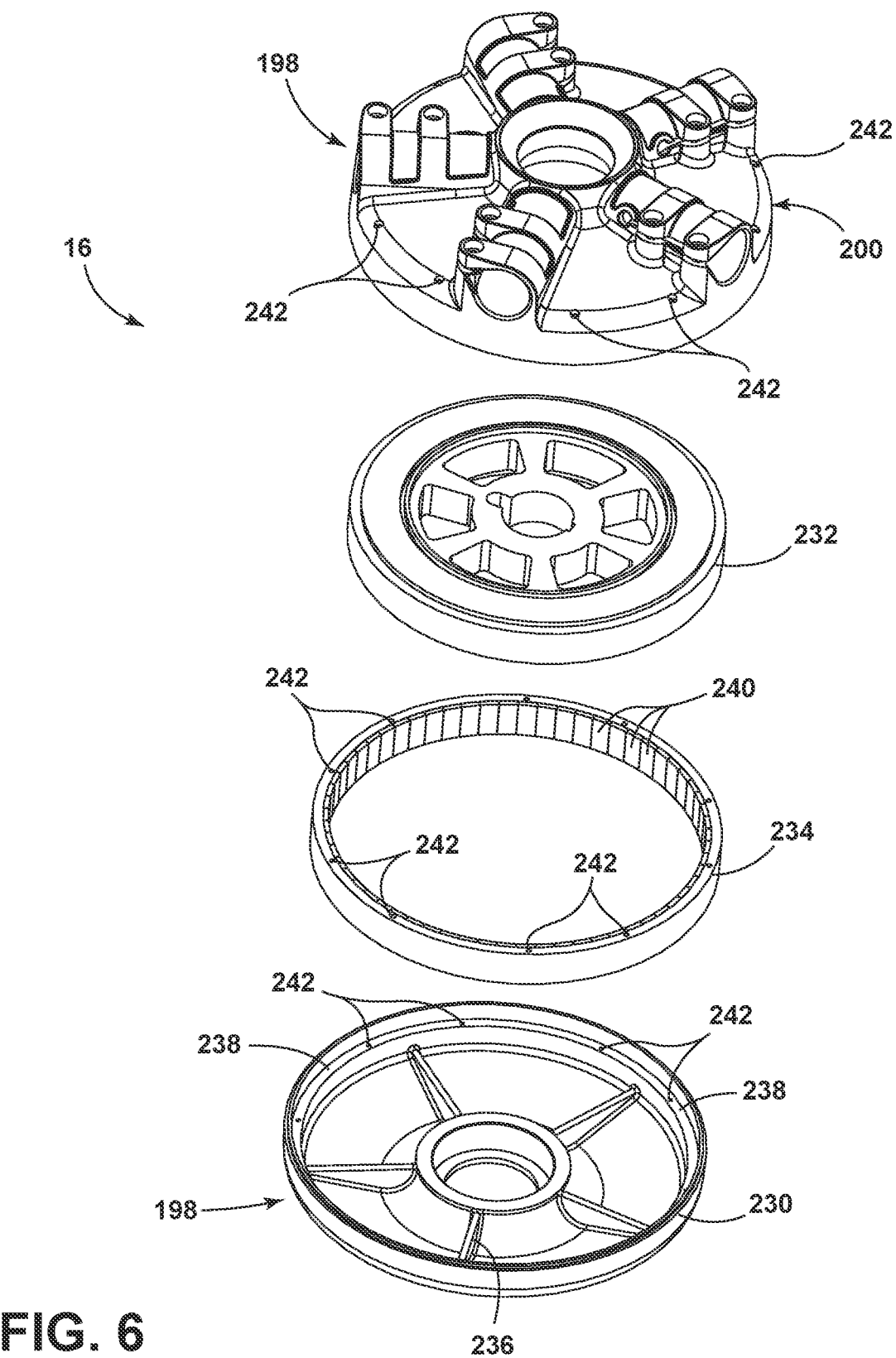
FIG. 6 is an exploded view of a portion of a motor housing assembly of FIG. 1.

FIG. 6 illustrates an exploded view of the motor assembly 16 comprising the upper portion 200 of the motor housing 198 and the lower portion 230 of the motor housing 198 for encasing the stator 232 and rotor 234. The stator 232 can including a coil winding of conductive material and the rotor 234 can include a plurality of magnets 240. Alternatively, the stator 232 can include the magnets 240 and the rotor 234 can include a winding. The upper and lower portions 200, 230 can couple and rotate together to define the rotating motor housing 198. The upper and lower portions 200, 230 can further include a magnet seat 238 as an annular surface for supporting the plurality of magnets 240 mounted to the rotor 234 or forming a portion of the rotor 234. The magnet seat 238 can include complementary channels formed in each of the upper and lower portions 200, 230 of the motor housing 198 to collectively form the magnet seat 238. The magnets 240 can be permanent magnets or an electromagnet comprising a motor winding. The rotor 234 and upper and lower portions 200, 230 can have a plurality of mount holes 242 for mounting the rotor 234 to motor housing 198 utilizing, for example, mechanical fasteners such as a screw or bolt. The upper and lower portions 200, 230 can each have an edge 243. The horizontal edges 243 can abut one another when mounting the upper and lower portions 200, 230. Alternatively, the upper and lower portions 200, 230 can be space by a gap (not shown) between the edges 243, exposing a portion of the rotor 234 through the gap.

During operation, electric current is provided to the stator 232 causing the rotor 234 to rotate about the stator 232. By mounting the rotor 234 to the upper and lower portions 200, 230, the motor housing 198 can rotate about stator 232, rotating any blade holders 18 and blades 20 attached thereto.

It should be appreciated that the motor housing 198 is a clamshell style housing having upper and lower portions 200, 230 for mounting directly to the rotor 234 for rotating the entire motor housing 198, blade hub 202, and blades 20 coupled thereto. The motor housing 198 enables a rotor 234 and stator 232 combination to be housed within the motor assembly 16 suspended from the downrod assembly 14 without requiring a motor assembly 16 to be completely rotationally mounted. Operational wear, vibration, and wobble are minimized while lifetime is increased.

Figure 7A:
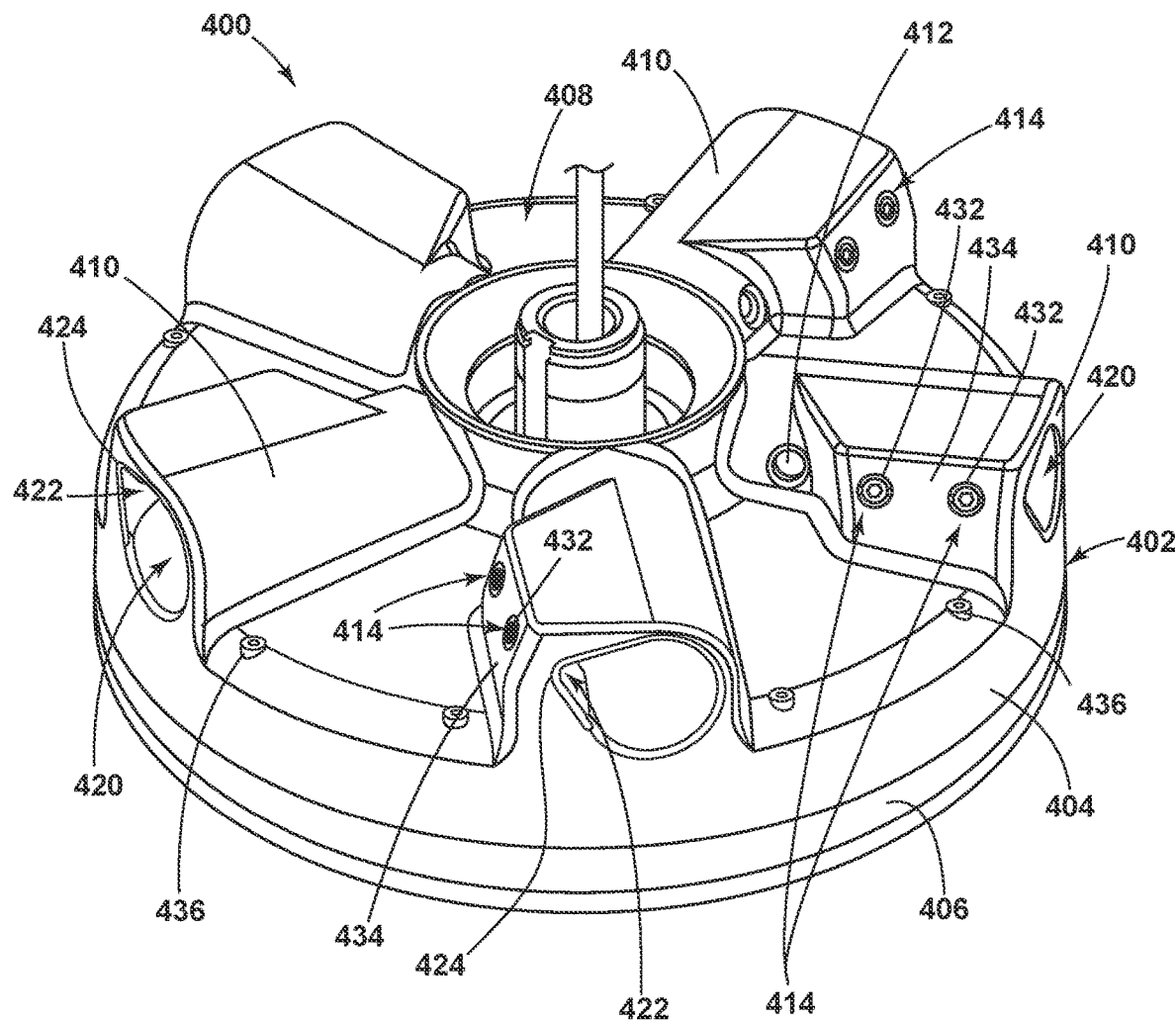
FIG. 7A is a top perspective view of an alternative motor housing assembly.

Referring now to FIG. 7A, an alternative motor assembly 400 is illustrated including a rotatable housing portion 402 having an upper portion 404 and a lower portion 406 forming the rotatable housing portion 402. A rotating blade hub 408 is included on the rotatable housing portion 402 and can be integral with the upper portion 404. At least one blade mount 410 is provided on the blade hub 408, such as five blade mounts 410 in one example. Each blade mount 410 includes a pin aperture 412 and at least one fastener aperture 414. The pin aperture 412 can be substantially similar to the pin-lock aperture 218 of FIG. 5A, in one example.

The blade mounts 410 can define a substantially cylindrical cavity 420. A channel 422 can be formed in the blade mounts 410 such that the cavity 420 includes an enlarged portion 424 at the channel 422. In one example, the channel 422 can be used to guide the pin 162 toward the pin aperture 412 for locking the blade holder 18 to the motor assembly 400 at the blade mount 410.

The fastener apertures 414 can each include an inserted fastener 432. The fastener 432, for example, can be any suitable fastener, such as a setscrew or grub screw. The fastener apertures 414 are disposed in a face 434. The fastener apertures 414 extend from the face 434 through the blade mounts 410 to the cavity 420. Additionally, a plurality of housing fasteners 436 can be used to secure the upper portion 404 to the lower portion 406, as well as securing a rotor through mount holes similar to that of FIG. 6.

Figure 7B:
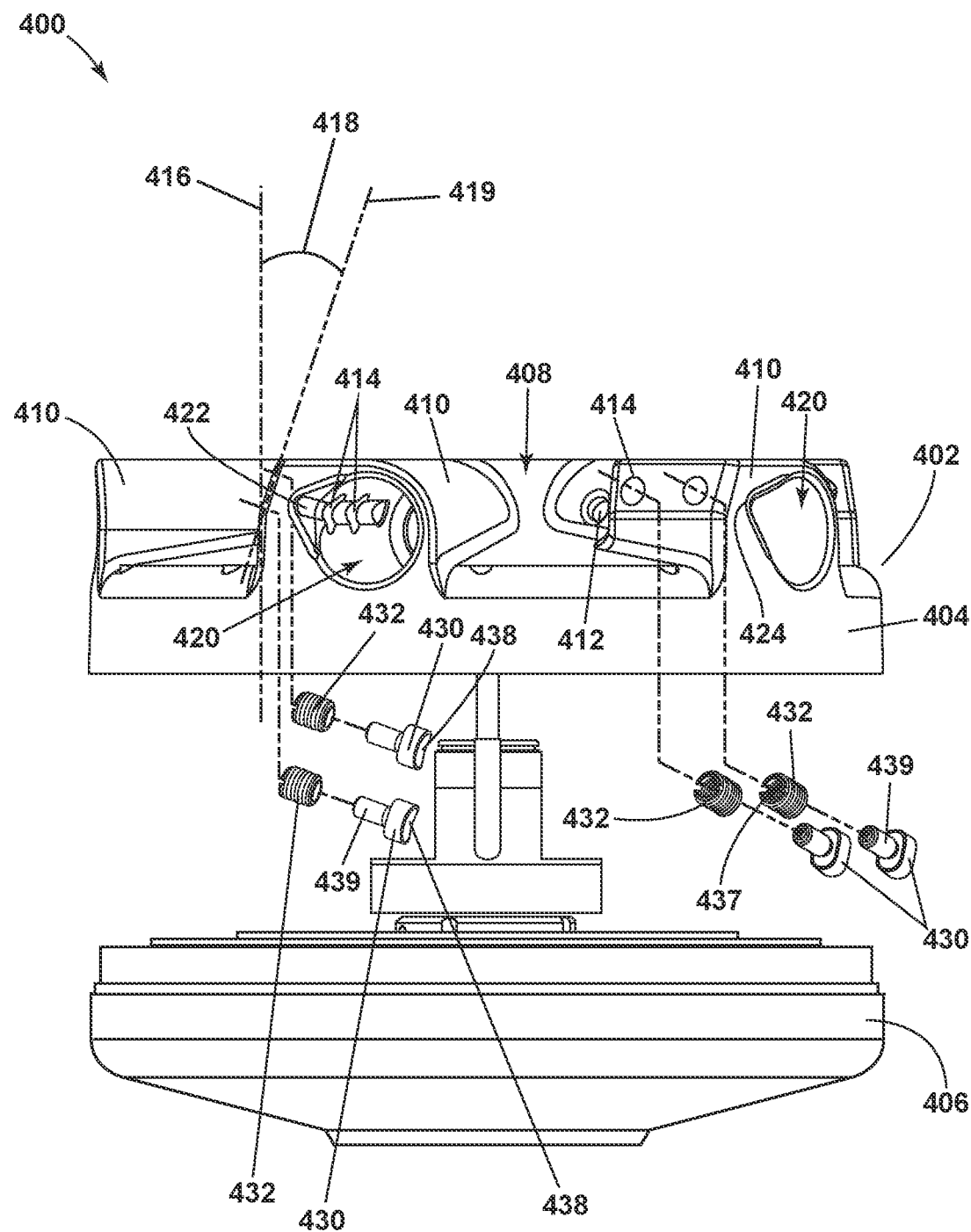
FIG. 7B is an exploded view of the motor housing assembly of FIG. 7A.

Referring now to FIG. 7B, an exploded view illustrates a set of two fasteners 432 and two saddles 430. The fastener 432 and the saddle 430 can be separate or integral, or coupled permitting rotation of the fastener 432 without rotating the saddle 430. The saddles 430 include a curved surface 438 opposite of the fastener 432 and a post 439. The fastener 432 can have a hollow interior 437, adapted to receive the post 439 and enabling rotation of the fastener 432 about the post 439.

The face 434 can be offset from a vertical axis 416 at an angle 418 from a face axis 419. The angle 418 can be any suitable angle, such as 20 degrees in one non-limiting example, in order to align the fastener apertures 414 radially to the center of the cavity 420. Furthermore, the angled face 434 provides easy access to the fasteners 432 in the fastener apertures 414 by a user.

Figure 7C:
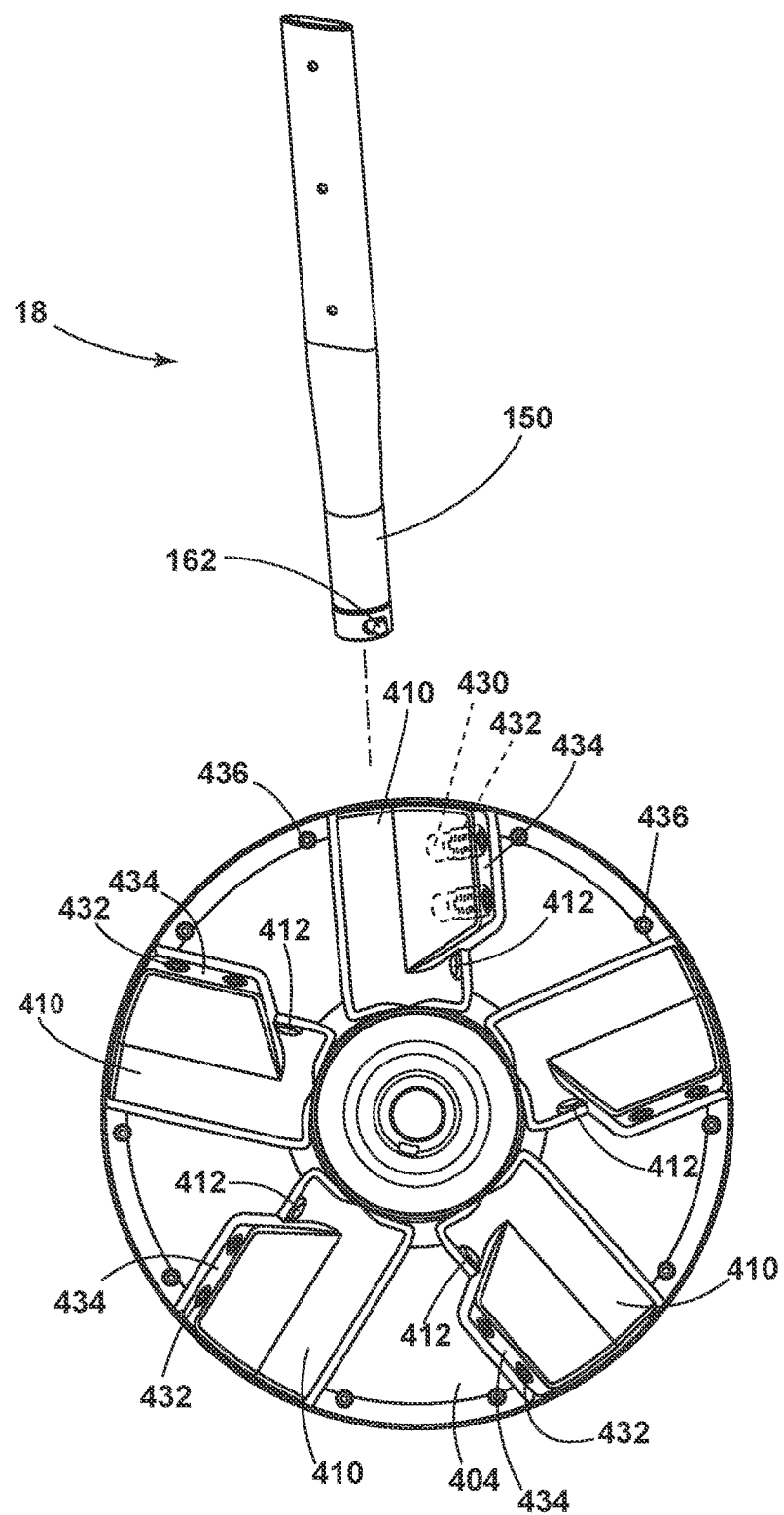
FIG. 7C is a top view of the motor housing assembly of FIG. 7A with a blade holder exploded from the motor housing assembly.

Referring now to FIG. 7C, in operation, the user can tighten or loosen the saddle 430 within the cavity 420 by tightening or loosening the fastener 432. A user inserts the blade holder 18, such as that of FIG. 5B, into the blade mount 410. The pin 162 on the blade holder 18 aligns along the channel 422 and the blade holder 18 inserts until the pin 162 secures in the pin aperture 412.

After insertion of the blade holder 18, the fastener 432 can be used to tighten the saddle 430 against the first end 150 of the blade holder 18 inserted within the blade mount cavity 420. The tightened saddle 430 abuts the blade holder 18 at the curved surface 438 to apply pressure to the first end 150 of the inserted blade holder 18 to provide a secondary securing means for the blade holder 18.

The saddle 430 is oriented at the angle 418, such as the 20-degree angle, as defined by the face 434, and can orient the saddle 430 radially from the center of the blade holder 18. The radial orientation of the saddle 430 against the inserted blade holder 18 prevents rotation of the blade holder 18 based upon the insertion force from the saddle 430. This radial insertion further prevents rotational movement of the pin 162 inserted within the pin aperture 412 against the blade mount 410, which can tend to otherwise crack the blade holder 18.

It should be appreciated that the motor assembly 400 and the blade hub 408 can be substantially similar to the motor assembly 16 and blade hub 202 of FIG. 5B, for accepting the insertion of a blade holder 18 for coupling the blade 20 to the motor assembly 400. The saddles 430 provide for a secondary retention system for the blade hub 408, as well as can reduce vibration, noise, or wobble of the ceiling fan, which can increase overall fan efficiency.

Figure 8A:
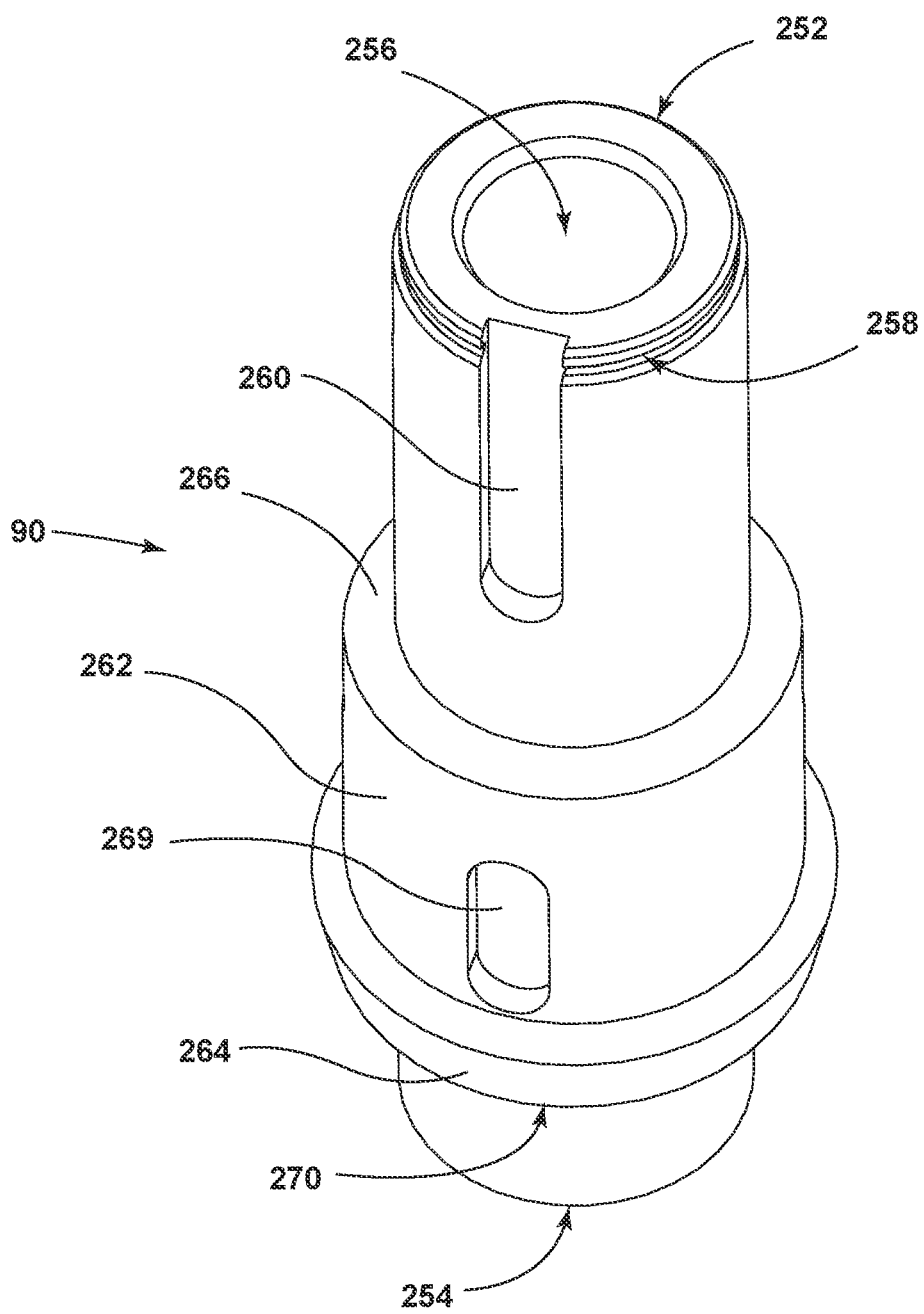
FIG. 8A is a perspective view of the motor shaft of FIG. 2C.

FIG. 8A is one example of the non-rotating motor shaft 90. The motor shaft 90 includes an upper end 252 and a lower end 254 having a hollow interior 256. The exterior surface of the upper end 252 includes a threaded connection 258 for coupling a collar which can include the shaft coupler 52 of FIG. 2B, the retainer nut 92 of FIG. 2C, or a combination of both. A keyed recess 260 can be disposed at the upper end 252 for alignment with the shaft coupler 52 at coupling. The motor shaft 90 can further include an upper collar 262 and a lower collar 264, with the upper collar 262 having an increased outer diameter and the lower collar 264 having a further increased outer diameter, being greater than that of the upper collar 262. The upper collar 262 includes a step-wise increase in outer diameter for the motor shaft 90 defining an annular upper bearing stop 266. The upper collar 262 further includes a wiring opening 269. The lower collar 264 includes a further step-wise diameter increase from the upper collar 262, defining a stator stop 268 for supporting the stator winding 232. Underneath the lower collar 264 is a step-wise decrease in diameter defining a lower bearing stop 270.

Figure 8B:
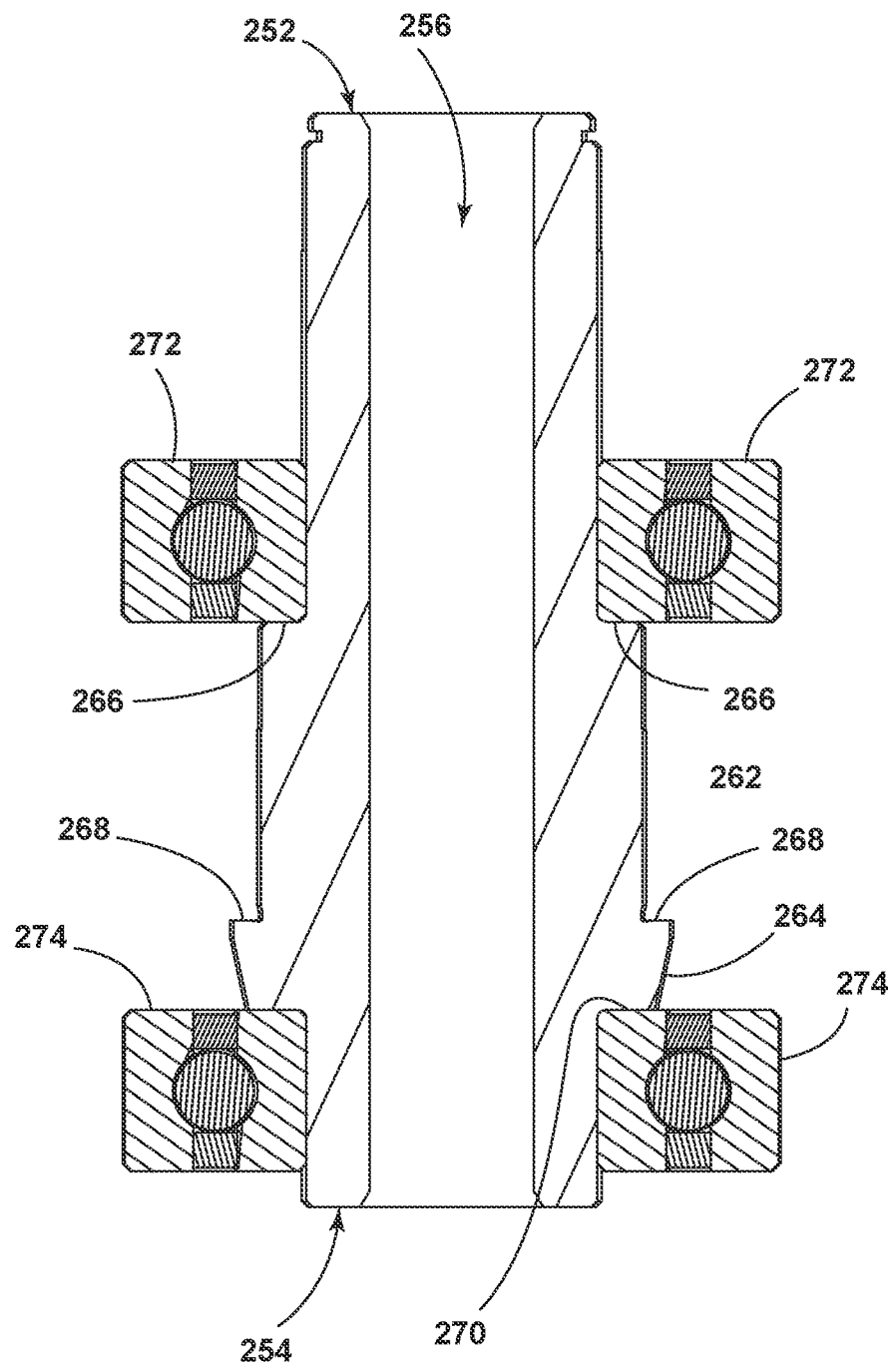
FIG. 8B is a cross-sectional view of the motor shaft of FIG. 8A including bearings.

As shown in FIG. 8B, the upper and lower bearings 272, 274 are disposed on the upper bearing stop 266 and the lower bearing stop 270, respectively. The upper and lower bearing stops 266, 270 are formed within the motor shaft 90 for positioning the bearings 272, 274 against the motor shaft 90 and permitting rotation of the motor housing 198 about the non-rotating motor shaft 90.

Figure 8C:
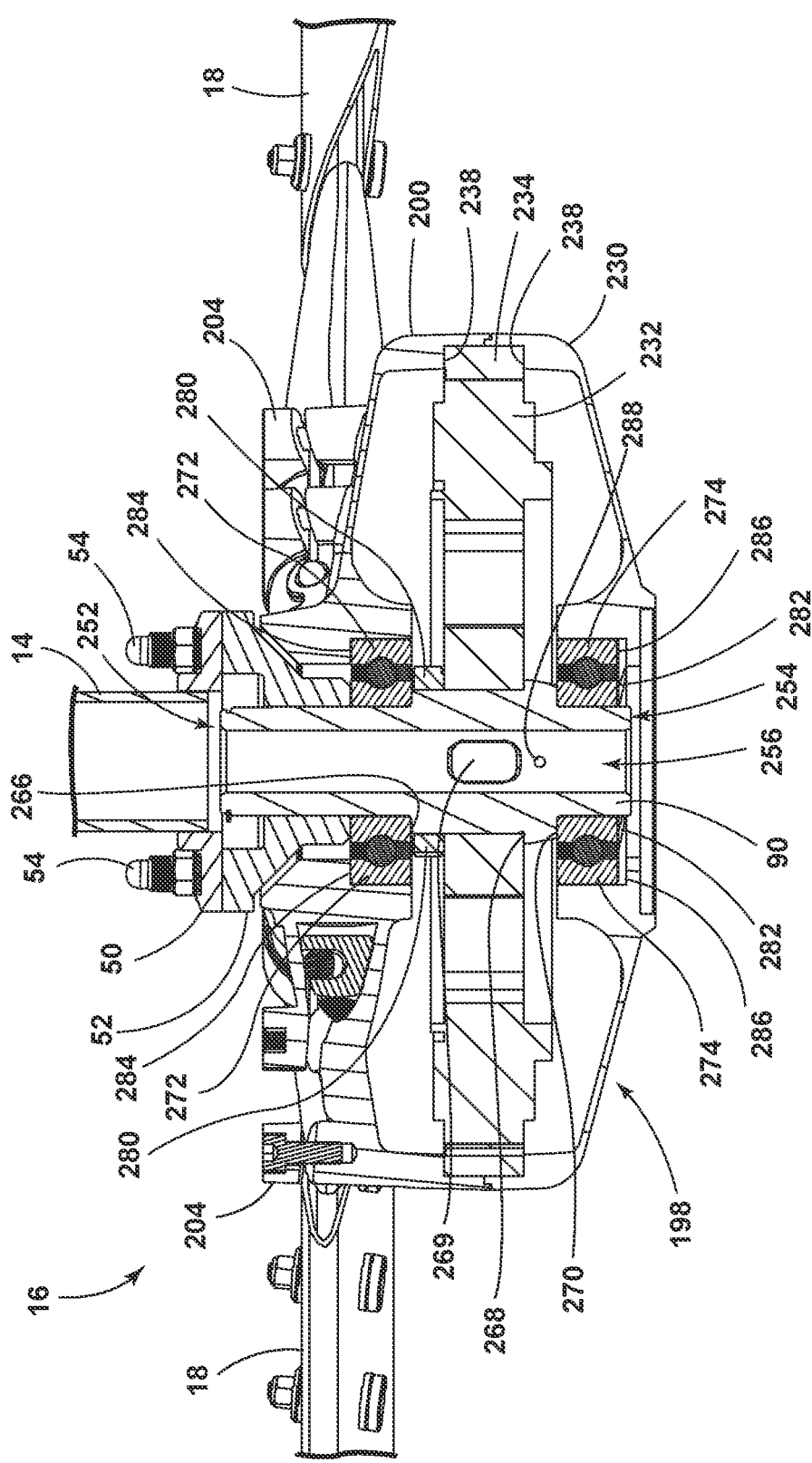
FIG. 8C is a cross-sectional view of the motor housing assembly of FIG. 1.

Looking at FIG. 8C, showing a cross-section of a portion of the motor assembly 16 illustrates the combination of the components associated with the non-rotating motor shaft 90. The non-rotating motor shaft 90 is disposed within the motor housing 198 having the bearings 272, 274 disposed in the upper and lower bearing stops 266, 270. A spacer 280 can be placed between the upper bearings 272 and the stator providing additional support during operation. The stator 232 rests on the stator stop 268 and fixes the position of the stator 232 relative to the motor shaft 90. The rotor 234 surrounds the stator 232 and mounts between the upper portion 200 of the motor housing 198 and the lower motor housing portion 230 on the magnet seat 238. Fixing the stator 232 on the stator stop 268 fixes the position of the stator 232 relative to the rotor 234 to fix the air gap between the two. The upper portion 200 further includes an upper bearing seat 284 abutting the upper bearing 272 above the upper bearing stop 266. The lower portion 230 further comprises a lower bearing seat 286 abutting the lower bearing 274 below the lower bearing stop 270. The upper and lower bearing seats 284, 286 operate to sandwich the bearings 272, 274 between the upper and lower bearing stops 266, 270, respectively, fixing the bearings in place during operation. During operation, rotation of the rotor 234 about the stator 232 rotates the motor housing 198 and the blade holders 18 attached thereto, rotating the blades 20 of the ceiling fan 10.

The shaft coupler 52 mounts to the upper end 252 of the motor shaft 90, such as by the threaded connection 258. The shaft coupler 52 couples to the downrod plate 50, utilizing the fasteners 54 or press studs. The downrod plate 50 couples to the downrod assembly 14 or is integral with the downrod assembly 14, mounting the downrod assembly 14 to the motor shaft 90 via the shaft coupler 52. Thus, the downrod assembly 14 suspends the motor shaft 90 from the structure or ceiling. During operation, the rotor 234, motor housing 198 including the upper and lower portions 200, 230, the mounts 204, blade holders 18, and blades 20 can all rotate about the motor shaft 90 around the bearings 272, 274 while the motor shaft 90, stator 232, downrod plate 50, motor coupler 52, and downrod assembly 14 remain fixed and are non-rotating.

The motor shaft 90 can further include a weep hole 288. The weep hole 288 can be disposed below the opening 269, as electrical wiring can be provided through the opening 269. In operation, such as in weather heavy environments where rain, snow, or precipitation is common, such as in a farming environment, the weep hole 288 can protect the wiring at the opening 269. In one example, rain may run into the interior of the motor shaft 90. The motor shaft 90 can fill with the rainwater. The weep hole 288 provides for draining of the rainwater from the interior of the motor shaft 90 before the water can rise to the electronics, providing for outdoor or weathered operation of the ceiling fan.

The motor assembly 16 further includes one or more spring members 282, such as a spring or spring finger, disposed underneath the lower bearings 274 between the lower bearings 274 and the lower motor housing portion 230 permitting rotation of the spring member 282 with the rotation of the lower motor housing portion 230. The spring members 282 provide a downward force against the lower portion 230 of the motor housing 198 at the lower bearing seat 286, which is transferred to the upper housing portion 200, providing a downward force by the upper motor housing portion 200 against the upper bearings 272 at the upper bearing seat 284. During operation, the blades 20 push a volume of air downward, also providing an upward force for the motor assembly 16. The spring members 282 providing a balancing force to combat the forces generated during operation maintaining fan balance. Thus, the weight of the rotor 234, mounted to the motor housing 198, is transferred through the upper bearing 272 to the motor shaft 90 and is not borne by the motor housing 198 alone.

It should be appreciated that the non-rotating motor shaft 90 facilitates coupling of the motor assembly 16 to the downrod assembly 14. The motor shaft 90, including the upper bearing stop 266, stator stop 268, and the lower bearing stop 270, facilitates alignment of the bearings 272, 274 and operates in combination with the motor housing 198 to secure the bearings in place between the stops 266, 268 and the bearing seats 284, 286 to reduce vibration and movement, such as wobble of the fan 10 during operation while permitting a rotating motor housing 198. The bearing stops 266, 270 and the stator stop 268 fix the positions of the bearings 272, 274 and stator 232 relative to the motor housing 198 and the rotor 234. Mounting the rotor 234 to the motor housing 198 fixes the rotor 234 relative to the stator 232, bearings 272, 274, and the motor shaft 90. Fixing these positions fixes an air gap between the stator 232 and rotor 234, determining operational efficiency of the motor while maintaining stability during operation.

Additionally, the spring member 282 creates a preload against the lower portion 230 of the motor housing 198 to equalize position of the rotating motor housing 198 during operation, which further reduces vibration and movement of the fan 10.

Figure 9A:
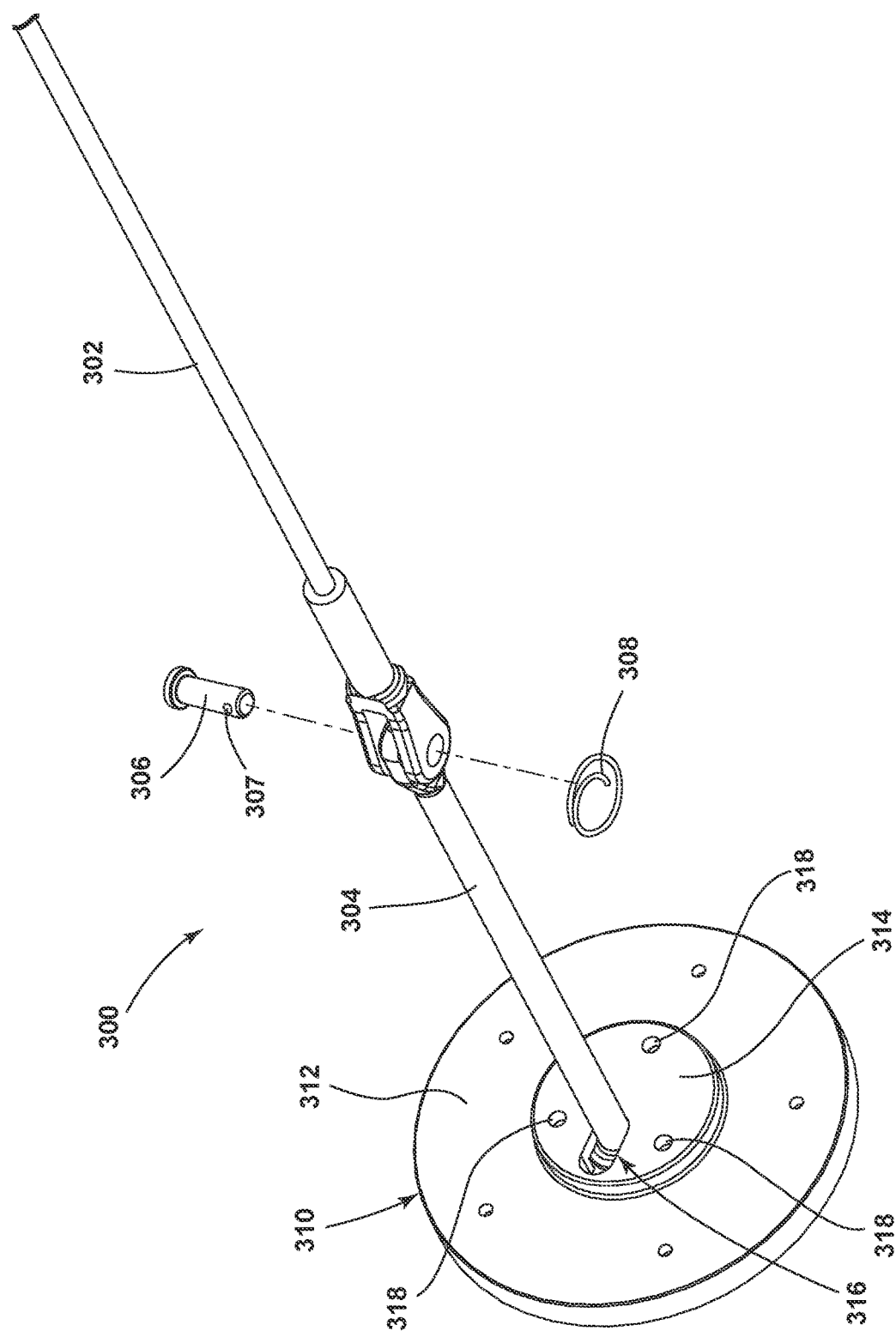
FIG. 9A is a perspective view of a retainer system of the ceiling fan of FIG. 1

Looking now at FIG. 9A, the retention system 300 includes the support cable 302 coupled to the retaining rod 304 by a fastener 306. The support cable 302 can mount to a ceiling or a structure, such that the retention system 300 can provide a redundancy to prevent falling or collapse of the ceiling fan 10 in the event that the initial ceiling mount structure 12 fails. The fastener 306, for example, can be a bolt having an aperture 307 for securing with a pin 308, or alternatively, can be a screw and nut system. Opposite of the support cable 302, the retaining rod 304 can couple to the retainer plate 310 which includes an outer portion 312 and an inner portion 314. The inner portion 314 includes an offset opening 316 for accepting insertion of the retaining rod 304. The inner portion 314 has mounting holes 318 for mounting to the motor shaft 90.

Figure 9B:
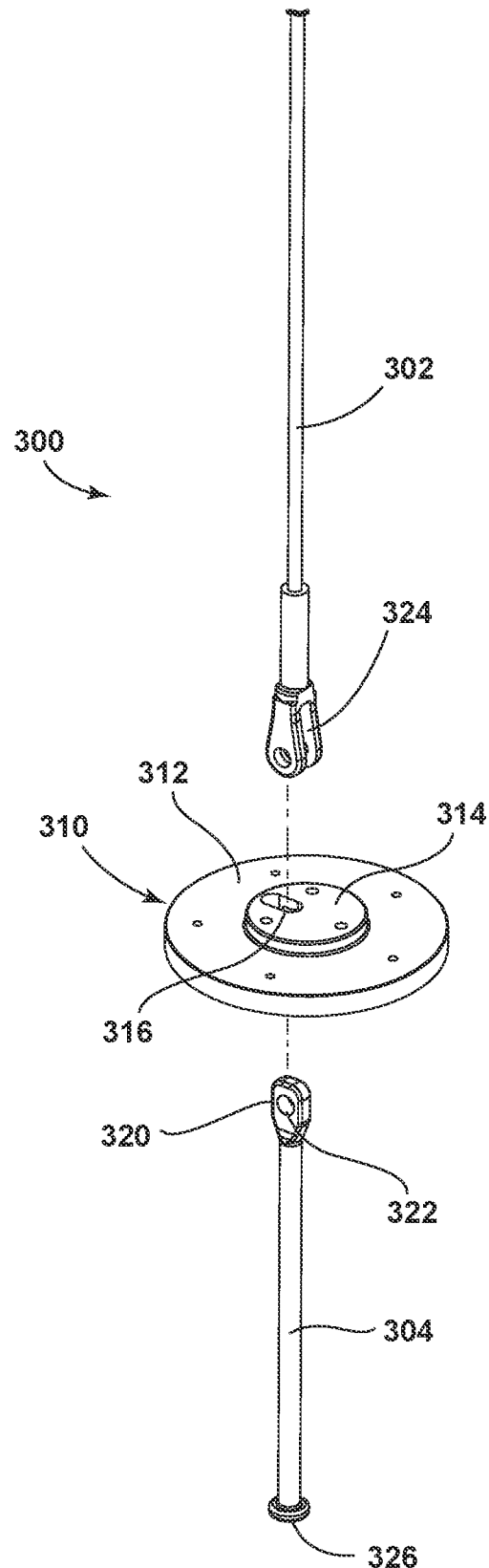
FIG. 9B is an exploded view of the retainer system of FIG. 9A.

In FIG. 9B, an exploded view illustrates the interconnection of the retention system 300. A mount end 320 of the retaining rod 304 can insert through the opening 316 in the retainer plate 310, with the opening 316 shaped to accept the shape of the mount end 320. The mount end 320 can include a flattened surface with a mount hole 322 adapted to be received by a clevis 324 on one end of the support cable 302. The retaining rod 304, opposite of the mount end 320, includes a cap 326 that abuts the bottom of the retainer plate 310. The bottom of the retainer plate 310 includes a recessed portion (see FIG. 11A) adapted to receive the cap 326.

It should be appreciated that the retention system 300 provides a redundancy in the event that the initial ceiling mount structure 12 fails. The retaining rod 304 disposed within the downrod assembly 14 and the motor shaft 90 coupled to the retainer plate 310 can permit continued rotation of the fan 10 during such a failure event. The continued rotation allows the fan 10 to slow down without further damage to internal components as well as supporting the fan 10 from falling. Without the ability for continued rotation, the internal components can otherwise contact one another, damaging the fan 10, its components, or otherwise causing the fan 10 to fall despite redundant measures to prevent such a fall.

Figure 10A:
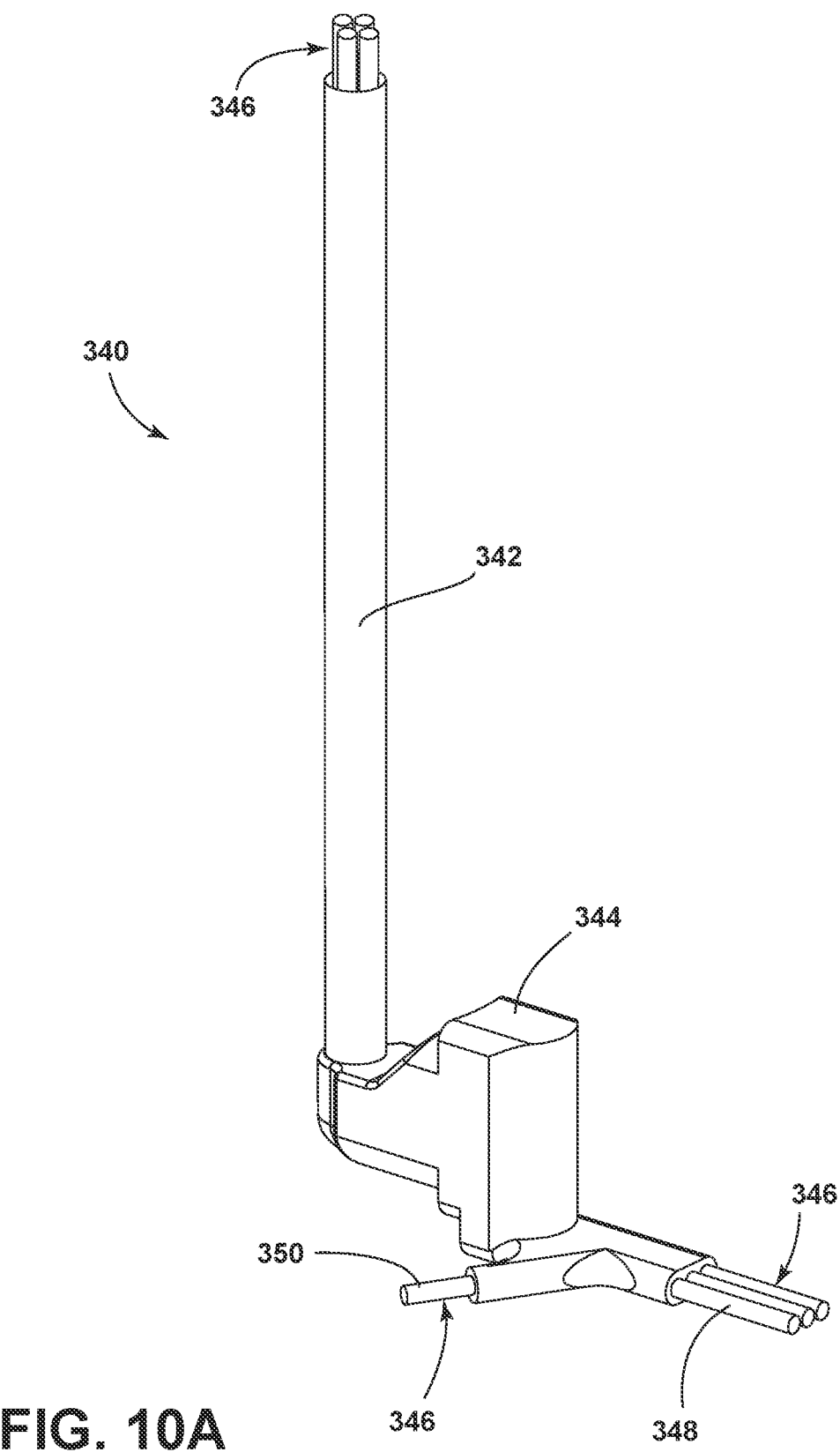
FIG. 10A is a top perspective view of a wiring harness of the ceiling fan of FIG. 1.

Turning to FIG. 10A, the wiring harness 340 is illustrated having the wiring conduit 342, a body 344, and electrical wiring leads 346. The wiring conduit 342 extends from the body 344, electrically coupling the body 344 to a structure power supply. The wiring leads 346, which can comprise live wires 348 and a ground wire 350 electrically couple to the stator 232 for powering the stator 232 to drive the rotor 234 during operation of the ceiling fan 10. It should be appreciated that the wiring harness 340 separates the ground wire 350 from the live wires 348 preventing the potential for a short.

Figure 10B:
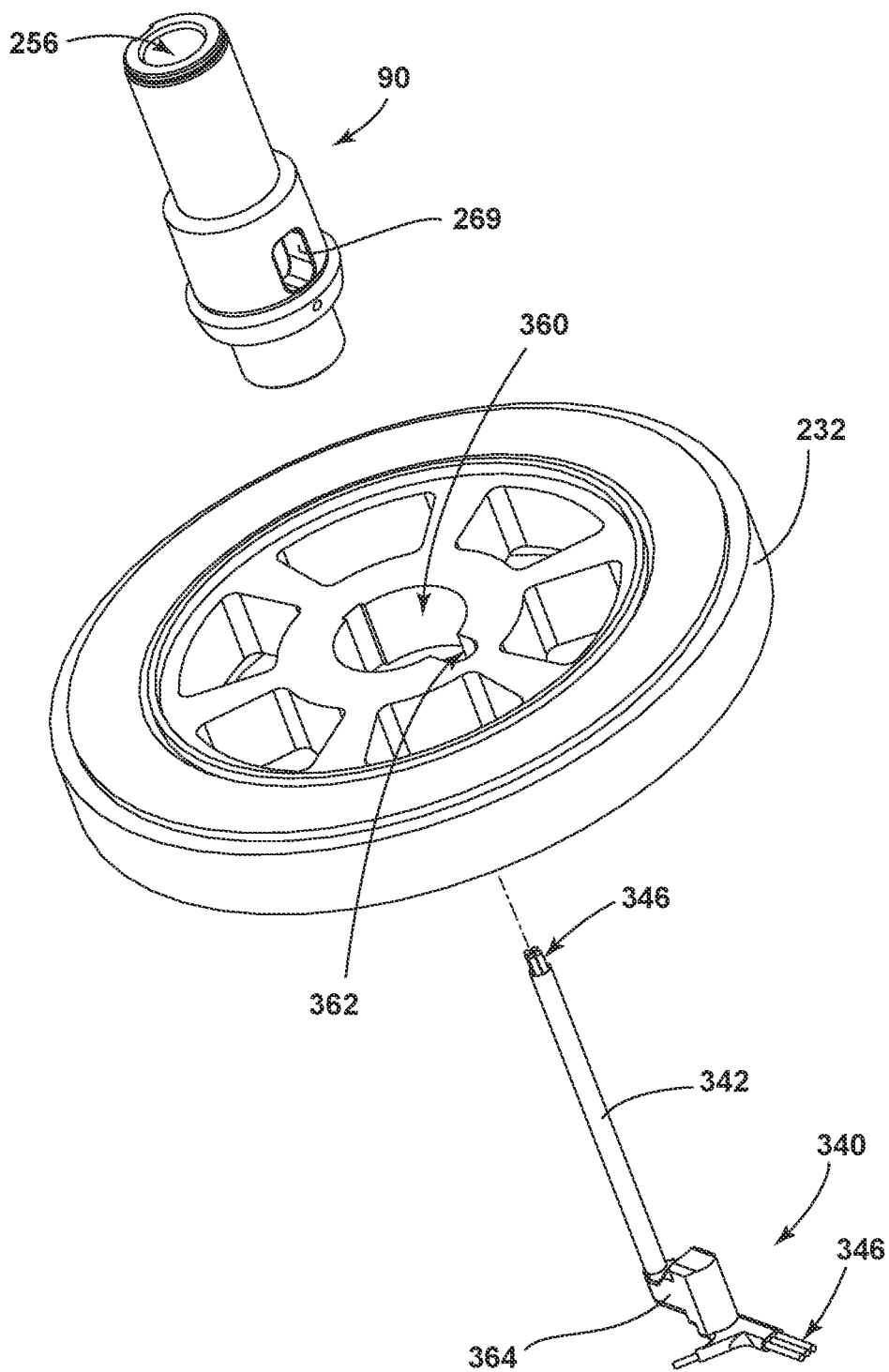
FIG. 10B is an exploded view of the wiring harness of FIG. 10A illustrating connection to a stator and the motor shaft of FIG. 2A.

Looking at FIG. 10B, the wiring harness 340 can slide into the stator 232. The wiring harness 340 can terminate at the electrical connector 343 facilitating plug-in connection of the wiring harness 340 during installation of the fan 10. The stator 232 can have a central aperture 360 having a slot 362 sized to receive the body 344 of the wiring harness 340. Inserting the body 344 into the slot 362 positions the wiring leads 346 along the bottom of the stator 232 to provide power to the stator 232.

Similarly, the opening 269 of the motor shaft 90 is sized to receive an end 364 of the body 344, permitting the wiring conduit 342 to extend through the interior 256 of the motor shaft 90. Thus, the wiring conduit 342 can extend through the interior 256 of the motor shaft 90, having the end 364 inserted in the opening 269. The combined motor shaft 90 and wiring harness 340 can be inserted into the stator 232, having the extending body 344 of the wiring harness 340 inserted into the slot 362 of the stator 232, providing the wiring leads 346 to the stator 232.

It should be appreciated that the wiring harness 340 provides a power source to the stator 232 internal of and through the non-rotating motor shaft 90. Additionally, the disposition of the motor shaft 90 and the retainer system 300 separates the retaining rod 304 from the wiring harness 340, minimizing the possibility for electrical shorts or wear during operation by rubbing the two together.

Figure 11A:
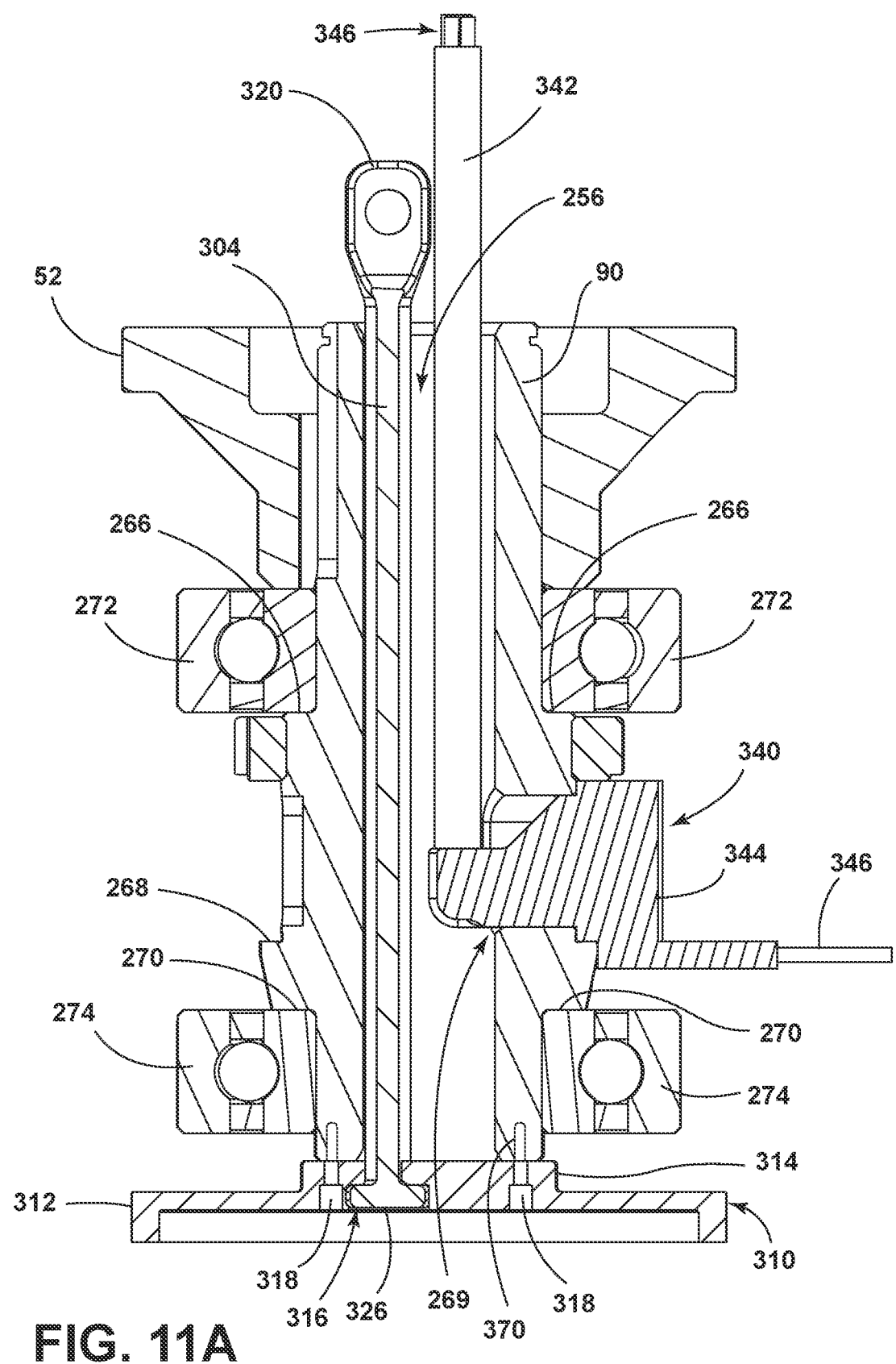
FIG. 11A is a cross-sectional view of the retainer system of FIG. 9A and the wiring harness of FIG. 10A disposed within the motor shaft.

Looking at FIG. 11A, a cross-sectional view illustrates the combined motor shaft 90, retention rod 304, retainer plate 310, and wiring harness 340. The retainer plate 310 mounts to the motor shaft 90 by aligning the mounting holes 318 with complementary fastener apertures 370 within the motor shaft 90. The offset orientation of the opening 316 within the retainer plate 310 positions the retaining rod 304 toward one side of the interior 256 of the motor shaft 90. The retainer plate 310 mounts to the motor shaft 90 positioning the opening 316 of the retainer plate 310 on an opposite side as the opening 269 within the motor shaft 90. As such, the wiring harness 340 positions on the opposite side of the interior 256 of the motor shaft 90 from the retaining rod 304, spacing the two from one another and preventing any potential contact, which might otherwise short the wiring harness 340 or wear against one another during operation.

Figure 11B:
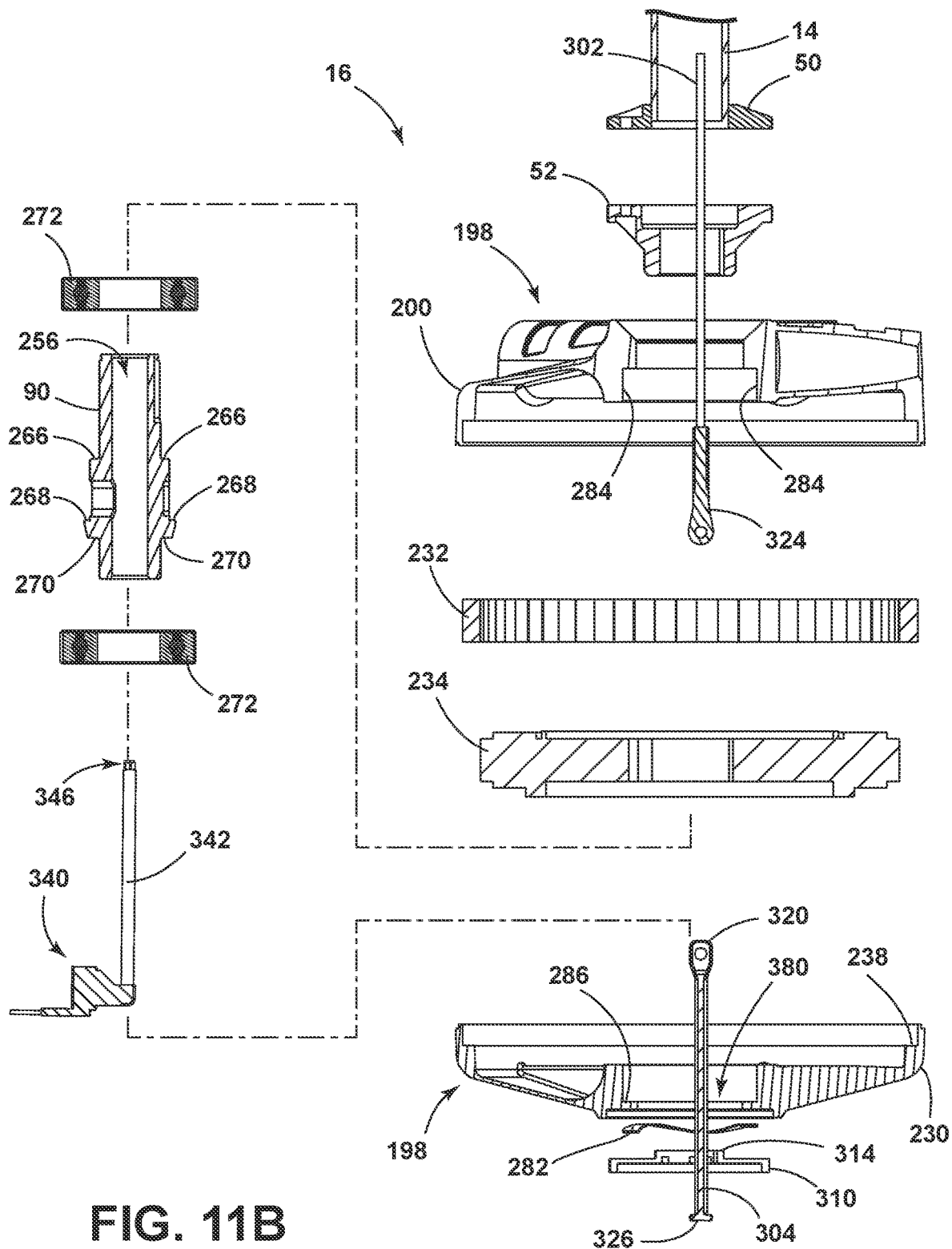
FIG. 11B is an exploded view of all components comprising the motor assembly of the ceiling fan of FIG. 1.

Turning to FIG. 11B, the combination of the motor assembly 16 can be appreciated. From the bottom, the retaining rod 304 inserts through the retainer plate 310 until the cap 326 abuts the inner portion 314 of the retainer plate 310. The inner portion 314 mounts to the bottom of the motor shaft 90, through an aperture 380 in the lower motor housing portion 230. The motor shaft 90 is non-rotating, and therefore the retainer plate 310 is non-rotating and is spaced from the lower motor housing portion 230 to permit rotation of the motor housing portion 230 during operation. The wiring harness 340 inserts into the opening 269 of the motor shaft 90, having the wiring conduit 342 extending up through the interior 256 of the motor shaft 90. The lower bearings 274 position at the lower bearing stop 270, fixing the lower bearings 274 between the motor shaft 90 and the lower bearing seat 286. The spring members 282 (FIG. 8C) can be positioned between the bottom of the lower bearings 274 and the lower motor housing portion 230 providing a downward force upon the lower motor housing portion 230. The rotor 234 and stator 232 can position around the motor shaft 90, resting the rotor 234 on the magnet seat 238 of the lower housing portion 230 and resting the stator 232 on the stator stop 268 of the motor shaft 90. The upper bearings 272 can position on the upper bearing stop 266, having the upper bearing seat 284 fixing the upper bearings 272 against the motor shaft 90. The upper housing portion 200 can mount to the lower housing portion 230 with a plurality of fasteners through the rotor 234, encasing the rotor 234, stator 232, motor shaft 90, bearings 272, 274, and wiring harness 340. The support cable 302 can be coupled to the mount end 320 of the retaining rod 304 extending through the top of the upper motor housing portion 200 at the clevis 324. The shaft coupler 52 is disposed around the support cable 302 and couples to the motor shaft 90. The shaft coupler 52 can mount to the downrod plate 50, suspending the motor assembly 16 from the downrod assembly 14 and the structure.

In operation, a power supply is provided to the stator 232 via the wiring harness 340, inducing rotation of the rotor 234. The rotor 234 couples to the motor housing 198 and rotates about the stator 232, rotating the blade holders 18 and the blades 20 attached thereto.

It should be appreciated that the ceiling fan 10 as described herein provides a number of advantages. These advantages can be combined into one embodiment or utilized individually in any particular embodiment. The following are examples of some of the advantages. The downrod assembly 14 utilizes the downrod plate 50 to mount to the shaft coupler 52 for mounting to the motor shaft 90. The combination of the downrod plate 50 and shaft coupler 52 facilitates mounting of the downrod assembly 14 to the motor shaft 90 for suspending the motor assembly 16 from the ceiling. Additionally, the downrod plate 50 and shaft coupler 52 permit the motor shaft 90 to be non-rotating without requiring the downrod assembly 14 or the entire motor assembly 16 to rotate. Furthermore, the downrod assembly 14 includes the guy wire fitting 58 for mounting the downrod assembly 14 to the ceiling separate from the initial ceiling mount structure 12. Additionally, the non-rotating nature of the downrod assembly 14 facilitates the mounting of the guy wire fitting 58 directly to the downrod assembly 14 without requiring a separate non-rotating element for mounting to guy wires 22. The guy wiring system provides a redundancy in the event the fan 10 can fall from ceiling mount structure as well as reduces operational vibration and gyroscopic tilt.

Furthermore, the tapped studs 94 or press studs facilitate alignment and mounting of the downrod plate 50 to the shaft coupler 52. The studs 94 permit the downrod assembly 14 to quickly mount to the motor shaft 90 via the shaft coupler 52. Additionally, the use of the retainer nut 92 facilitates slidable insertion of the motor shaft 90, into the shaft coupler 52 as well as can provide a redundant coupling for attaching the motor shaft 90 to the shaft coupler 52.

Further still, the blades 20 can have a thickness-to-chord ratio of about 13.8% and include an airfoil shape to maximize efficiency of the blades 20. Furthermore, the blade span 106, chord 116, thickness 122, rotational speed, and pitch can be adapted to maximize efficiency, airspeed, and airflow volume during operation of the ceiling fan 10.

Further still, the blade holders 18 including the cross-sections 140, 142 at the first and second ends 150, 152 facilitating mounting of the blades 20 to the mounts 204. The size and shape of the blade holders 18 minimizes system weight while maximizing structural integrity, which improves overall efficiency. The blade holders 18 include the push-lock assembly 156 with the pin 162, which determines the blade pitch. Thus, based upon blade features such as span, the push-lock assembly 156 can be manufactured to orient the blades 20 at an optimal pitch to maximize efficiency without requiring such a determination by an installer or consumer.

Further still, the blade hub 202, having multiple mounts 204, facilitates attachment and improves security of the blade holders 18. The split sleeve 210 and pin-lock aperture 218 accurately aligns blade pitch among all mounted blades 20. The compression fittings 214 facilitate securing the blade holders 18 to the blade hub 202 with tightening of mechanical fasteners. The integral mounts 204 with the rotating blade hub 202 enables rotational operation without additional elements for rotating the blades 20.

Further still, the motor housing 198 is a clamshell style housing having upper and lower portions 200, 230 for mounting directly to the rotor 234 for rotating the entire motor housing 198, blade hub 202, and blades 20 coupled thereto. The motor housing 198 enables a rotor 234 and stator 232 combination to be housed within the motor assembly 16. Thus, the motor housing 198 can rotate to drive the blades 20 without requiring rotation of the entire motor assembly 16. Operational wear, vibration, and wobble are minimized while lifetime is increased.

Further still, the non-rotating motor shaft 90 facilitates coupling of the motor assembly 16 to the downrod assembly 14. The motor shaft 90, including the upper bearing stop 266, stator stop 268, and the lower bearing stop 270 facilitates alignment of the bearings 272, 274 and operates in combination with the motor housing 198 to secure the bearings in place between the stops 266, 268 and the bearing seats 284, 286 to reduce vibration and wobble of the fan 10 during operation while permitting a rotating motor housing 198. The stator stop 268 in combination with mounting the rotor 234 to the motor housing 198 fixes the air gap between the stator 232 and the rotor 234 to determine operational efficiency and maintain operational stability of the motor assembly 16. Additionally, the spring member 282 creates a preload against the lower portion 230 of the motor housing 198 to equalize position of the rotating motor housing 198 during operation, which further reduces vibration and wobble of the fan 10 as well as offsets the upward force generated by rotation of the fan blades 20.

Further still, the retention system 300 provides a redundancy in the event that the initial ceiling mount structure 12 fails. The retaining rod 304 disposed within the downrod assembly 14 and the motor shaft 90, coupled to the retainer plate 310 permits continued rotation of the fan 10 during such a failure event. The continued rotation allows the fan to slow down without further damage to internal components as well as supporting the fan 10 from falling. Without the ability for continued rotation, the internal components can otherwise contact one another, damaging the fan 10, its components, or otherwise causing the fan 10 to fall despite redundant measures to prevent such a fall.

Further still, the wiring harness 340 provides a power source to the stator 232 internal of and through the non-rotating motor shaft 90. Additionally, the disposition of the motor shaft 90, and the retainer system 300 separates the retaining rod 304 from the wiring harness 340, minimizing the possibility for electrical shorts or wear during operation by rubbing the two against one another.

Further still, the combination of elements provides for utilizing a non-rotating motor shaft 90 with a non-rotating downrod assembly 14, having the motor assembly 16 suspended from the downrod assembly 14. The combination of elements disclosed herein maximizes fan efficiency, while providing redundancies in the event that the fan 10 might fall, which can occur in an industrial environment due to typical industrial operations, which can hit the fan 10. Furthermore, the fan 10 as disclosed facilitates installation having easily interconnectable elements. Additionally, the overall vibration and wobble of the fan 10 is reduced, further increasing efficiency while minimizing noise and power consumption.

Figure 12:
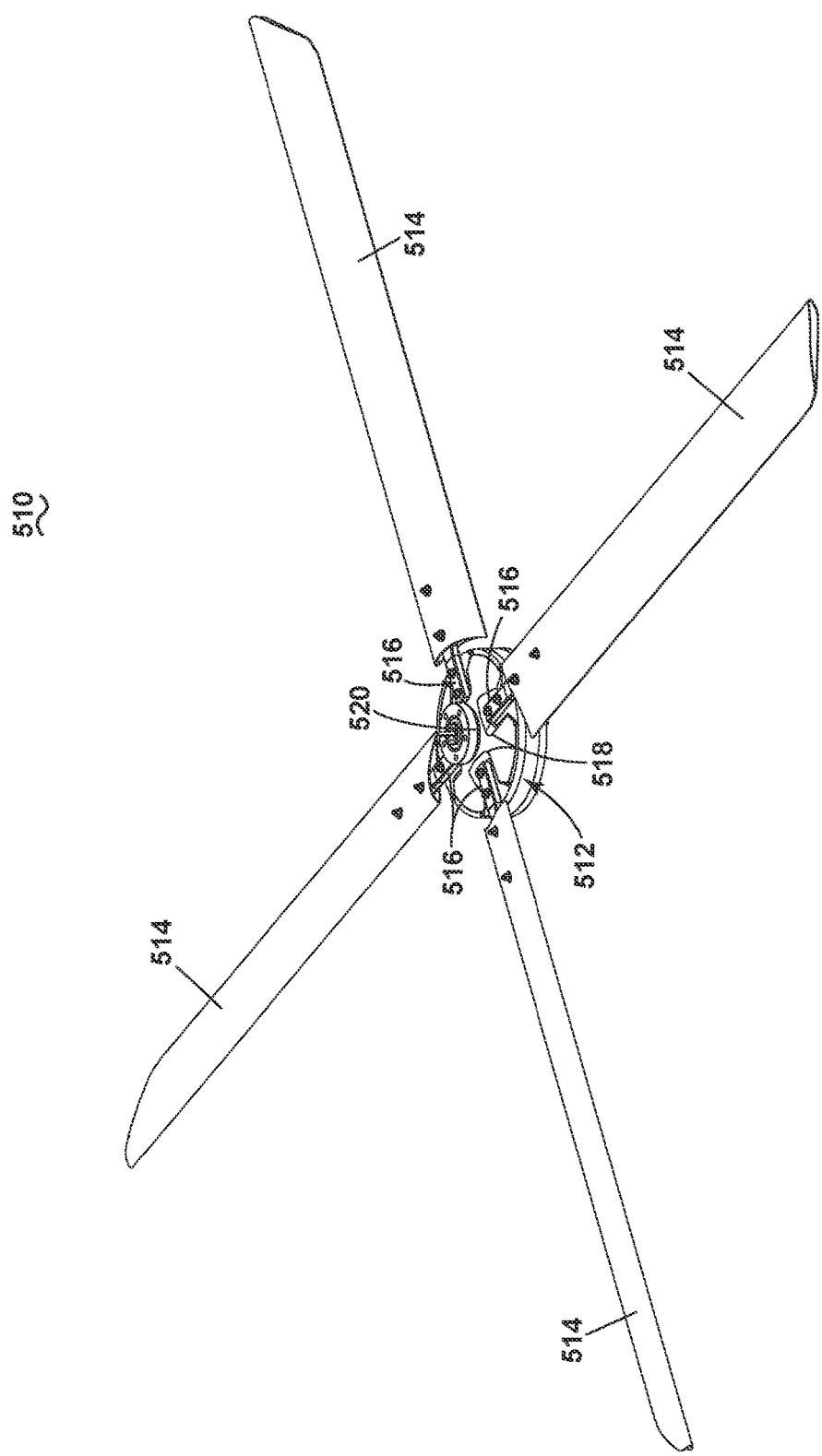
FIG. 12 is perspective view of an alternative ceiling fan according to aspects described herein.

Referring now to FIG. 12, another exemplary ceiling fan 510 is illustrated. The ceiling fan 510 includes a motor housing 512. A central aperture 520 can be formed in the center of the motor housing 512 and extending through the motor housing 512. The motor housing 512 can operate as a rotating blade hub for mounting a set of blades 514, shown as four blades, and can mount to the motor housing 512 via mount struts 516. The blades 514 can be similar to the blades as described herein, such as the blades 20 described in FIGS. 3A-3C, for example. A set of hub sockets 518 can be formed in the motor housing 512 adapted to couple the mount struts 516 for mounting the blades 514 to the motor housing 512.

Figure 13:
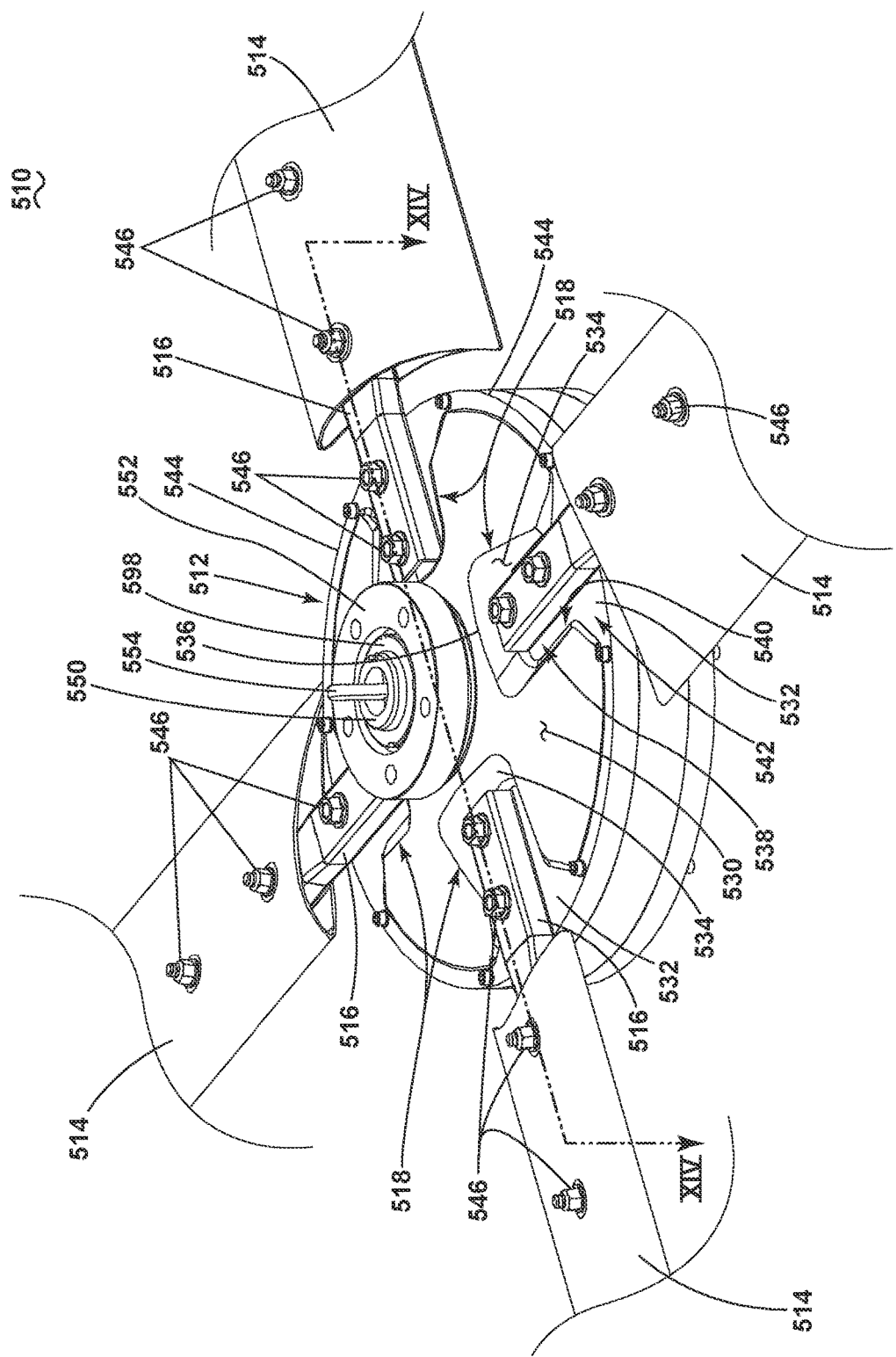
FIG. 13 is an enlarged view of a motor housing of the alternative ceiling fan of FIG. 12.

FIG. 13 illustrates an enlarged view of the motor housing 512 of FIG. 12. The motor housing 512 can have an upper surface 530. The hub sockets 518 can have a bottom wall 532 with tapered walls 534 extending between the upper surface 530 and the bottom wall 532. The bottom wall 532 can be horizontal. The tapered walls 534 can have a variable cross-sectional area, defining an interior wall 536 extending as a neck 538 terminating at a throat 540. A mouth 542 extends from the throat 540 to a terminal edge 544 of the motor housing 512. Fasteners 546 can couple the mount struts 516 to the motor housing 512 and the blades 514 to the mount struts 516. As shown, two fasteners 546 couple each mount strut 516 to the motor housing 512 and two fasteners 546 couple each blade 514 to each complementary mount strut 516. While two fasteners 546 are shown at each position, any number of fasteners is contemplated. The fasteners 546 can be any suitable fastener, such as a screw or bolt in non-limiting examples.

The ceiling fan 510 further includes a motor shaft 550 disposed within and partially extending from the motor housing 512 for coupling to a motor interior of the motor housing 512. A nut 598 redundantly fastens the motor housing 512 to the motor shaft 550. A shaft coupler 552 couples to the motor shaft 512 for suspending the ceiling fan 510. Additionally, a secondary suspension system 554 is visible for redundantly suspending the ceiling fan 510 from a structure via the motor shaft 552.

Figure 14:
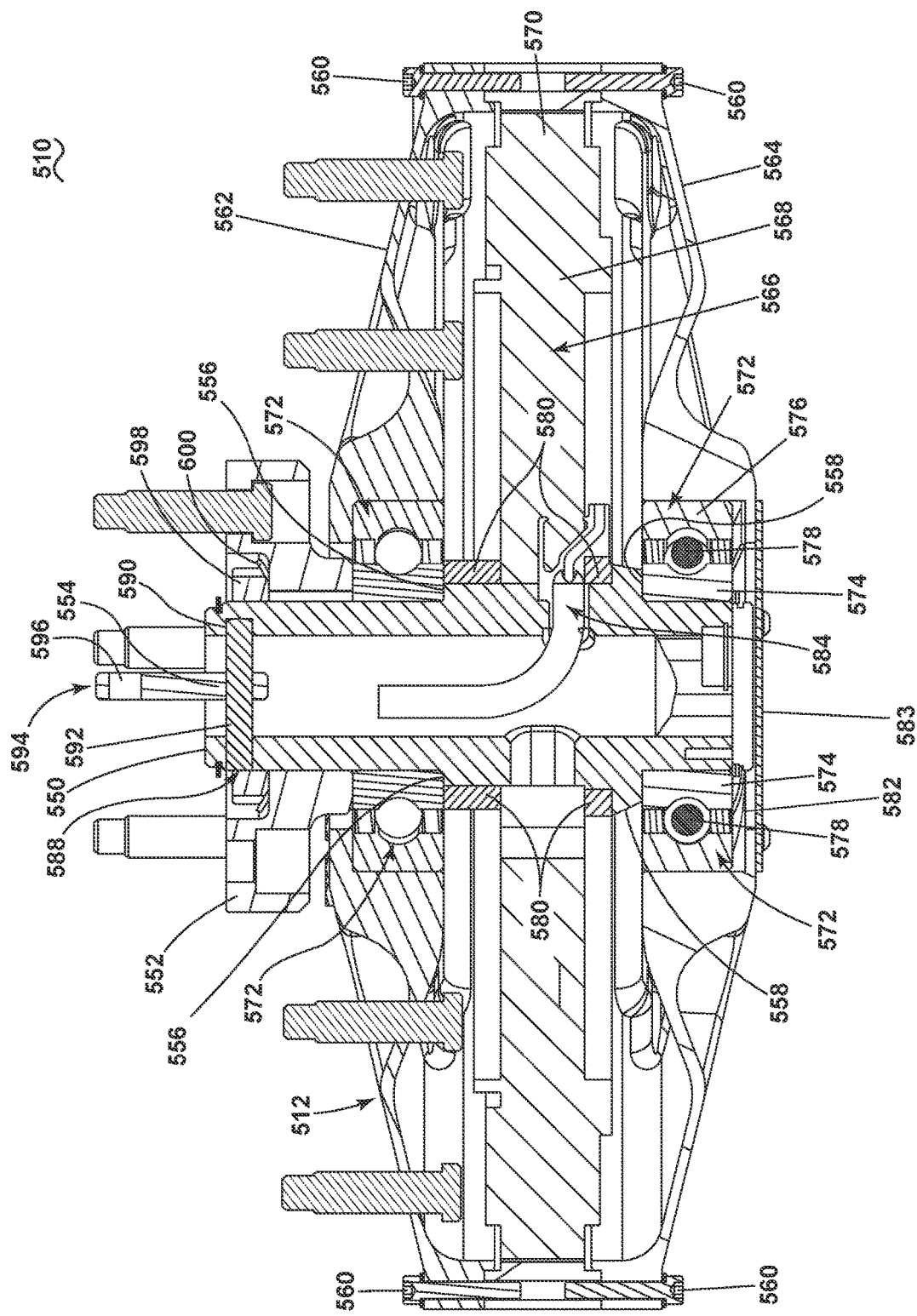
FIG. 14 is a cross section of the motor housing taken across section XIV-XIV of FIG. 13.

Referring now to FIG. 14, a cross-section of the ceiling fan 510 taken along section XIV-XIV of FIG. 13. Fasteners 560 couple an upper motor housing portion 562 and a lower motor housing portion 564 to form the motor housing 512. The upper and lower motor housing portions 562, 564 encase a motor assembly 566 including a fixed stator 568 and a rotor 570 rotatable about the stator 568. The stator is non-rotating and slidably couples to the motor shaft 550. The fasteners 560 couple the rotor 570 to the motor housing 512 such that the motor housing 512 rotates with the rotor 570. The stator 568 fixes to the motor shaft 550 such that the motor shaft 550 is non-rotating. The rotor 570, the motor housing 512, and any other rotating portions of the ceiling fan encased within the motor housing 512 can define a rotor assembly, which rotates about the motor shaft 550.

The motor shaft 550 can include an upper shoulder 556 and a lower shoulder 558. Two bearings 572 slidably mount to the motor shaft 550 to permit rotation of the motor housing 512 about the motor shaft 550. The bearings 572 abut the rotor assembly at the motor housing 516. The upper bearing 572 can position at the upper shoulder 556 and the lower bearing 572 can position at the lower shoulder 558. Each bearing 572 includes an inner housing 574 and an outer housing 576 encasing a set of bearing balls 578. As such, the outer housing 576 can rotate with the motor housing 512 via the bearing balls 578 while the inner housing 574 can remain stationary at the motor shaft 550.

The bearings 572, which rest on the shoulders 556, 558, can support the motor assembly 566. As such, the motor coupler 552 can suspend the motor shaft 550 from a building and the motor shaft 550 can support the remaining portions of the ceiling fan 510, including the motor assembly 566, or any blades attached thereto.

A set of spacers 580 slidably mount to the motor shaft 550. The spacers 580 can space the bearings 572 from the stator 568. The spacers 580 can position against the inner housing 574 of the bearing and the stator 568 as non-rotating elements. The upper spacer 380 can circumscribed the upper shoulder 556. The spacers 580 fix the sliding location of the first and second bearings 572 relative to the stator along the motor shaft 550. As such, the stator 568 is compressively retained between the first and second spacers 580 and the bearings 572 compressively retain the spacers 580, and thus the stator 568. The spacers 580 maintain the bearings 572 positioned against the motor housing 512 to minimize wobble or vibration of the motor assembly 566. On the opposite side of the lower bearing 572, a spring member 582 is provided to load the bearings 572 against the motor housing 512. The spring member 582 can position against the outer housing 576 of the bearing 572 between the housing 512, between two rotating parts. As such, the spring member 582 can be a rotating member as well. The spring member 582 also minimizes wobble or vibration emanating from the motor assembly 566. At the bottom of the lower motor housing 564, a plate 583 can fasten to the motor housing 512 to encase the motor assembly 566 at the bottom.

An electrical aperture 584 is provided in the motor shaft 550 with an electrical conduit 586 extending through the electrical aperture 584. The electrical conduit 586 can provide electrical power to the stator 568 for powering the motor assembly 566 to drive the rotor 570.

The shaft coupler 552 couples to the motor shaft 550 for suspending the ceiling fan 510 from a structure. A pin aperture 588 is formed in the motor shaft 550 with a seat 590 provided in the interior of the motor shaft 550 opposite of the pin aperture 588. Alternatively, the seat 590 can be an additional pin aperture 588 extending through the motor shaft 550. A retainer pin 592 inserts through the pin aperture 588 and secures in the seat 590. A retainer rod 594 can attach to the pin 592 and includes a retainer aperture 596. The retainer aperture 596 can secure to a redundancy system, such as a wire cord extending through a connected downrod, for example. As such, the retainer rod 594 can couple to the motor shaft 550 via the retainer pin 592 in the pin aperture 588 and the seat 590.

A nut 598 with a lock washer 600 can be provided around the top of the motor shaft 550 within the shaft coupler 552. The nut 598 can redundantly secure the shaft coupler 552 to the motor shaft 550. Additionally, 598, the nut 598 can secure the pin 592 within the pin aperture 588.

The combination of the pin 592, the hook 596, and the nut 598 can define the secondary suspension system 554. The secondary suspension system 554 provides a redundant mount for the ceiling fan 510. As the secondary suspension system 554 mounts to non-rotation portions of the ceiling fan 510, such as the motor shaft 550, redundant operation of the secondary suspension system 554 permits continued rotation of the ceiling fan 510 during user, minimizing potential damage to the ceiling fan 510 during operation of the secondary suspension system 554.

Figure 15:
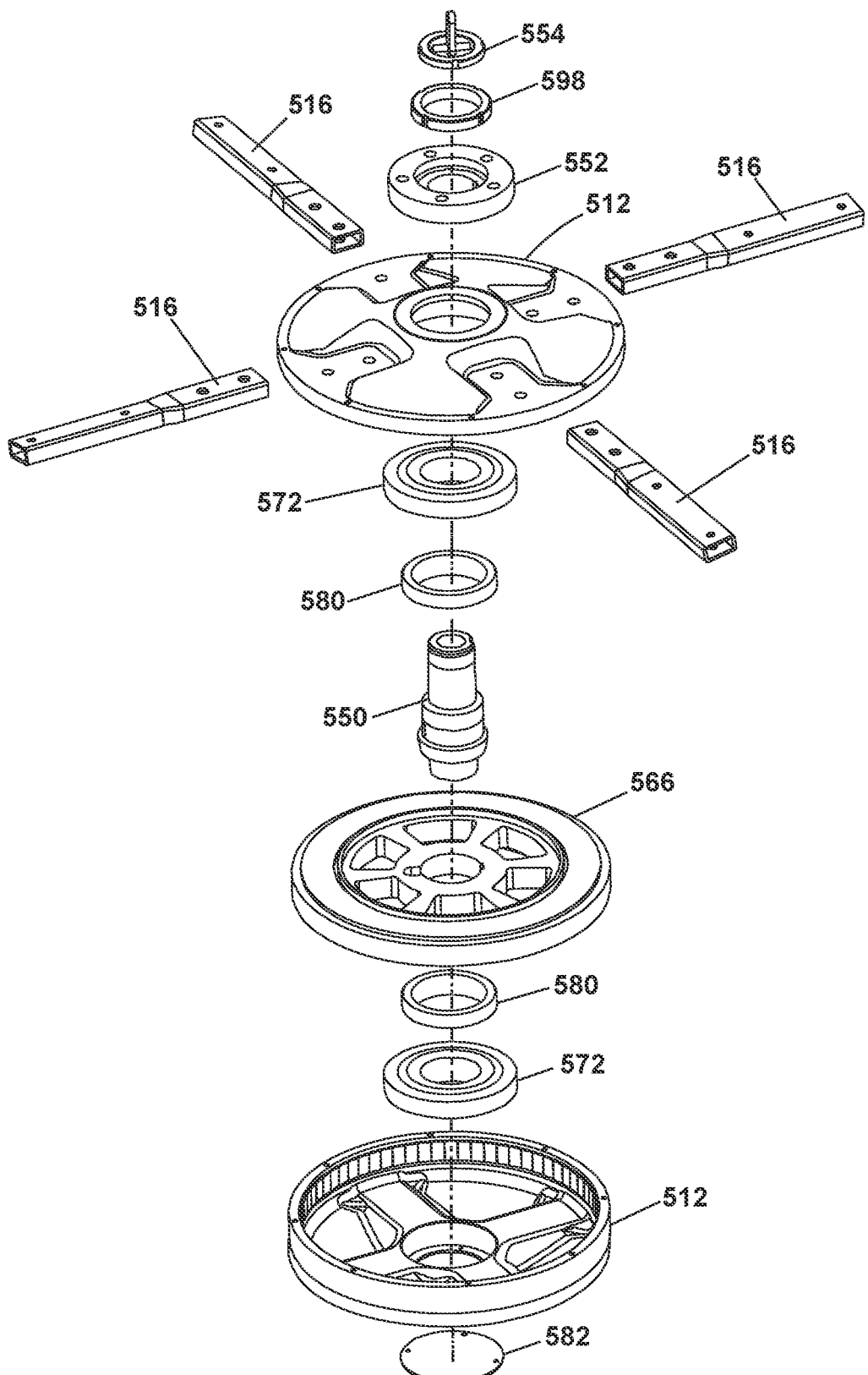
FIG. 15 is an exploded view of the motor housing of FIG. 14.

FIG. 15 is an exploded view of the components shown in FIG. 14, including exploded mount struts 516. In assembly, the motor assembly 566 can couple to the motor shaft 550. The electrical conduit 586 of FIG. 14 can be installed within the motor shaft 550 to the motor assembly 566. Spacers 580 can be installed along the motor shaft 550 on either side of the motor assembly 566. Bearings 572 can be installed on either side of the spacers 580. At the bottom, the spring member 582 can be positioned against the bearing 572. At the top, the shaft coupler 552 and the secondary suspension system 554 can be mounted above the motor shaft 550. The mount struts 516 can mount to the motor housing 512 for mounting blades.

Figure 16:
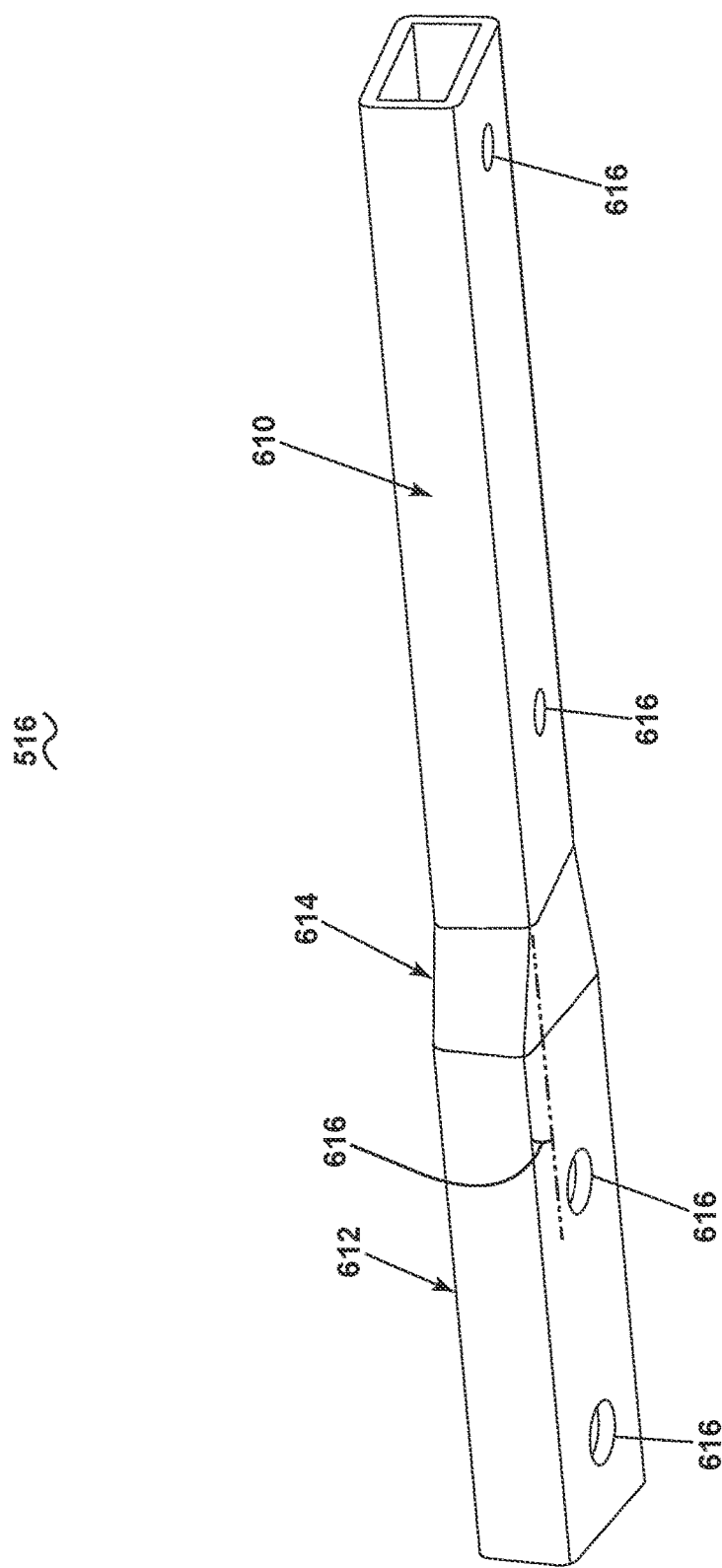
FIG. 16 is a perspective view of a mount strut to mount to the motor housing of FIG. 13.

Turning now to FIG. 16, an exemplary mount strut 516 is shown. The mount strut 516 can be hollow, and made of steel, for example, reducing weight while maintaining structural integrity. The mount strut 516 includes a first portion as a hub portion 610 and a second portion as a blade portion 612. The hub portion 610 and the blade portion 612 can have a cross-sectional area that is non-constant along the length of the strut 516, while it is contemplated that the cross-sectional area can be constant. The hub portion 610 can mount to the motor housing 512 of FIG. 15 and the blade portion 612 can mount to the blades 514 of FIG. 12. A set of mount aperture 616 can be formed in the mount strut 516, shown as two aperture 616 in each portion 610, 612. A twist 614 is formed in the mount strut 516. The twist 614 orients the mount strut 516 such that the hub portion 610 and the blade portion 612 are rotationally offset from one another by an offset angle 616. The offset can be between 1-degree and 45-degrees, for example. The offset angle 616 can be used to orient a blade attached to the mount strut 516 at a pitch angle or angle of attach relative to a chord of the blade. The twist 614 enables flat, flush mounting of the hub and blade portions 610, 612 against the horizontal bottom wall 532 (FIG. 13) and the blade 514, respectively. The particular offset angle 616 can be tailored based upon particular ceiling fan 510 to maximize efficiency. For example, the offset angle 616 can be increased or decreased based upon the length of the blades, or the rotational speed of the ceiling fan 510, for example.

It should be appreciated that the ceiling fan 510 and related components described in FIGS. 12-16 provide for a ceiling fan having improved efficiency. The ceiling fan 510 provides for maximizing air movement while minimizing energy costs. Additionally, the secondary suspension system 554 provides for a redundant mounting system for the fan. The components are optimized to reduce weight to further improve efficiency and minimize the weight tax on a suspending structure.

Figure 17:
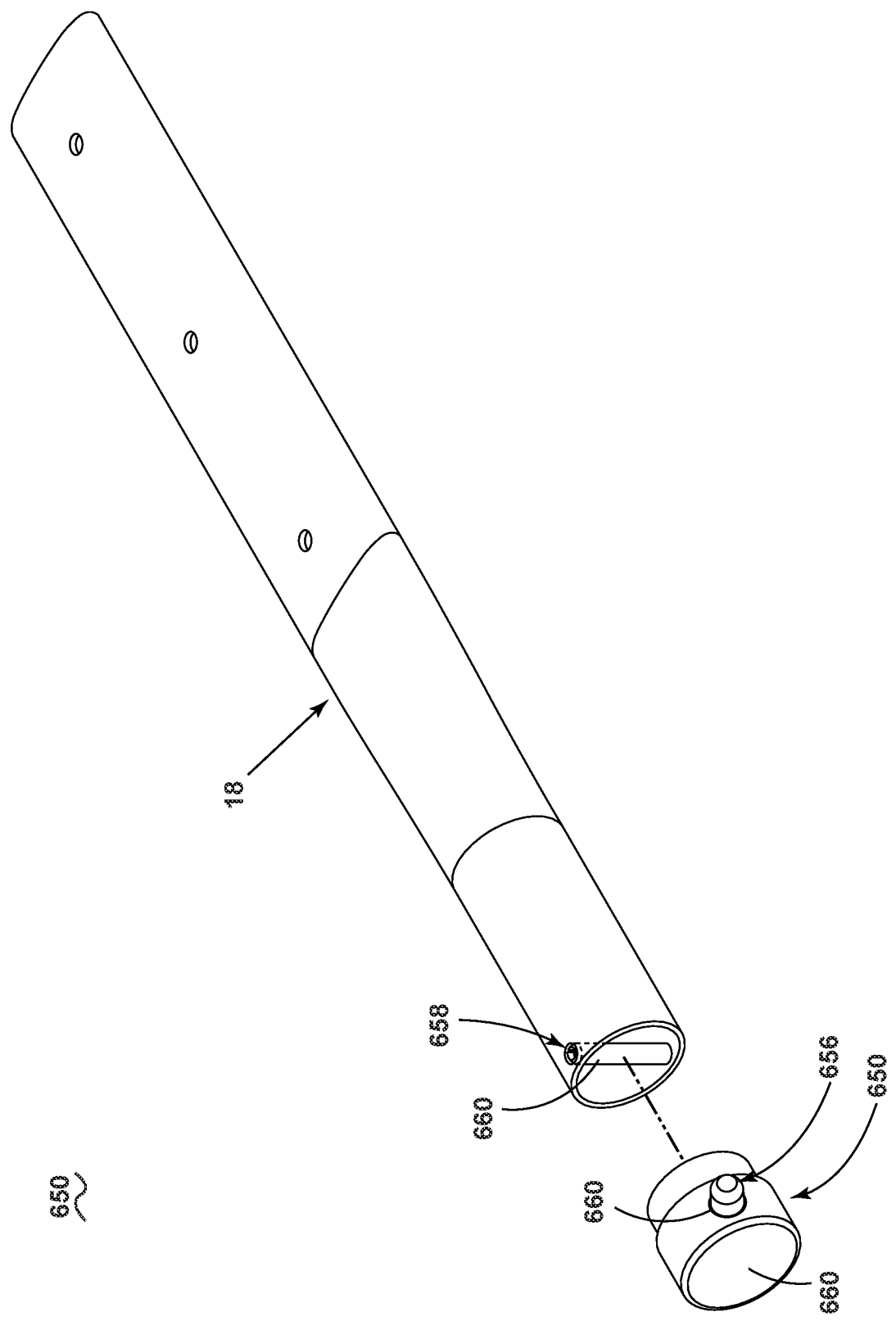
FIG. 17 is a perspective view of a blade holder with a push-lock assembly exploded therefrom.

FIG. 17 illustrates a blade holder, which can be the blade holder 18 as described herein, with an alternative push-lock assembly 650 for mounting the blade holder 18 to a ceiling fan motor housing, such as the motor hub, such as the motor housing 198 of FIG. 2. The push-lock assembly 650 includes an end cap 652 including a pin aperture 654. A pin 656 is provided in the pin aperture 654. The blade holder 18 includes a spring pin aperture 658. A spring pin 660 is provided in the spring pin aperture 658. The spring pin 660 couples the push-lock assembly 650 to the blade holder 18. At assembly, the push-lock assembly 650 can insert into the blade holder 18 and the spring pin 660 can insert into the spring pin aperture 658 to secure the push-lock assembly 650 to the blade holder 18.

Figure 18:
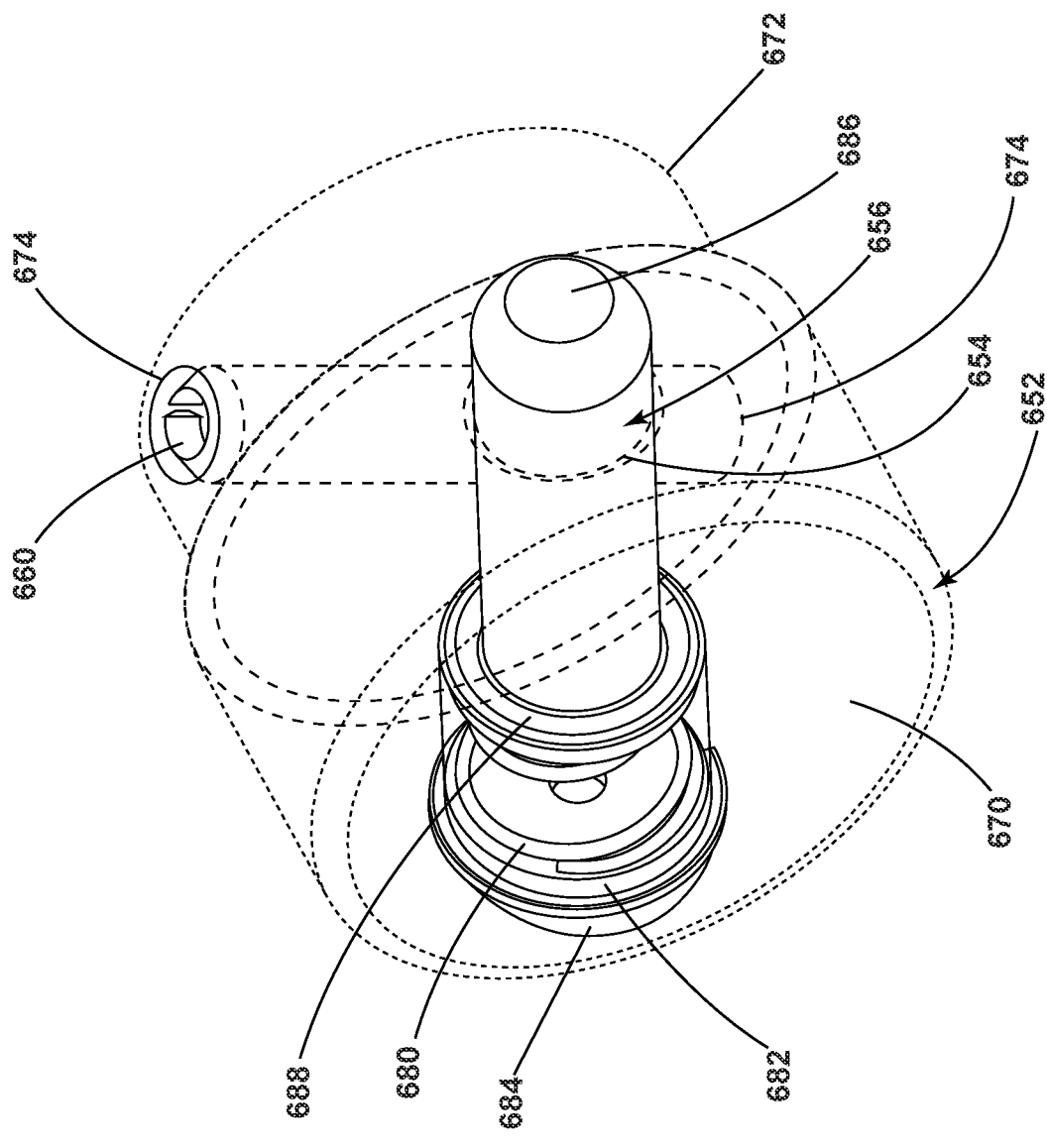
FIG. 18 is a perspective view of the push-lock assembly of FIG. 17, with an end cap shown in dashed line.

Referring now to FIG. 18, the end cap 652 is shown in dashed-line to provide a view of the interior assembly of the push-lock assembly 650. The end cap 652 further includes a lock end 670 and a mount end 672. The mount end 672 includes smaller diameter than the lock end 670 permitting insertion into the blade iron 18 (FIG. 17). The mount end 672 also has a pair of opposing apertures 674 for receiving the spring pin 660.

Within the lock end 670 is a pin assembly 676. The pin assembly 676 includes the pin 656, a spring 680 and a washer 682. A seat 684 is formed in the interior of the lock end 670 as part of the end cap 652. The washer 682 can seat at the seat 684 to secure the spring 680 at the seat 684. The spring 680 abuts the pin 656 opposite of the seat 684 and the washer 682. The pin 656 further includes a pin end 686 and an actuation end 688. The actuation end 688 includes a widened diameter and abuts the spring 680. As such, the pin 656 can actuate via the spring 680 to move the pin end 686 in and out of the pin aperture 654.

In operation, the pin 656 can actuate via the spring 680 to retract during insertion of the push-lock assembly 650 for coupling the blade holder 18 (FIG. 17) to a ceiling fan or motor housing. At insertion, the pin 656 retracts into the end cap 652. At full insertion, the pin 652 will extend into a receiving aperture, such as that of the pin lock 218 of FIG. 5A. In such a receiving aperture, the push-lock assembly 650 attaches to the ceiling fan to mount the blade holder 18. A blade, such as that described herein, can mount to the opposing end of the blade holder 18 to mount the blade to the ceiling fan.

The push-lock assembly 650 as described provides for a strengthened assembly for coupling a blade holder to a ceiling fan or motor housing. The push-lock assembly 650 also provides for a simple assembly, which facilitates slidable insertion of the blade holder 18 to mount to the motor housing. Removal of such a blade holder 18 is also simplified by depression of the pin 656 and slidable removal of the blade holder 18. Thus, it should be appreciated that the push-lock assembly provides for a simplified assembly for mounting a blade and blade iron to a ceiling fan, reducing cost and providing for ease of use by a user or installer.

In addition to the concepts covered by the claims, the following concepts can also provide for the basis for claims in any possible combination:

A ceiling fan comprising: a motor assembly having a non-rotating motor shaft and a rotating blade hub rotating about the non-rotating shaft; multiple blades mounted to the rotating blade hub; and a downrod having an upper end configured to mount to a structure to a lower end mounted to the non-rotating motor shaft.

A ceiling fan assembly further comprises a shaft coupler coupled to the non-rotating motor shaft and a downrod plate coupled to the lower end of the downrod, wherein the shaft coupler and downrod plate are secured to each other.

A ceiling fan assembly wherein the shaft coupler located above the rotating blade hub.

A ceiling fan assembly wherein the shaft coupler located on an upper end of the non-rotating motor shaft.

A ceiling fan assembly wherein the shaft coupler comprises a collar having a central opening that receives the non-rotating motor shaft.

A ceiling fan assembly wherein the collar slides over the non-rotating motor shaft.

A ceiling fan assembly wherein the collar slides over the non-rotating motor shaft.

A ceiling fan assembly wherein the collar is indexed relative to the non-rotating motor shaft.

A ceiling fan assembly wherein the index comprises one of the collar and the non-rotating motor shaft comprises a key and the other comprises a keyway that receives the key.

A ceiling fan assembly further comprising a retaining nut threaded onto a portion of the non-rotating motor shaft.

A ceiling fan assembly wherein at least one of the shaft coupler and the downrod plate has tapped studs and the other of the at least one shaft coupler and downrod plate has openings for receiving the tapped studs.

A ceiling fan assembly further comprising nuts threaded onto the tapped studs to secure together the shaft coupler and the downrod plate.

A ceiling fan assembly further comprising a guy wire fitting mounted to the downrod.

A ceiling fan assembly wherein the guy wire fitting is located above the lower end of the downrod.

A ceiling fan assembly wherein the guy wire fitting comprises a disk having multiple openings.

A ceiling fan assembly wherein the disk has an inner ring and an outer ring, with the openings lying between the inner and outer rings.

A ceiling fan assembly further comprising at least one turnbuckle having a hook extending through one of the openings and hooked to the outer ring.

A ceiling fan assembly wherein the disk is welded to the downrod.

A ceiling fan comprising: a motor assembly having a rotating blade hub; multiple blades mounted to the rotating blade hub; a downrod having an upper end configured to mount to a structure and a lower end mounted to the motor assembly; and a guy wire fitting mounted to the downrod.

A ceiling fan assembly wherein the guy wire fitting is located above the lower end of the downrod.

A ceiling fan assembly wherein the guy wire fitting comprises a disk having multiple openings.

A ceiling fan assembly wherein the disk has an inner ring and an outer ring with the openings lying between the inner and outer rings.

A ceiling fan assembly further comprising at least one turnbuckle having a hook extending through one of the openings and hooked to the outer ring.

A ceiling fan assembly wherein the disk is welded to the downrod.

A ceiling fan comprising: a motor assembly having a rotating blade hub and a downrod mount; multiple blades mounted to the rotating blade hub; a downrod having an upper end configured to mount to a structure and a lower end having a mount motor; and multiple studs provided in one of the downrod mount or the motor mount and corresponding openings provided in the other of the downrod mount or the motor mount, with the studs being received within the openings to aid in securing the downrod to the motor assembly.

A ceiling fan further comprising a motor assembly plate coupled to the motor assembly and a downrod plate coupled to the lower end of the downrod, wherein the studs are provided on one of the motor assembly plate or the downrod plate and the openings are provided in the other of the motor assembly plate and the downrod plate.

A ceiling fan wherein the motor assembly comprises a non-rotating shaft about which the rotating blade hub rotates and which has a shaft coupler forming the motor assembly plate.

A ceiling fan wherein the shaft coupler is located above the rotating blade hub.

A ceiling fan wherein the shaft coupler is located on an upper end of the non-rotating motor shaft.

A ceiling fan wherein the shaft coupler comprises a collar having a central opening that receives the non-rotating motor shaft.

A ceiling fan wherein the collar slides over the non-rotating shaft.

A ceiling fan wherein the collar is indexed relative to the non-rotating shaft.

A ceiling fan wherein the index comprises one of the collar and non-rotating shaft comprises a key and the other comprises a keyway that receives the key.

A ceiling fan further comprising a retaining nut threaded onto a tapped portion of the non-rotating motor shaft.

A ceiling fan wherein the studs are tapped studs.

A ceiling fan further comprising nuts threaded onto the tapped studs to secure together the shaft coupler and the downrod plate.

A ceiling fan comprising: a motor assembly having a rotating blade hub with a first receiver; at least one fan blade having a second receiver; and a blade holder having a first end with a first cross-section and a second end with a second cross-section different from the first cross-section, with the first end received within the first receiver and the second end receiving within the second receiver to couple the blade to the blade hub.

A ceiling fan assembly wherein the first and second cross-sections have a height and a width and the height of the second cross-section is less than the height of the first cross-section.

A ceiling fan assembly wherein the first and second cross-sections have the same area.

A ceiling fan assembly wherein the first and second cross-sections are not the same.

A ceiling fan assembly of claim 39 wherein the area of the second cross-section is greater than the area of the first cross-section.

A ceiling fan assembly wherein the first cross-section is a circle and the second cross-section is an ellipse.

A ceiling fan assembly wherein the blade holder comprises a circular section defining the circle, an elliptical section defining the ellipse, and a transition section connecting the circular and elliptical sections, with the transition section transition from a circular to an elliptical shape.

A ceiling fan assembly wherein the blade holder is a single piece.

A ceiling fan assembly wherein the blade holder is formed by stamping.

A ceiling fan assembly wherein the elliptical section has multiple mounting openings.

A ceiling fan assembly wherein the second receiver is located within an interior of the blade and the elliptical section is received within the second receiver.

A ceiling fan assembly wherein fasteners extend through the multiple openings and the blade.

A ceiling fan assembly wherein the first receiver comprises at least one sleeve and the circular section is received within the sleeve.

A ceiling fan assembly further comprising an index fixing the rotational position of the circular section relative to the sleeve.

A ceiling fan assembly wherein the index comprises a biased detent.

A ceiling fan assembly wherein the biased detent comprises a biased pin on one of the circular section and the sleeve and a recess receiving the pin on the other of the one of the circular section and the sleeve.

A ceiling fan assembly wherein the blade comprises a hollow interior and an open end, which form at least a portion of the second receiver.

A ceiling fan assembly wherein the first receiver comprises at least one split sleeve and the first end is received within the compressively retained by the at least one split sleeve.

A ceiling fan assembly further comprising an index fixing the rotational position of the blade relative to the blade hub.

A ceiling fan assembly further comprising mechanical fasteners passing through the blade and the second end to secure the blade to the blade holder.

A aspects of the disclosure described herein relate to a ceiling fan comprising: a motor assembly having a rotating blade hub; and at least one blade mount provided on the blade hub and having a split sleeve and a compression fitting closing the split sleeve.

A ceiling fan wherein the motor assembly comprises a rotatable housing portion and the blade hub is provided on the rotatable housing portion.

A ceiling fan wherein the motor assembly comprises a non-rotating motor shaft about which the rotatable housing portion rotates.

A ceiling fan wherein the blade hub is integrally formed with the rotatable housing portion.

A ceiling fan wherein the split sleeve and compression fittings are integrally formed with the rotatable housing portion.

A ceiling fan wherein the motor assembly comprises upper and lower motor housings and one of the upper and lower motor housings forms the rotatable housing portion.

A ceiling fan further comprising a pair of axially-spaced compression fittings closing the split sleeve.

A ceiling fan wherein the compression fitting is integrally formed with the split sleeve.

A ceiling fan wherein the compression fitting comprises a split ring.

A ceiling fan further comprising a rotation index.

A ceiling fan of wherein the rotation index comprises a detent in the sleeve.

A ceiling fan wherein the detent is aligned with the split in the split sleeve.

A ceiling fan wherein the detent is inboard of the compression fitting.

A ceiling fan wherein the at least one blade mount comprises multiple blade mounts radially spaced about the blade hub.

A ceiling fan wherein the motor assembly comprises a rotating housing portion having a central hub and the blade mounts extend radially form the hub.

A ceiling fan wherein the motor assembly comprises a non-rotating shaft and the hub circumscribes and rotates about the non-rotating shaft.

A ceiling fan wherein the motor assembly comprises upper and lower motor housings, one of which forms the rotating housing portion.

A ceiling fan wherein the blade mounts are integrally formed with the one of the upper and lower motor housings.

A ceiling fan comprising: an upper motor housing; a lower motor housings; and a magnet seat formed in a portion of the upper and lower housing configured to seat a rotor and mount the rotor to the upper and lower motor housings.

A ceiling fan wherein the magnets comprise a permanent magnet.

A ceiling fan wherein the magnet comprises an electromagnet.

A ceiling fan wherein the electromagnet comprises a motor winding.

A ceiling fan wherein the magnet seat comprises confronting channels formed in each of the upper and lower housings, which collectively form the magnet seat when the upper and lower housings are secured together.

A ceiling fan wherein the upper and lower housings are secured together by mechanical fasteners.

A ceiling fan wherein at least one of the upper or lower housings rotates to define a rotating housing.

A ceiling fan further comprising a blade assembly coupled to the blade mount.

A ceiling fan wherein the blade assembly comprises a blade and a blade holder coupling the blade to the blade holder.

A ceiling fan further comprising a non-rotating motor shaft about which the rotating housing rotates.

A ceiling fan wherein the rotating housing is rotatably mounted to the non-rotating motor shaft.

A ceiling fan further comprising a stator winding mounted to the non-rotating shaft and located within an interior defined by the upper and lower housings.

A ceiling fan wherein the magnets form a portion of a rotor for the motor.

A ceiling fan wherein the upper and lower housings rotate about non-rotating shaft.

A ceiling fan further comprising upper and lower bearings wherein the non-rotating shaft has upper and lower bearing stops for supporting the bearings against which the upper and lower housings correspondingly abut.

A ceiling fan wherein the upper and lower housings are biased against their corresponding housing seats.

A ceiling fan wherein the stator winding is fixed relative to the non-rotating shaft and with respect to the housing seats.

A ceiling fan assembly comprising: a non-rotating motor shaft with an upper and lower bearing stop; a stator mounted to the non-rotating motor shaft; a rotor surrounding the stator; a motor housing having an upper bearing seat spaced above the upper bearing stop and a lower bearing seat spaced below the lower bearing stop; an upper bearing seated within the upper bearing seat; a lower bearing seated within the lower bearing seat; and a downrod coupling provided on the non-rotating shaft; wherein when the ceiling fan assembly is suspended from a structure with the downrod coupling, the weight of the rotor presses the upper bearing against the upper bearing stop such that the weight of the rotor is transferred through the upper bearing to the non-rotating shaft.

A ceiling fan assembly further comprising a spring located within the lower bearing seat and biasing the lower bearing against the lower bearing stop.

A ceiling fan assembly wherein the non-rotating motor shaft is hollow and further comprising a retaining rod passing through the hollow motor shaft.

A ceiling fan assembly wherein a lower end of the retaining rod has a cap that abuts a retention plate adjacent to a lower portion of the non-rotating shaft.

A ceiling fan assembly wherein an upper end of the retaining rod is located above an upper end of the non-rotating shaft.

A ceiling fan assembly wherein the upper end of the retaining rod terminates in a clevis.

A ceiling fan assembly wherein the rotor comprises upper and lower housings, which are secured together, with the upper housing having the upper bearing seat and the lower housing having the lower bearing seat.

A ceiling fan assembly wherein the upper and lower housings define a magnet seat in which magnets for the rotor are located.

A ceiling fan assembly wherein magnet seat comprises confronting channels formed in each of the upper and lower housings.

A ceiling fan assembly wherein the upper and lower housings are secured together by mechanical fasteners.

A ceiling fan assembly further comprising multiple blade mounts provided on one of the upper and lower housing.

A ceiling fan assembly wherein the blade mounts comprise at least one split sleeve.

A ceiling fan assembly wherein the blade mounts comprise at least two axially aligned split sleeves.

A ceiling fan assembly wherein the blade mounts further comprise a blade rotation stop.

A ceiling fan assembly wherein the non-rotating shaft has a stator stop located between the upper and lower bearing seats.

A ceiling fan assembly wherein the stator stop and the lower bearing seat are formed by one or more collars on the non-rotating shaft.

A ceiling fan assembly wherein the non-rotating motor shaft includes a weep hole.

A ceiling fan comprising: a motor assembly having a hollow, non-rotating motor shaft; and a retaining rod passing through the motor shaft; wherein the retaining rod provides a redundant mount system for the ceiling fan.

A ceiling fan further comprising a retention plate wherein the retaining rod secures retention plate and the retention plate is secured to the non-rotating motor shaft.

A ceiling fan wherein the non-rotating motor shaft is hollow and the retaining rod extends at least into the hollow of the non-rotating motor shaft.

A ceiling fan wherein a lower end of the retaining rod has a cap that abuts a lower portion of the non-rotating shaft.

A ceiling fan wherein an upper end of the retaining rod is located above an upper end of the non-rotating shaft.

A ceiling fan wherein the upper end of the retaining rod terminates in a clevis.

A ceiling fan further comprising a shaft coupler coupled to the non-rotating shaft and a downrod plate coupled to the lower end of the downrod, wherein the shaft coupler and downrod plate are secured to each other.

A ceiling fan wherein the shaft coupler is located on an upper end of the non-rotating motor shaft.

A ceiling fan wherein the shaft coupler comprises a collar having a central opening that receives the non-rotating motor shaft.

A ceiling fan wherein the collar slides over the non-rotating motor shaft.

A ceiling fan wherein the collar is indexed relative to the non-rotating motor shaft.

A ceiling fan wherein index comprises one of the collar and non-rotating motor shaft comprises a key and the other comprises a keyway that receives the key.

A ceiling fan further comprise a retaining nut threaded onto a tapped portion of the non-rotating motor shaft.

A ceiling fan wherein at least one of the shaft coupler and the downrod plate has tapped studs and the other of the at least one shaft coupler and downrod plate has openings for receiving the tapped studs.

A ceiling fan further comprising nuts threaded onto the tapped studs to secure together the shaft coupler and the downrod plate.

A ceiling fan comprising: a motor assembly having a non-rotating, hollow, motor shaft; a stator winding carried by the motor shaft; and a wiring harness passing through the hollow of the motor shaft and electrically coupled to the stator winding.

A ceiling fan further comprising a hollow down rod mounted to the motor shaft and the wiring harness passes through the hollow of the down rod and the non-rotating shaft.

A ceiling fan further comprising a retaining rod passing through the hollow downrod and secured to at least one of the non-rotating motor shaft and the motor assembly.

A ceiling fan further comprising a shaft coupler coupled to the non-rotating shaft and a downrod plate coupled to the lower end of the downrod, wherein the shaft coupler and downrod plate are secured to each other.

A ceiling fan wherein the shaft coupler is located on an upper end of the non-rotating motor shaft.

A ceiling fan further comprise a retaining nut threaded onto a tapped portion of the non-rotating motor shaft.

A ceiling fan wherein a lower end of the retaining rod has a cap that abuts a lower portion of the non-rotating shaft.

A ceiling fan wherein an upper end of the retaining rod is located above an upper end of the non-rotating shaft.

A ceiling fan wherein the upper end of the retaining rod terminates in a clevis.

A ceiling fan further comprising an exit passage extending from the hollow through an exterior of the motor shaft and the wiring harness passes through the exit passage.

A ceiling fan wherein the non-rotating shaft comprises a stator stop against which the stator winding rests.

A ceiling fan wherein the stator stop comprises a collar about the non-rotating shaft.

A ceiling fan comprising: a motor assembly having a rotating blade hub; a plurality of blades; at least one blade holder for mounting the plurality of blades to the blade hub; at least one blade mount provided on the blade hub for receiving the blade holder and having at least one fastener aperture and at least one pin aperture; at least one saddle disposed in the fastener aperture; and at least one fastener for selectively tightening or loosening the saddle.

A ceiling fan wherein the motor assembly comprises a rotatable housing portion and the blade hub is provided on the rotatable housing portion.

A ceiling fan wherein the motor assembly comprises a non-rotating motor shaft about which the rotatable housing portion rotates.

A ceiling fan wherein the blade hub is integrally formed with the rotatable housing portion.

A ceiling fan wherein the motor assembly comprises upper and lower motor housings and one of the upper and lower motor housings forms the rotatable housing portion.

A ceiling fan wherein the at least one blade mount comprises multiple blade mounts radially spaced about the blade hub.

A ceiling fan wherein the motor assembly comprises a rotating housing portion having a central hub and the blade mounts extend radially from the hub.

A ceiling fan wherein the motor assembly comprises a non-rotating shaft and the hub circumscribes and rotates about the non-rotating shaft.

A ceiling fan wherein the blade mounts extend radially from the motor shaft to collectively define a horizontal plane.

A ceiling fan wherein the fastener aperture is oriented at an angle relative to the horizontal plane.

A ceiling fan wherein the angle is 20 degrees.

A ceiling fan wherein the blade mount defines a cylindrical cavity and the fastener aperture extends radially from the cylindrical cavity.

A ceiling fan wherein the saddle is adapted to anchor the blade holder along the radial extension of the fastener aperture.

A ceiling fan wherein the motor assembly comprises upper and lower motor housings, one of which forms the rotating housing portion.

A ceiling fan wherein the blade mounts are integrally formed with the one of the upper and lower motor housings.

A ceiling fan wherein the at least one fastener is a set screw.

A ceiling fan wherein the blade mount further comprises an inlet, with a channel extending from the inlet to the pin aperture.

A ceiling fan wherein the saddles are aligned along the channel.

A ceiling fan wherein the at least one saddle includes two saddles.

A ceiling fan assembly comprising: a stator assembly having a non-rotating motor shaft and stator slidably and non-rotationally coupled to the non-rotating motor shaft; a rotor assembly; a first bearing slidably mounted to the non-rotating motor shaft and rotatably coupling the rotor assembly to the stator assembly; and a first spacer located between the first bearing and the stator assembly to fix the sliding location of the first bearing relative to the stator along the non-rotating motor shaft.

A ceiling fan assembly further comprising a second bearing and second spacer located on an opposite side of the stator than the first bearing and first spacer, with the second bearing slidably mounted to the non-rotating motor shaft, the second spacer located between the second bearing and the stator.

A ceiling fan assembly wherein the second bearing rotatably couples the rotor assembly to the stator assembly.

A ceiling fan assembly wherein the stator is compressively retained between the first and second spacers.

A ceiling fan assembly wherein the first and second spacers are compressively retained between the first and second bearings.

A ceiling fan assembly wherein the rotor assembly abuts at least one of the first and second bearings.

A ceiling fan assembly wherein the rotor assembly abuts both the first and second bearings.

A ceiling fan assembly wherein the rotor assembly comprises a housing abutting both the first and second bearings.

A ceiling fan assembly wherein the stator assembly is compressively retained by at least one of the first spacer and first bearing.

A ceiling fan assembly wherein the first spacer is compressively retained between the first bearing and the stator assembly.

A ceiling fan assembly wherein the rotor assembly abuts the first bearing.

A ceiling fan assembly wherein the first bearing is compressively retained between the rotor assembly and the first bearing.

A ceiling fan assembly wherein the rotor assembly comprises a housing that compressively retains the first bearing.

A ceiling fan assembly wherein the non-rotating motor shaft has a shoulder and at least one of the first bearing and first spacer abuts the shoulder.

A ceiling fan assembly wherein the first bearing abuts the shoulder.

A ceiling fan assembly wherein the spacer circumscribes the shoulder.

A ceiling fan assembly wherein the spacer is compressively retained between the bearing and the stator.

A ceiling fan comprising: a motor assembly having a rotating blade hub; at least one hub socket formed in the blade hub; a blade having a body with a blade socket and the body extending from a root to a tip to define a body span-wise axis and an airfoil cross-section defining a chord-wise axis; and a strut having a hub portion received within the hub socket and a blade portion received within the blade socket to couple the blade to the hub; wherein at least one of the blade portion is rotationally offset from the hub portion or the blade socket is rotationally offset from the blade such that the blade is provided with an angle of attack relative to the chord-wise axis when the blade portion is received within the blade socket.

A ceiling fan wherein the hub socket has a horizontally-oriented bottom wall.

A ceiling fan wherein the blade portion is rotationally offset from the hub portion.

A ceiling fan wherein the cross-sectional area of the strut is non-constant along the length of the strut.

A ceiling fan wherein the hub socket includes a bottom wall and the at least one fastener aperture is formed in the bottom wall.

A ceiling fan wherein the hub socket further comprises tapered walls between the bottom wall and the remainder of the blade hub.

A ceiling fan wherein the hub socket further includes a mouth at a terminal edge of the rotating blade hub.

A ceiling fan wherein the hub socket further includes a neck and the throat defined at an intersection of the mouth and the neck.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A ceiling fan assembly comprising:
    a motor assembly having a rotating blade hub; and
    at least one fan blade mounted to the rotating blade hub having a blade span defined between a tip and a root, and defining an airfoil cross section including a rounded leading edge and a v-shaped trailing edge defining a chord extending therebetween, with the blade comprising a pressure side surface and a suction side surface extending between the leading and trailing edges and including a hollow interior and including a tip opening at the tip and a root opening at the root for accessing the hollow interior.

2. The ceiling fan assembly of claim 1 wherein the chord is between 6 and 8 inches, the span is between 6 and 12 feet, and the rotational speed of the at least one blade is between 60 and 80 rpm.

3. The ceiling fan assembly of claim 2 wherein the chord is 7 inches, the span of the at least one blade is about 12 feet, and the rotational speed of the ceiling fan assembly is about 67 rpm.

4. The ceiling fan assembly of claim 1 wherein the pressure side surface and the suction side surfaces extending between the leading and trailing edges provide lift to the at least one blade for improving efficiency of the at least one blade.

5. The ceiling fan assembly of claim 1 wherein the chord is between 6 and 8 inches.

6. The ceiling fan assembly of claim 4 wherein the chord is about 7 inches.

7. The ceiling fan assembly of claim 1 wherein the span of the at least one blade is between 6 and 12 feet.

8. The ceiling fan assembly of claim 7 wherein the span is 9 feet.

9. The ceiling fan assembly of claim 1 wherein the at least one blade is configured for rotation between 50 and 120 rpm.

10. The ceiling fan assembly of claim 8 wherein the speed of rotation of the blades is between 60 and 80 rpm.

11. The ceiling fan assembly of claim 10 wherein the speed of rotation of the blades is about 67 rpm.

12. The ceiling fan assembly of claim 1 wherein the blade is non-symmetrical.

13. The ceiling fan assembly of claim 1 wherein the airfoil cross-section has a maximum thickness of 1 inch.

14. The ceiling fan assembly of claim 1 wherein the airfoil cross-sections has a thickness of 0.97 inches.

15. The ceiling fan assembly of claim 1 wherein the at least one blade is hollow defining a chamber.

16. The ceiling fan assembly of claim 1 wherein the at least one blade includes mount holes 100 for mounting the at least one blade.

17. The ceiling fan assembly of claim 1 wherein the at least one blade comprises five blades.

18. The ceiling fan assembly of claim 1 wherein the at least one blade includes an end that tapers between the leading edge and the trailing edge.

19. The ceiling fan assembly of claim 1 wherein the pressure side surface and the suction side surface bend outwardly in a convex manner from the leading edge toward the centerline and the suction side bends inwardly in a concave manner from the centerline toward the trailing edge.

20. The ceiling fan assembly of claim 1 wherein pressure side surface never crosses the chord.

\* \* \* \* \*